(12) United States Patent
Matsui et al.

(10) Patent No.: US 7,162,139 B2
(45) Date of Patent: Jan. 9, 2007

(54) SURFACE LIGHT SOURCE DEVICE AND DISPLAY DEVICE

(75) Inventors: Yuki Matsui, Nara (JP); Akihiro Funamoto, Nara (JP); Shigeru Aoyama, Kyoto (JP)

(73) Assignees: Omron Corporation, Kyoto (JP); Osaka University, Osaka (JP)

( * ) Notice: Subject to any disclaimer, the term of this patent is extended or adjusted under 35 U.S.C. 154(b) by 143 days.

(21) Appl. No.: 10/958,998

(22) Filed: Oct. 5, 2004

(65) Prior Publication Data

US 2005/0099792 A1    May 12, 2005

(30) Foreign Application Priority Data

Oct. 6, 2003  (JP) ............................. 2003-347551
Sep. 10, 2004  (JP) ............................. 2004-264750

(51) Int. Cl.
*G02B 6/00* (2006.01)
*F21V 8/00* (2006.01)

(52) U.S. Cl. ...................... 385/146; 385/901; 362/615; 362/628

(58) Field of Classification Search ................ 385/146, 385/147, 901; 362/615, 628
See application file for complete search history.

(56) References Cited

U.S. PATENT DOCUMENTS

| | | | | |
|---|---|---|---|---|
| 4,053,206 A | * | 10/1977 | Yevick | ................ 362/627 |
| 6,592,233 B1 | | 7/2003 | Parikka | |
| 6,633,722 B1 | * | 10/2003 | Kohara et al. | ............... 385/146 |
| 6,735,354 B1 | * | 5/2004 | Hamada | ................ 385/15 |
| 6,808,282 B1 | * | 10/2004 | Ishitaka | ................ 362/610 |
| 2005/0180720 A1 | * | 8/2005 | Hara et al. | ................ 385/146 |

FOREIGN PATENT DOCUMENTS

| | | |
|---|---|---|
| EP | 0 778 484 A2 | 6/1997 |
| EP | 0 879 991 A2 | 11/1998 |
| EP | 1 329 762 A2 | 7/2003 |
| GB | 2 281 802 A | 8/1994 |
| JP | 2000-100229 | 4/2000 |
| JP | 2002-250917 | 9/2002 |
| WO | WO 02/29454 A2 | 4/2002 |

OTHER PUBLICATIONS

Patent Abstracts of Japan, Publication No. 2002-250917 dated Sep. 6, 2002, 2 pages.
European Search Report dated Feb. 2, 2005 ( 3 pages).
Patent Abstracts of Japan, Publication No. 2000-100229, Publication Date Apr. 7, 2000, 2 pages.

(Continued)

*Primary Examiner*—John D. Lee
(74) *Attorney, Agent, or Firm*—Osha Liang LLP

(57) ABSTRACT

In a front light equipped with a light source and a transparent plate emitting light from a light emitting surface which is situated at the reverse side against an observation side surface by conducting light from the light source, the reflection preventive patterns comprising the minute unevennesses 30 for prevention of reflection are formed on the light emitting surface. When a wavelength of visible light with the shortest wavelength among light which is emitted from the light source 24 is $\lambda\min$, the refractive index of the transparent plate is $n1$ and the refractive index of air is $n0$, the period p of the minute unevennesses 30 satisfies the following equation. $p<\lambda\min/(n0+n1)$. Thereby, it can be prevented that the diffracted light is emitted from the reflection preventive patterns (light emitting surface) of the transparent plate.

20 Claims, 40 Drawing Sheets

OTHER PUBLICATIONS

Japanese Office Action for Japanese Application No. JP2004-264750, mailed May 24, 2005, 4 pages.

Japanese Office Action for Japanese Patent Application No. JP2005-212171 mailed Oct. 25, 2005, 2 pages.

"Diffractive Optics for Industrial and Commercial Applications"; edited by Jari Turunen and Frank Wyrowski; XP008056697; pp. 308-311, no date.

EPO Communication pursuant to article 96(2) dated Dec. 14, 2005.

* cited by examiner

PRIOR ART

PRIOR ART

PRIOR ART

PRIOR ART

PRIOR ART

PRIOR ART

PRIOR ART

— - — - — Lattice plane

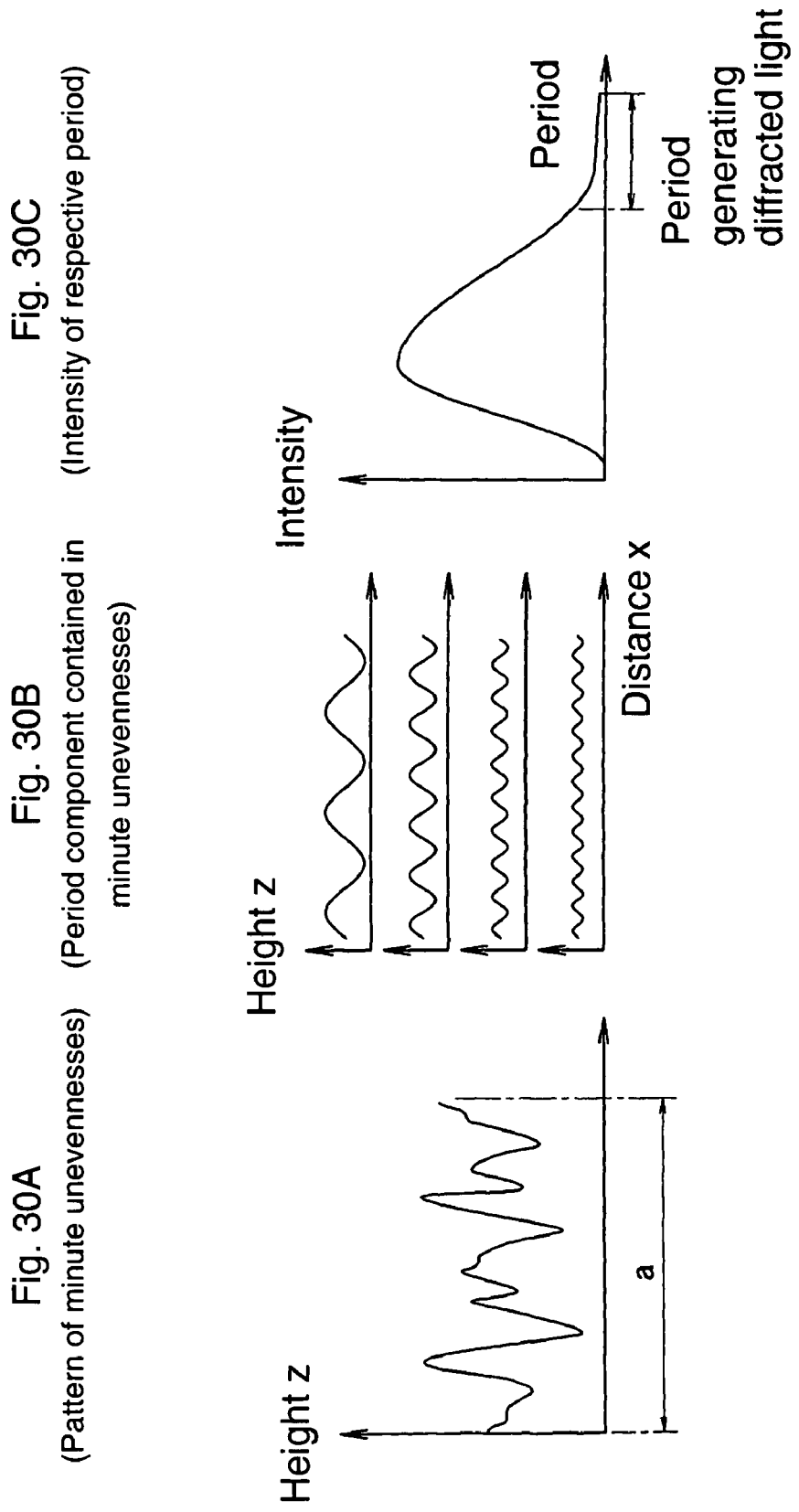

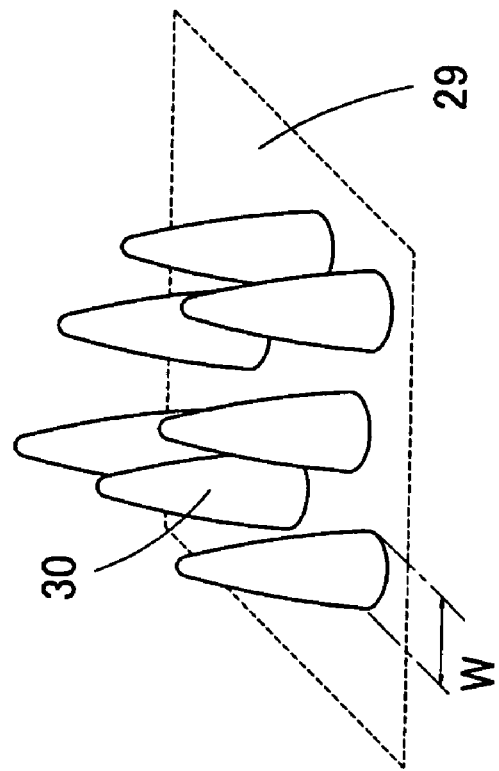
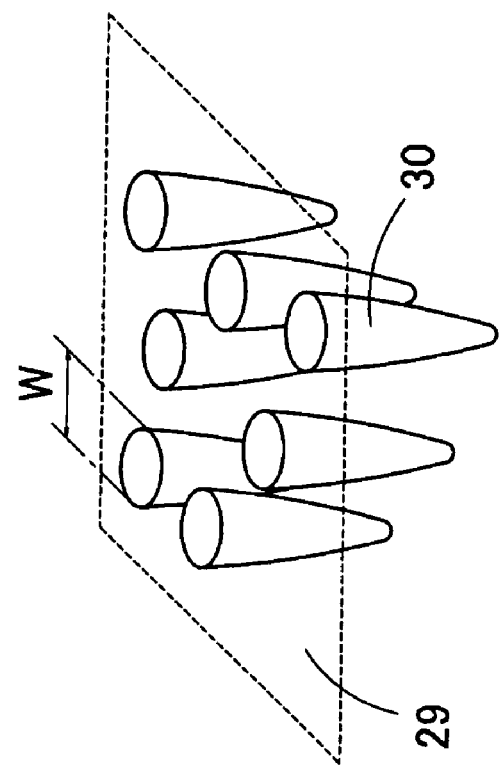

SURFACE LIGHT SOURCE DEVICE AND DISPLAY DEVICE

BACKGROUND OF THE INVENTION

1. Field of the Invention

The invention relates to a surface light source device and a display device. Specifically, the invention related to a surface light source device equipped with minute unevenness for prevention of reflection on the observation side surface of a transparent plate or a light emitting surface.

2. Description of the Related Art

The long-life of a battery is required in mobile instruments equipped with a display such as a liquid crystal display device. Since a reflection type liquid crystal display device can use a combination of a light source with natural light for illuminating a screen and power consumption is little, it has been marked.

Herein, a conventional example using a surface light source device as a front light is illustrated. FIG. 1 is the schematic sectional view of a reflection type liquid crystal display device 1 comprising a front light 2 and a reflection type liquid crystal display panel 3. In the front light 2, light emitted from a light source 4 repeats total reflection in a transparent plate 5 to conduct light, and then light which was reflected by a surface deflecting pattern 8 and about vertically injected on a light emitting surface 7 (rear surface) is emitted from the light emitting surface 7. The light emitted from the light emitting surface 7 of the front light 2 passes the glass substrate of the liquid crystal display panel 3 and a liquid crystal layer as shown in an arrow mark of a real line of FIG. 1, is reflected by a reflection surface 8, passes the liquid crystal layer and the like, and returns to an original direction. Thus, after the light reflected in the inside of the liquid crystal display panel 3 is modulated by the liquid crystal display panel 3, it passes the front light 2 and emitted as an image light 9 to an observer side.

On the other hand, a portion of light which is reflected by the deflecting pattern 6 in the transparent plate 5 to be oriented to the light emitting surface 7 is reflected by Fresnel reflection on the light emitting surface 7 as shown in the arrow mark of a broken line of FIG. 1, and directly emitted to an observer side.

In general, about 4% of the light injected on the light emitting surface 7 becomes noise light 10 by total reflection, and when the noise light 10 is generated, the noise light 10 and the image light 9 are emitted to the same direction as shown in FIG. 1; therefore white light is duplicated on the image prepared by the liquid crystal display panel 3, and the contrast of the screen is lowered to deteriorate visibility.

The view shown in FIG. 2 is the schematic sectional view of the reflection type liquid crystal display panel 11 by which the above-mentioned deterioration of visibility was prevented. A reflection preventive pattern 13 consisting of minute unevenness 12 which were arranged at a period P of the wavelength of light or less is provided at the light emitting surface 7 of the transparent plate 5 in the reflection type liquid crystal display panel 11. FIG. 3 is a magnified perspective view showing one portion of contours of the reflection preventive pattern 13 which was provided on the light emitting surface 7 of the transparent plate 5, and the pyramidal minute unevennesses 12 are arranged at a fixed period p (pitch). The reflection preventive patterns or a front light having the minute unevenness are known in the conventional art.

FIG. 4 is the illustration view of the action of the reflection preventive patterns 13. FIG. 4A represents the section of the transparent plate 5 which has a refractive index of n1 (>a refractive index of air n0), and the width of each of the minute unevennesses 12 of the reflection preventive patterns 13 is gradually narrowed to the lower end portion. In a zone at which the reflection preventive patterns 13 is formed, since the volume ratio of a medium (a transparent plate material) having a refractive index of n1 to a medium (air) having a refractive index of n0 is gradually varied depending on the thickness direction of the transparent plate 5, the effective refractive index of the medium is gradually varied from the refractive index n1 of the transparent plate 5 to the refractive index n0 of air in accordance with an orientation from upward to downward as shown in FIG. 4B.

Herein, when the period of the minute unevenness 12 is set as p and the wavelength of visible light having the shortest wavelength among light emitted from the light source 4 is set as $\lambda$min, it is desirable to satisfy the following condition:

$$p < \lambda\text{min}$$

in order to reduce the reflected light (noise light).

When $\lambda$min is the wavelength in vacuum, it is more desirable that the condition of the period p of the minute unevenness 12 is set as follow considering that the wavelength is shortened to $\lambda$min/n1 in the transparent plate:

$$P < \lambda\text{min}/n1.$$

However, according to the reflection type liquid crystal display panel 11, since the minute unevennesses 12 are formed at a period p of the wavelength of light or less and the (effective) refractive index of the medium to a thickness direction is continuously varied, the Fresnel reflection in the light emitting surface 7 is decreased over a wide wavelength region and the contrast of an image is improved when light is vertically injected from upside to the reflection preventive pattern 13 as shown in the real line arrow mark of FIG. 3, and when light is injected to the reflection preventive pattern 13 at a smaller incident angle than the critical angle of total reflection. The behavior of light in the reflection type liquid crystal display panel 11 at this time is shown in FIG. 2.

Thus, the method has been known that the contrast of an image is improved by providing the reflection preventive pattern 13 on the light emitting surface 7 to suppress the Fresnel reflection.

However, when the present inventors have tried to study a further better image of the liquid crystal display device, they have found that the diffracted light which is generated at the reflection preventive pattern 13 is one of main causes deteriorating the contrast of a screen. Namely, when the reflection preventive pattern 13 is provided on the light emitting surface 7 of the transparent plate 5, the Fresnel reflection can be suppressed but the reflection preventive patterns 13 in which the minute unevennesses 12 are arranged at a constant period work as diffraction grating; therefore when light in the transparent plate 5 is emitted from the light emitting surface 7, diffracted light is generated. Thus, the diffracted light emitted from the light emitting surface 7 of the transparent plate 5 is emitted for an observer side directly or in irregular reflection. The diffracted light is duplicated with the image light 9 of a screen and deteriorates the contrast of an image, further the transparent plate is subject to a tone of color, and it deteriorates the visibility of the liquid crystal display panel 11.

Further, according to the study by the present inventors, it has been grasped that the generation of the diffracted light on the reflection preventive patterns 13 is generated by the function peculiar to the surface light source as shown below. Namely, it is sufficient to consider incident light from an about vertical direction for the reflection preventive pattern (minute unevenness) for general use as shown in the real line arrow mark of FIG. 3. To the contrary, as shown in the broken line arrow mark of FIG. 3, it is required to consider light injected at a large incident angle on the light emitting surface 7 for the reflection preventive pattern 13 which was provided on the rear surface of the transparent plate 5. As shown in FIG. 5, the surface light source device 2 has a function that the total reflection of light emitted from the light source 24 is carried out on the surface and the rear surface of the transparent plate 5, and the light is transmitted and uniformly emitted from the whole surface. Accordingly, light with large intensity is injected for the reflection preventive pattern 13 at a larger incident angle than the critical angle of the total reflection. On the other hand, when the reflection preventive pattern 13 is viewed from a direction vertical to the light emitting surface 7, the effective refractive index is the maximum at the center of the minute unevenness 12 because the effective refractive index of the respective minute unevennesses 12 becomes large at a portion with a large thickness. The effective refractive index becomes small at a surrounding portion of the minute unevenness 12, and the distribution of the effective refractive index as shown in FIG. 6B is shown. Consequently, when the reflection preventive pattern 13 is viewed from a vertical direction, it can be estimated that the reflection preventive pattern 13 is a two dimensional diffraction grating as shown in FIG. 6B. Accordingly, when light which is in nearly parallel with the reflection preventive pattern 13 is injected, it is diffracted by the minute unevenness 12 which was arranged two dimensionally, and as shown in FIG. 5, the diffracted light 14 is emitted from the light emitting surface 7. Since the diffracted light 14 is emitted to an observer side directly or in irregular reflection, the diffracted light is duplicated with the image light of a screen and the transparent plate wears a tone of color, and the contrast of an image is lowered to deteriorate the visibility of the liquid crystal display panel 11.

Further, a method of forming a dielectric multilayer on the light emitting surface can be considered as a method of preventing the Fresnel reflection of light on the light emitting surface of the transparent plate, but there are problems that the method is complicated in a film forming process and costs high, and environmental resistance is inferior.

SUMMARY OF THE INVENTION

The invention was performed based on the above-mentioned knowledge, and the purpose of the invention is to provide a device for suppressing the generation of diffracted light caused by the unevenness, or a designing method, in a surface light source device equipped with minute unevenness for prevention of reflection on the light emitting surface of a transparent plate.

The first surface light source device of the invention is a surface light source device equipped with a light source and a transparent plate emitting light from a light emitting surface which is situated at the reverse side against an observation side surface by conducting light from the light source, wherein a plural number of minute concave portions or convex portions for prevention of reflection are periodically arranged on at least one of the observation side surface or the light emitting surface, the periodical lower limit value of the concave portions or convex portions is calculated in relation with a wavelength in vacuum of visible light with the shortest wavelength which is emitted from the light source and the refractive index of a transparent plate when incident light injected in a surface where the concave portions or convex portions were arranged generates diffraction light, and the concave portions or convex portions are formed at a smaller period than the lower limit value.

According to the first surface light source device of the invention, it can be suppressed to generate the diffracted light caused by the concave portions or the convex portions for prevention of Fresnel reflection which were formed on the transparent plate, and a trouble that the diffracted light is emitted to an observer side to deteriorate the contrast of a screen can be improved.

The second surface light source device of the invention is a surface light source device equipped with a light source and a transparent plate emitting light from a light emitting surface which is situated at the reverse side against an observation side surface by conducting light from the light source, wherein a plural number of minute concave portions or convex portions for prevention of reflection are periodically arranged on at least one of the observation side surface or the light emitting surface, and the period p of the concave portions or convex portions satisfies the following equation:

$$p < \frac{\lambda \min}{n1 + n0}$$

(in which λmin represents a wavelength in vacuum of visible light with the shortest wavelength which is emitted from the light source, n1 represents the refractive index of the transparent plate, and n0 represents the refractive index of a medium which is brought in contact with the surface where the minute concave portions or convex portions of the transparent plate were arranged).

According to the second surface light source device of the invention, the diffracted light is not emitted from the surface on which the minute concave portions or convex portions of the transparent plate were arranged. Accordingly, it can be prevented by preventing the generation of the diffracted light that both of the image light and the diffracted light are injected in the eyes of an observer and visibility is deteriorated.

The third surface light source device of the invention is a surface light source device equipped with a light source and a transparent plate emitting light from a light emitting surface which is situated at the reverse side against an observation side surface by conducting light from the light source, wherein a direction at which the luminous intensity of light emitted from the light emitting surface is the maximum is inclined for the normal line which was established on the light emitting surface, a plural number of minute concave portions or convex portions for prevention of reflection are periodically arranged on at least one of the observation side surface or the light emitting surface, and the period p of the concave portions or convex portions satisfies the following equation:

$$p < \frac{\lambda \min}{n1 + n0 \cdot \cos\theta_{out}}$$

(in which λmin represents a wavelength in vacuum of visible light with the shortest wavelength which is emitted from the light source, n1 represents the refractive index of the transparent plate, n0 represents the refractive index of a medium which is brought in contact with the surface where the minute concave portions or convex portions of the transparent plate were arranged, and θout represents an angle formed between a direction at which the luminous intensity of light emitted from the light emitting surface is the maximum and the normal line which was established on the light emitting surface).

According to the third surface light source device of the invention, since light is emitted to an oblique direction from the light emitting surface of the transparent plate, it can be prevented that noise light which was normally reflected on the glass substrate of a display device is reflected to an observer side, and the deterioration of the contrast of a screen can be prevented. Further, since the period p of the concave portions or convex portions satisfies the above-mentioned equation, the diffracted light can reach hardly at an observer side even if the diffracted light is emitted from the light emitting surface of the transparent plate.

The fourth surface light source device of the invention is a surface light source device equipped with a light source and a transparent plate emitting light from a light emitting surface which is situated at the reverse side against an observation side surface by conducting light from the light source, wherein a plural number of minute concave portions or convex portions for prevention of reflection are periodically arranged on at least one of the observation side surface or the light emitting surface, and the period p of the concave portions or convex portions satisfies the following equation:

$$p < \frac{\lambda \min}{2 \cdot n1}$$

(in which λmin represents a wavelength in vacuum of visible light with the shortest wavelength which is emitted from the light source, and n1 represents the refractive index of the transparent plate).

According to the fourth surface light source device of the invention, the diffracted light is not generated to the inside of the transparent plate on the surface of the transparent plate at observation side or on the light emitting surface. Since the diffracted light in the inside of the transparent plate is occasionally emitted to an observer side, it does not occur by preventing the diffracted light into the inside of the transparent plate that the visibility of a screen is deteriorated by the diffracted light.

The fifth surface light source device of the invention is a surface light source device equipped with a light source and a transparent plate emitting light from a light emitting surface which is situated at the reverse side against an observation side surface by conducting light from the light source, wherein a plural number of minute concave portions or convex portions for prevention of reflection are periodically arranged on at least one of the observation side surface or the light emitting surface, and the arrangement direction of the concave portions or convex portions was arranged to a direction at which diffraction is most hardly generated against the proceeding direction of light conducted.

According to the fifth surface light source device of the invention, the diffraction caused by the minute concave portions or convex portions can be suppressed by optimizing the orientation of the minute concave portions or convex portions while keeping the period of the minute concave portions or convex portions. Accordingly, both of the suppression of diffraction and the moldability of the concave portions or the convex portions can be bettered.

The sixth surface light source device of the invention is a surface light source device equipped with a light source and a transparent plate emitting light from a light emitting surface which is situated at the reverse side against an observation side surface by conducting light from the light source, wherein a plural number of minute concave portions or convex portions for prevention of reflection are periodically arranged on at least one of the observation side surface or the light emitting surface, the concave portions or convex portions are arranged in a lattice shape which is defined by two lattice vectors in which an angle mutually formed is α ($\geq 90°$) and lengths are di and dj, and the concave portions or convex portions are oriented in a direction satisfying the following equation:

$$\frac{dj}{di} = \frac{\sin(\alpha - \phi)}{\sin\phi}$$

(in which φ represents an angle formed between the proceeding direction of light which conducted in about parallel with the light emitting surface and a lattice vector with a length of di).

According to the sixth surface light source device of the invention, since the arrangement direction of the minute concave portions or convex portions which were formed on the transparent plate satisfies the above-mentioned equation, the diffracted light caused by diffraction is hardly generated. Accordingly, the diffracted light and the image light are not duplicated and a screen with good visibility is obtained by suppressing the generation of the diffracted light. Further, according to the sixth surface light source device of the invention, the diffraction caused by the minute concave portions or convex portions can be suppressed by optimizing the orientation of the minute concave portions or convex portions while keeping the period of the minute concave portions or convex portions as large as possible. Accordingly, both of the suppression of diffraction and the moldability of the concave portions or the convex portions can be bettered.

The seventh surface light source device of the invention is a surface light source device equipped with a light source and a transparent plate emitting light from a light emitting surface which is situated at the reverse side against an observation side surface by conducting light from the light source, wherein a plural number of minute concave portions or convex portions for prevention of reflection are periodically arranged on at least one of the observation side surface or the light emitting surface, the concave portions or convex portions are arranged in a lattice shape which is defined by two lattice vectors in which an angle mutually formed is α($\geq 90°$) and lengths are di and dj, and the direction of a vector represented by difference of the two vectors is arranged at a direction orthogonal to the proceeding direction of light which is conducted in about parallel with the light emitting surface, and the concave portions or convex portions satisfy the following equation:

$$\frac{di \cdot dj}{\sqrt{di^2 + dj^2}} < \frac{\lambda \min}{2 \cdot n1}$$

(in which λmin represents a wavelength in vacuum of visible light with the shortest wavelength which is emitted from the light source, and n1 represents the refractive index of the transparent plate).

According to the seventh surface light source device of the invention, the minute concave portions or convex portions are arranged in an orthogonal lattice shape, or a square lattice shape, and the arrangement of the minute concave portions or convex portions can be most simplified. Further, a surface light source device without generating the diffracted light is obtained by controlling the arrangement direction and period of the minute concave portions or convex portions in like manner as the above-mentioned equation.

The eighth surface light source device of the invention is a surface light source device equipped with a light source and a transparent plate emitting light from a light emitting surface which is situated at the reverse side against an observation side surface by conducting light from the light source, wherein a plural number of minute concave portions or convex portions for prevention of reflection are periodically arranged on at least one of the observation side surface or the light emitting surface, the concave portions or convex portions are arranged in a lattice shape which is defined by two lattice vectors with the same length in which an angle mutually formed is 120°, and the direction of a lattice vector represented by either of the two lattice vectors or the sum of both lattice vectors is arranged at a direction parallel to the proceeding direction of light which is conducted in about parallel with the light emitting surface, and the lengths of the both lattice vectors di and dj satisfy the following equation:

$$di = dj < \frac{2 \cdot \lambda \min}{3 \cdot n1}$$

(in which λmin represents a wavelength in vacuum of visible light with the shortest wavelength which is emitted from the light source, and n1 represents the refractive index of the transparent plate).

According to the eighth surface light source device of the invention, since the minute concave portions or convex portions are arranged in a hexagonal lattice shape, the minute concave portions or convex portions can be most densely arranged when the bottom shape of the minute concave portions or convex portions is circular. Further, a surface light source device without generating the diffracted light is obtained by controlling the arrangement direction and period of the minute concave portions or convex portions in like manner as the above-mentioned equation.

The ninth surface light source device of the invention is a surface light source device equipped with a light source and a transparent plate emitting light from a light emitting surface which is situated at the reverse side against an observation side surface by conducting light from the light source, wherein a plural number of minute concave portions or convex portions are randomly arranged on at least one of the observation side surface or the light emitting surface, and when the distribution of the distances of the mutual concave portions or the mutual convex portions which are adjacent with respect to the concave portions or convex portions is calculated, a distance K at which the frequency is the maximum satisfies the following equation:

$$K < \frac{\lambda \min}{n1 + n0}$$

(in which λmin represents a wavelength in vacuum of visible light with the shortest wavelength which is emitted from the light source, n1 represents the refractive index of the transparent plate, and n0: the refractive index of a medium which is brought in contact with the surface where the minute concave portions or convex portions of the transparent plate were arranged).

According to the ninth surface light source device of the invention, the diffracted light is not emitted from the surface of the transparent plate where the minute concave portions or convex portions were arranged. Accordingly, it can be prevented by preventing the generation of the diffracted light that both of the image light and the diffracted light are injected in the eyes of an observer and visibility is deteriorated.

The tenth surface light source device of the invention is a surface light source device equipped with a light source and a transparent plate emitting light from a light emitting surface which is situated at the reverse side against an observation side surface by conducting light from the light source, wherein a direction at which the luminous intensity of light emitted from the light emitting surface is the maximum is inclined for the normal line which was established on the light emitting surface, a plural number of minute concave portions or convex portions for prevention of reflection are randomly arranged on at least one of the observation side surface or the light emitting surface, and when the distribution of the distances of the mutual concave portions or the mutual convex portions which are adjacent with respect to the concave portions or convex portions is calculated, a distance K at which the frequency is the maximum satisfies the following equation:

$$K < \frac{\lambda \min}{n1 + n0 \cdot \cos\theta out}$$

(in which λmin represents a wavelength in vacuum of visible light with the shortest wavelength which is emitted from the light source, n1 represents the refractive index of the transparent plate, n0 represents the refractive index of a medium which is brought in contact with the surface where the minute concave portions or convex portions of the transparent plate were arranged, and θout represents an angle formed between a direction at which the luminous intensity of light emitted from the light emitting surface is the maximum and the normal line which was established on the light emitting surface).

According to the tenth surface light source device of the invention, since light is emitted from the light emitting surface of the transparent plate to an oblique direction, it can be prevented that the noise light which was normally reflected on the glass substrate and the like of a display device is reflected to an observer side. Further, since a distance K at which the frequency of the distribution of the distances of the mutual concave portions or the mutual convex portions is the maximum satisfies the above-mentioned equation, the diffracted light can hardly reach at an observer side even if the diffracted light is emitted from the light emitting surface of the transparent plate.

The eleventh surface light source device of the invention is a surface light source device equipped with a light source and a transparent plate emitting light from a light emitting surface which is situated at the reverse side against an observation side surface by conducting light from the light source, wherein a plural number of minute concave portions or convex portions are randomly arranged on at least one of the observation side surface or the light emitting surface, and when the distribution of the distances of the mutual concave portions or the mutual convex portions which are adjacent with respect to the concave portions or convex portions is calculated, a distance K at which the frequency is the maximum satisfies the following equation:

$$K < \frac{\lambda \min}{2 \cdot n1}$$

(in which λmin represents a wavelength in vacuum of visible light with the shortest wavelength which is emitted from the light source, and n1 represents the refractive index of the transparent plate).

According to the eleventh surface light source device of the invention, the diffracted light is not generated to the inside of the transparent plate on the surface of the transparent plate at observation side or on the light emitting surface. Since the diffracted light in the inside of the transparent plate is occasionally emitted to an observer side, it does not occur by preventing the diffracted light into the inside of the transparent plate that the visibility of a screen is deteriorated by the diffracted light.

The twelfth surface light source device of the invention is a surface light source device equipped with a light source and a transparent plate emitting light from a light emitting surface which is situated at the reverse side against an observation side surface by conducting light from the light source, wherein a plural number of minute concave portions or convex portions are randomly arranged on at least one of the observation side surface or the light emitting surface, and when the width of the concave portions or the convex portions is set as W, the width W satisfies the following equation:

$$W < \frac{\lambda \min}{n1 + n0}$$

(in which λmin represents a wavelength in vacuum of visible light with the shortest wavelength which is emitted from the light source, n1 represents the refractive index of the transparent plate, and n0 represents the refractive index of a medium which is brought in contact with the surface where the minute concave portions or convex portions of the transparent plate were arranged).

According to the twelfth surface light source device of the invention, the diffracted light is not emitted from the surface of the transparent plate where the minute concave portions or convex portions were arranged. Accordingly, both of the image light and the diffracted light are injected in the eyes of an observer by preventing the generation of the diffracted light, and it can be prevented to deteriorate visibility.

The thirteenth surface light source device of the invention is a surface light source device equipped with a light source and a transparent plate emitting light from a light emitting surface which is situated at the reverse side against an observation side surface by conducting light from the light source, wherein a direction at which the luminous intensity of light emitted from the light emitting surface is the maximum is inclined for the normal line which was established on the light emitting surface, a plural number of minute concave portions or convex portions are randomly arranged on at least one of the observation side surface or the light emitting surface, and when the width of the concave portions or the convex portions is set as W, the width W satisfies the following equation:

$$W < \frac{\lambda \min}{n1 + n0 \cdot \cos\theta_{out}}$$

(in which λmin represents a wavelength in vacuum of visible light with the shortest wavelength which is emitted from the light source, n1 represents the refractive index of the transparent plate, n0 represents the refractive index of a medium which is brought in contact with the surface where the minute concave portions or convex portions of the transparent plate were arranged, and θout represents an angle formed between a direction at which the luminous intensity of light emitted from the light emitting surface is the maximum and the normal line which was established on the light emitting surface).

According to the thirteenth surface light source device of the invention, since light is emitted to an oblique direction from the light emitting surface of the transparent plate, it can be prevented that noise light which was normally reflected on the glass substrate of a display device is reflected to an observer side, and the deterioration of the contrast of a screen can be prevented. Further, since the width W of the concave portions or convex portions satisfies the above-mentioned equation, the diffracted light can reach hardly at an observer side even if the diffracted light is emitted from the light emitting surface of the transparent plate.

The fourteenth surface light source device of the invention is a surface light source device equipped with a light source and a transparent plate emitting light from a light emitting surface which is situated at the reverse side against an observation side surface by conducting light from the light source, wherein a plural number of minute concave portions or convex portions are randomly arranged on at least one of the observation side surface or the light emitting surface, and when the width of the concave portions or the convex portions is set as w, the width W satisfies the following equation:

$$W < \frac{\lambda \min}{2 \cdot n1}$$

(in which λmin represents a wavelength in vacuum of visible light with the shortest wavelength which is emitted from the light source, and n1 represents the refractive index of the transparent plate).

According to the fourteenth surface light source device of the invention, the diffracted light is not generated to the inside of the transparent plate on the surface of the transparent plate at observation side or on the light emitting surface. Since the diffracted light in the inside of the transparent plate is occasionally emitted to an observer side, it does not occur by preventing the diffracted light into the inside of the transparent plate that the visibility of a screen is deteriorated by the diffracted light.

In an embodiment of the surface light source device according to claims 1 to 14 of the invention, when the depth of the concave portions or the height of the convex portions is set as H, a ratio H/W to the width W of the concave portions or convex portions satisfies the following equation:

$$H/W > 1.2.$$

Reflection coefficient in the minute concave portions or convex portions can be adequately reduced in the $12^{th}$ to $14^{th}$ surface light source device, by setting the aspect ratio of the concave portions or convex portions as H/W>1.2.

In another embodiment of the surface light source device according to claims 1 to 14 of the invention, a wavelength λmin in vacuum of visible light with the shortest wavelength which is emitted from the light source is 380 nm.

Since the wavelength λmin in vacuum of visible light with the shortest wavelength is 380 nm, the diffraction of visible light is suppressed and the visibility of a screen is not deteriorated by using 380 nm as λmin for determining the period of the concave portions or convex portions. However, since the wavelength in vacuum of visible light with the shortest wavelength is 420 nm for LED and the like, 420 nm may be used as the λmin value when LED is used as a light source.

In further another embodiment of the surface light source device according to claims 1 to 14 of the invention, the concave portions or convex portions are transcribed on at least one of the observation side surface or the light emitting surface. Since the transparent plate is generally prepared by injection molding and the like, it is difficult to simultaneously mold the minute concave portions or convex portions. Further, a film having the minute concave portions or convex portions can be bound with the transparent plate, but since a method of transcribing the minute concave portions or convex portions on the transparent plate has no fear of peeling in comparison with a method of binding a film on the transparent plate, durability is enhanced. Further, the method of transcription is easy for preparation because steps are little.

Further, the surface light source device of the invention is not limited to the combination with a reflection type display device, and the combination with a both surfaces type display device can be used, but in any case, the surface at observation side in the surface light source device of the invention means a surface of a direction at which the image light reflected by the display device is observed.

The first display device of the invention comprises the surface light source device according to claims 1 to 14 and a display panel preparing an image by reflecting light emitted from the surface light source. According to the display device, since the generation of the diffracted light together with the Fresnel reflection can be suppressed, the contrast of a screen can be improved and visibility can be bettered.

The second display device of the invention comprises the surface light source device according to claims 1 to 14 and a display panel preparing an image by reflecting light emitted from the light source device. Since the display device can also suppress the generation of the diffracted light together with the Fresnel reflection, the contrast of a screen can be improved and visibility can be bettered.

Further, the composition elements of the invention illustrated above can be combined as arbitrarily as possible.

According to the surface light source device of the invention, the Fresnel reflection can be not only suppressed, but also the generation of the diffracted light can be suppressed.

BRIEF DESCRIPTION OF THE DRAWINGS

FIG. 19 shows the basic vectors <d1>, <d2> and <d3>, an incident angle φ and the like.

FIG. 30A shows a schematic view of the pattern of the minute unevennesses having random shapes and arrangements, FIG. 30B shows components of the respective periods when the Fourier decomposition of the pattern of the minute unevennesses was carried out, and FIG. 30C shows the relation of intensity and the periods of respective components.

FIG. 32A shows a schematic view of an aspect in which the convex minute unevennesses having about the same shape and the same dimension are randomly arranged, and FIG. 32B shows a schematic view of an aspect in which the concave minute unevennesses having about the same shape and the same dimension are randomly arranged.

DESCRIPTION OF THE PREFERRED EMBODIMENTS

Reflection Type Liquid Crystal Display Device

Figure 1:
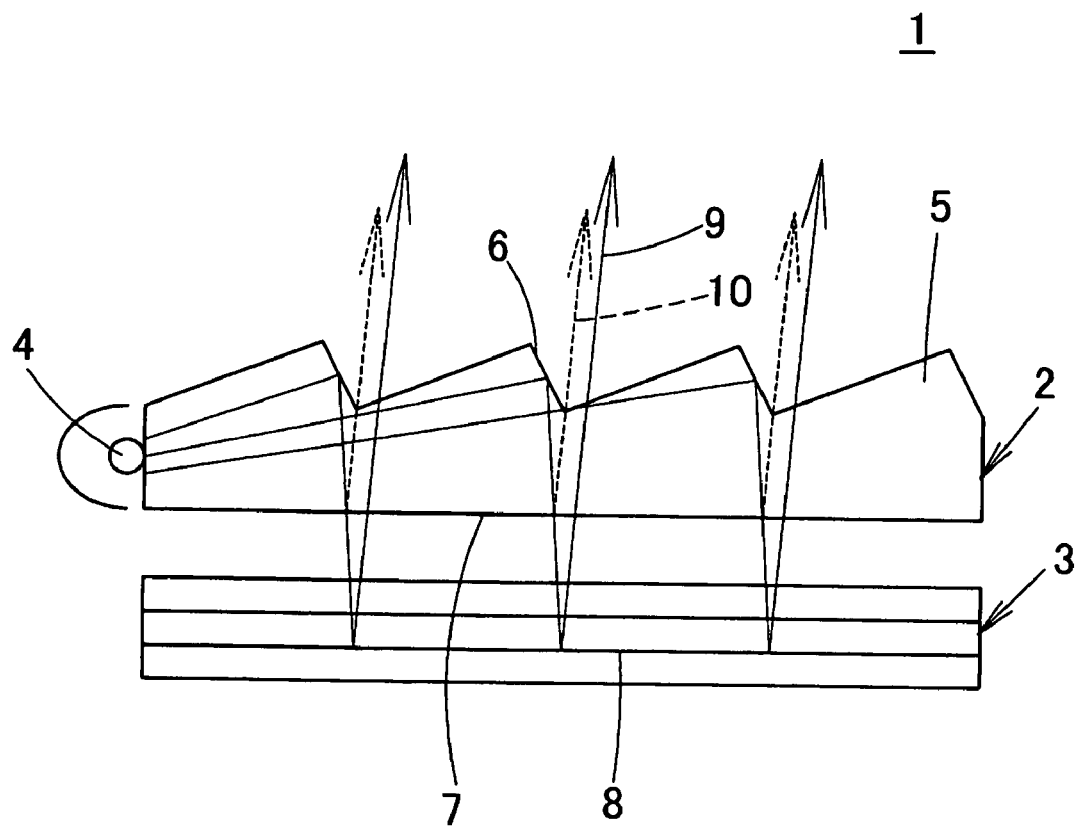
FIG. 1 shows a schematic sectional view of a conventional reflection type liquid crystal display device consisting of a front light and a reflection type liquid crystal display panel.
Figure 2:
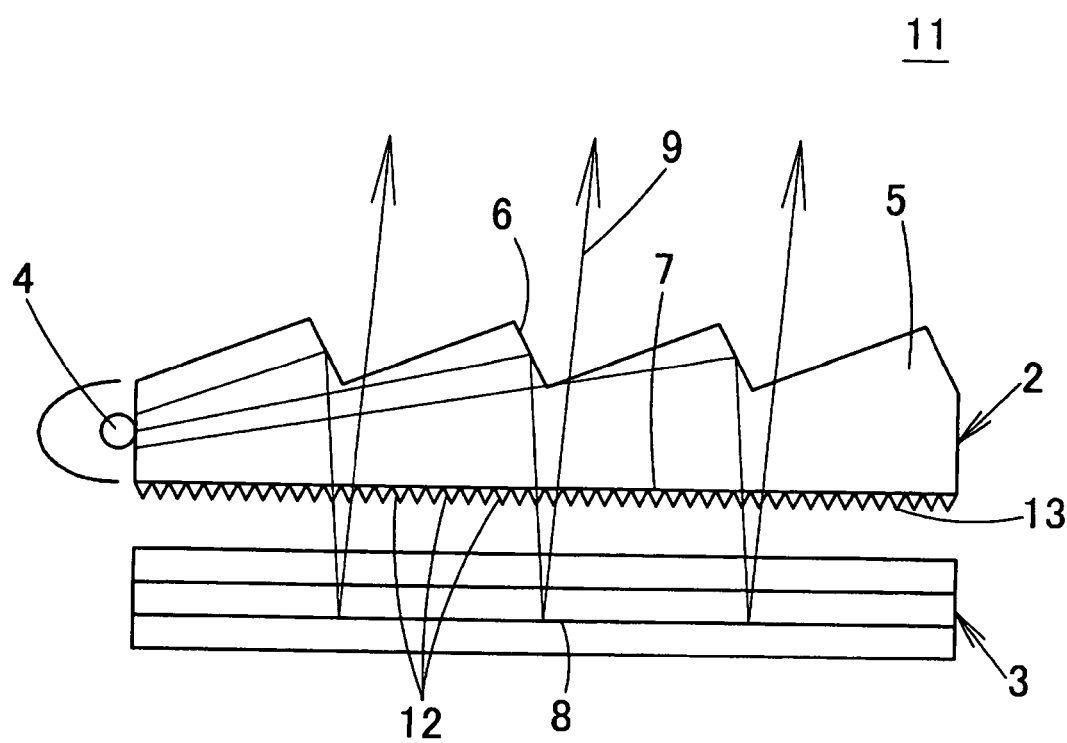
FIG. 2 shows a schematic sectional view of an another conventional reflection type liquid crystal display device equipped with reflection preventive patterns.
Figure 3:
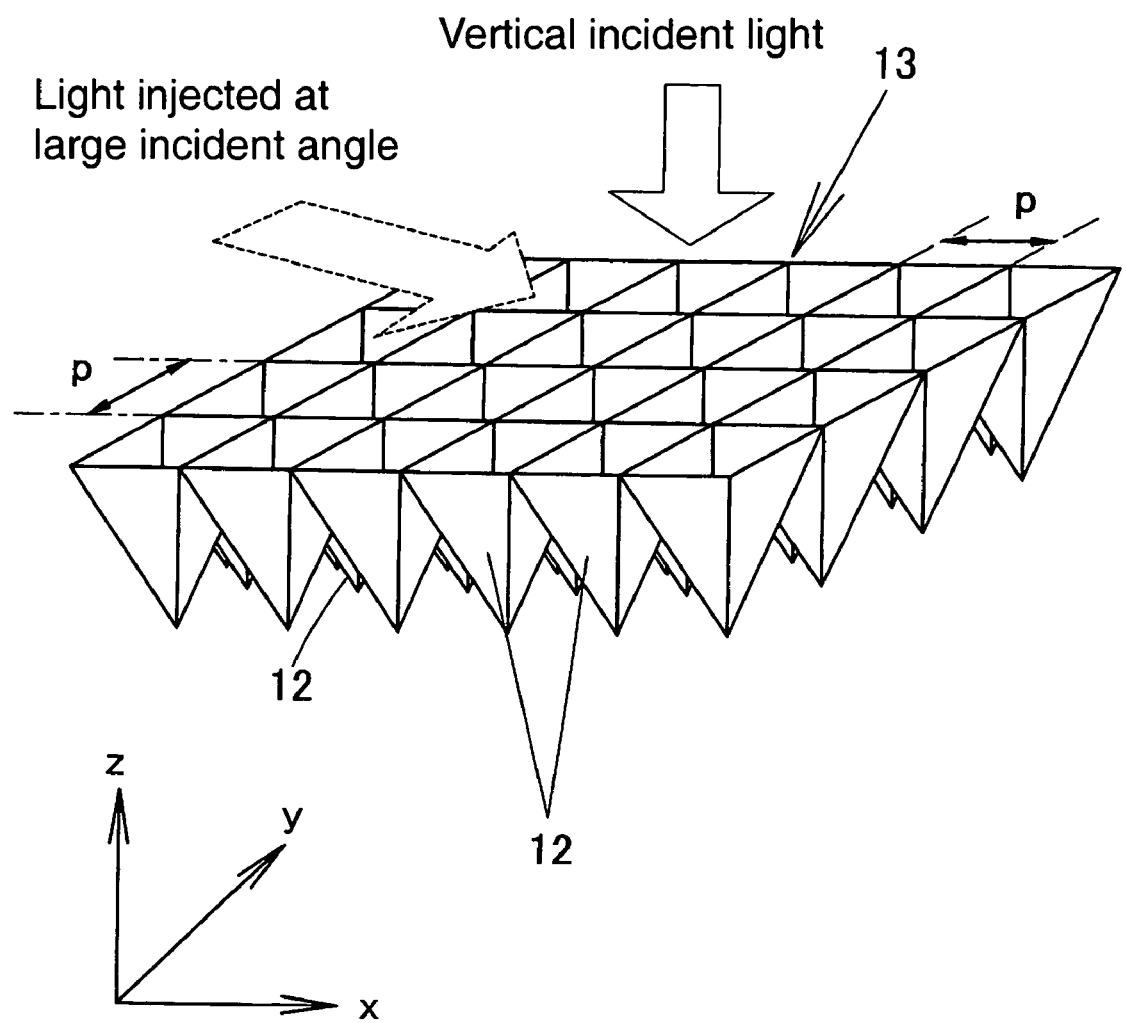
FIG. 3 shows a magnified perspective view of the contours of the reflection preventive patterns provided on the light emitting surface of the transparent plate.
Figures 4A, 4B:
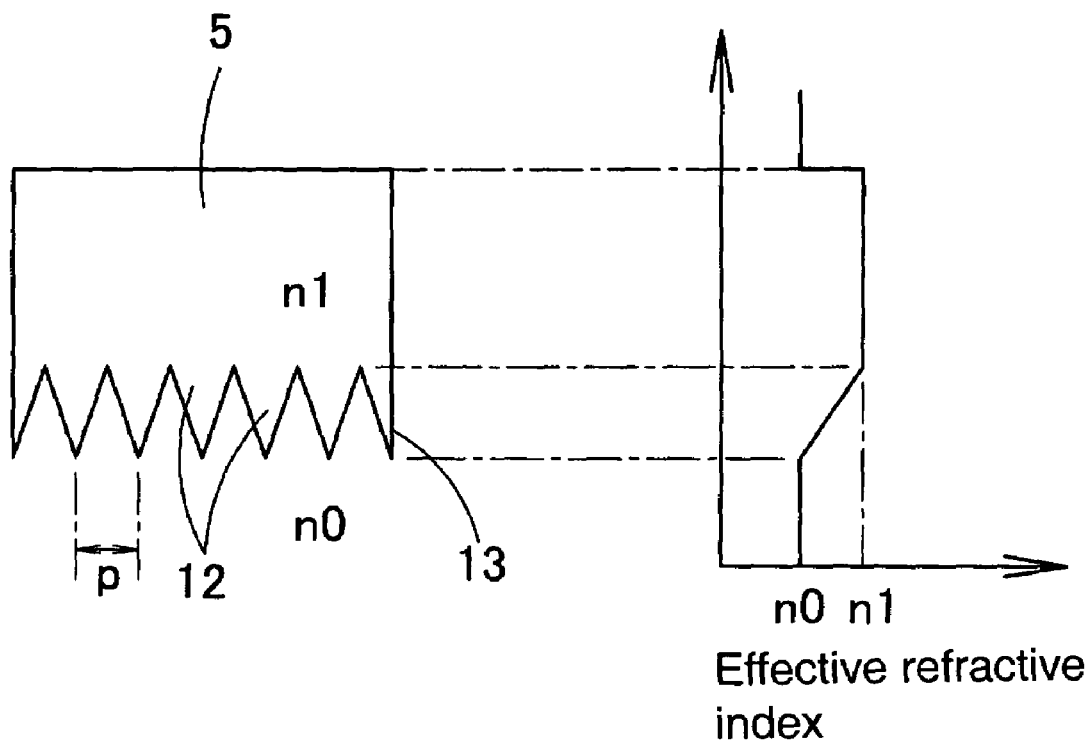
FIG. 4A and FIG. 4B show the action of the above-mentioned reflection preventive patterns.
Figure 5:
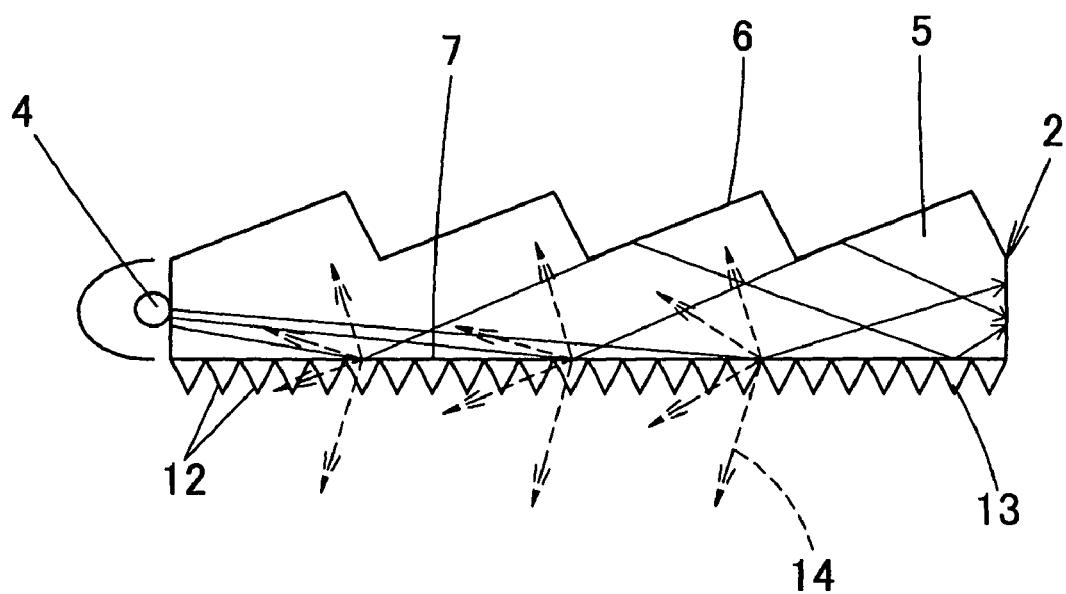
FIG. 5 shows the behavior of light in the front light.
Figure 6A:
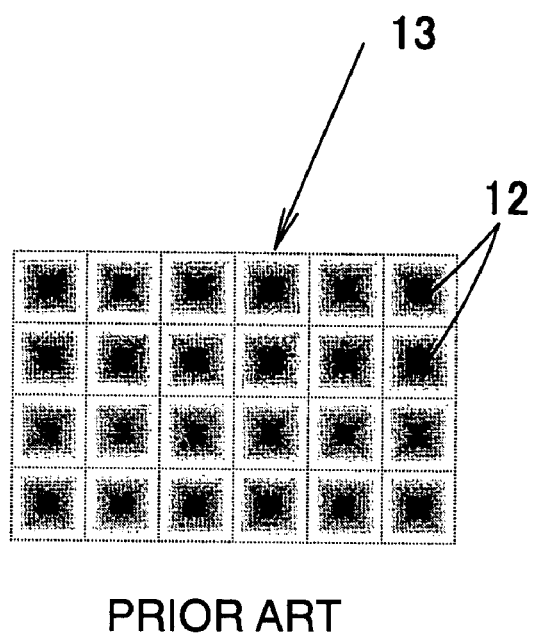
FIG. 6A shows a plane view of the distribution of effective refractive index in the reflection preventive patterns.
Figure 6B:
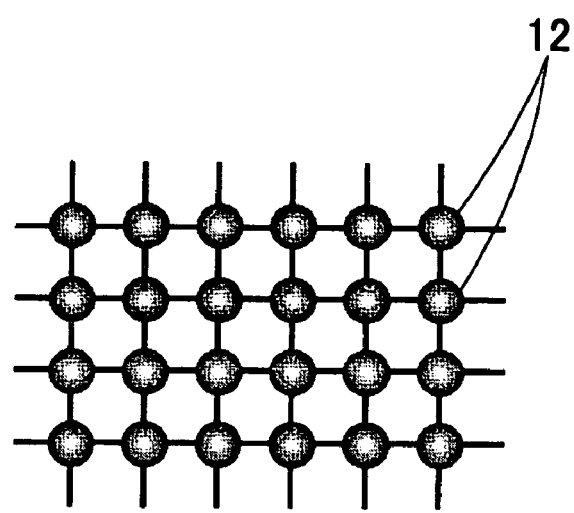
FIG. 6B shows an aspect in which the effective refractive index of the reflection preventive patterns was replaced with a lattice arrangement.
Figure 7:
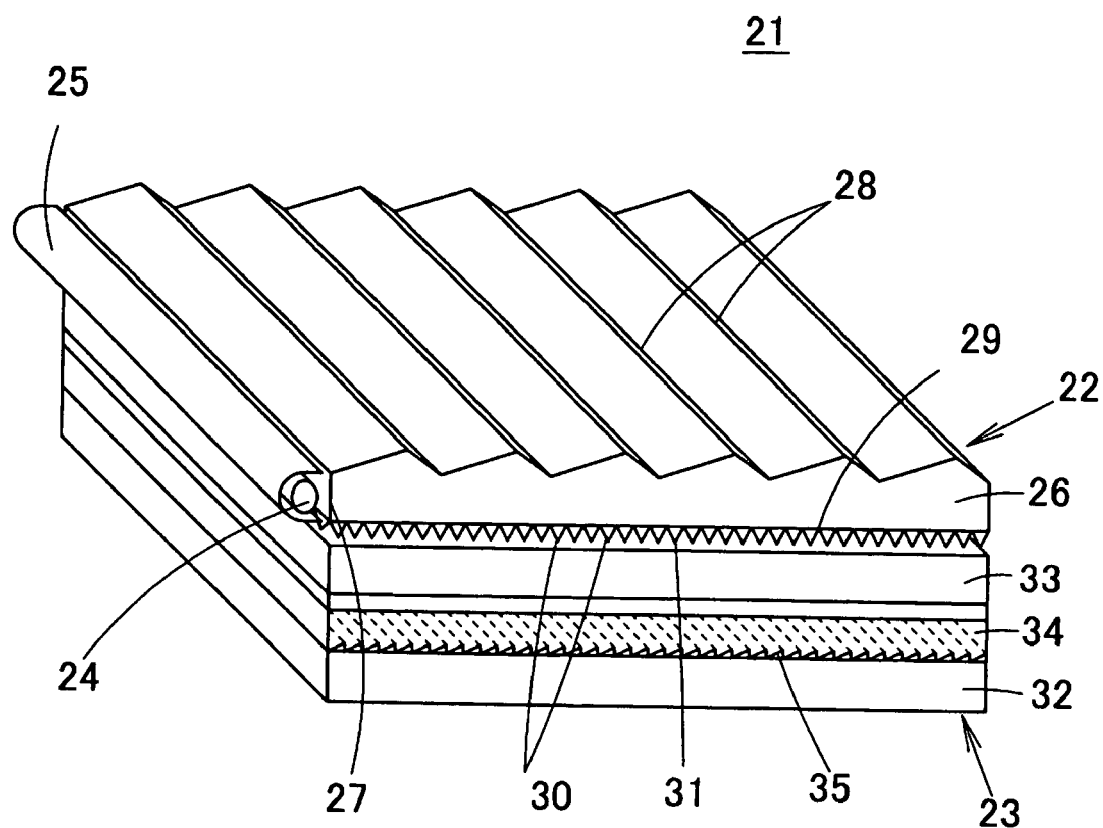
FIG. 7 shows the schematic perspective view of the reflection type liquid crystal display device related to the invention.
Figure 8:
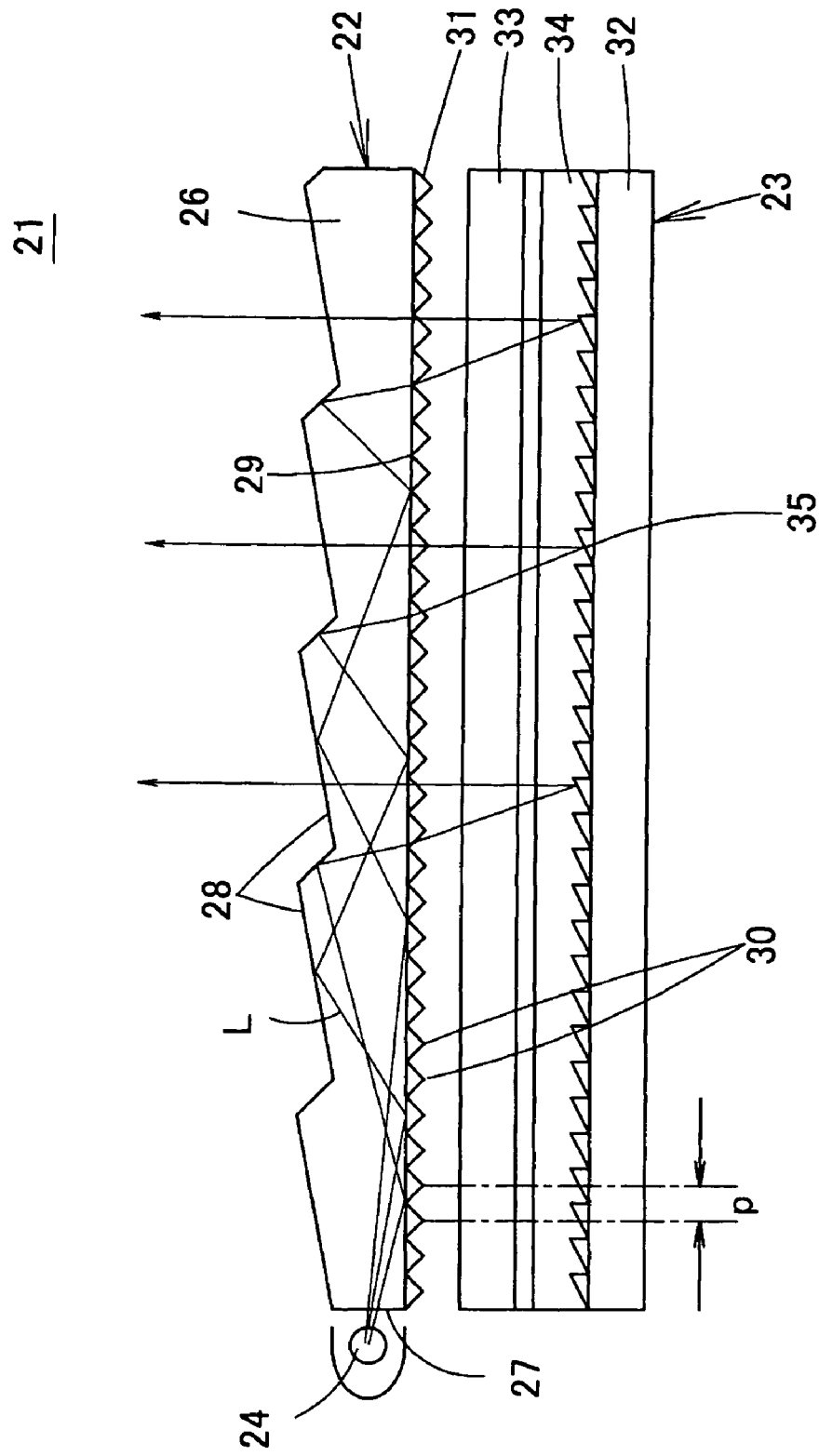
FIG. 8 shows the schematic sectional view of the same reflection type liquid crystal display device.

FIG. 7 is the schematic perspective view of the reflection type liquid crystal display device 21 using the surface light source device of the invention as a front light. FIG. 8 is a schematic sectional view thereof. The reflection type liquid crystal display device 21 comprises a front light 22 and a reflection type liquid crystal display panel 23, and the front light 22 is arranged at the front face side (observation side) of the reflection type liquid crystal display panel 23.

The front light 22 is composed of a light source 24 such as a linear light source, a reflector 25 covering the rear side of the light source 24, and a transparent plate 26 which was molded by a method such as an injection molding using a transparent resin such as a polycarbonate resin, an acryl resin and a methacryl resin. The linear light source includes a pseudo linear light source in which a plural number of LED's are arranged in one line in series, in addition to a long light source to one direction such as a cold cathode tube. The light source 24 is arranged at the outside of the transparent plate 26 or the outside of the effective emission zone in the inside of the transparent plate 26 so as to face the light injection surface 27 of the transparent plate 26.

A plural number of the deflection patterns 28 for carrying out total reflection of light transmitting in the inside of the transparent plate 26 which was emitted from the light source 24 are formed on the surface of the transparent plate 26. The deflection patterns 28 are arranged to a direction orthogonal to the length direction of the light source 24 and are a sectional jagged shape, and each of the deflection patterns 28 is extended in parallel with the length direction of the light source 24. In order to homogenize the intensity distribution of light emitted from the light emission surface 29 (the rear surface of the transparent plate) over the whole effective emission zone, the pattern surface density of the deflection patterns 28 is lessened nearby the light source 24, and the pattern surface density is gradually enlarged in accordance with separation from the light source 24.

Further, the transparent plate 26 may be formed in a wedge shape so that thickness is thinned in accordance with leaving from the light source 24, in place of forming the deflection patterns 28 on the surface of the transparent plate 26.

Reflection preventive patterns 31 are provided on the light emitting surface 29 of the transparent plate 26. The reflection preventive patterns 31 are composed of a plural number of the minute concave portions or convex portions (hereinafter, minute unevennesses) 30 which were molded over the whole rear surface of the transparent plate 26, the minute unevennesses 30 are two dimensionally arranged at a smaller period p than the wavelength $\lambda$min of visible light with the shortest wavelength among light emitted from the light source 24.

Figure 9:
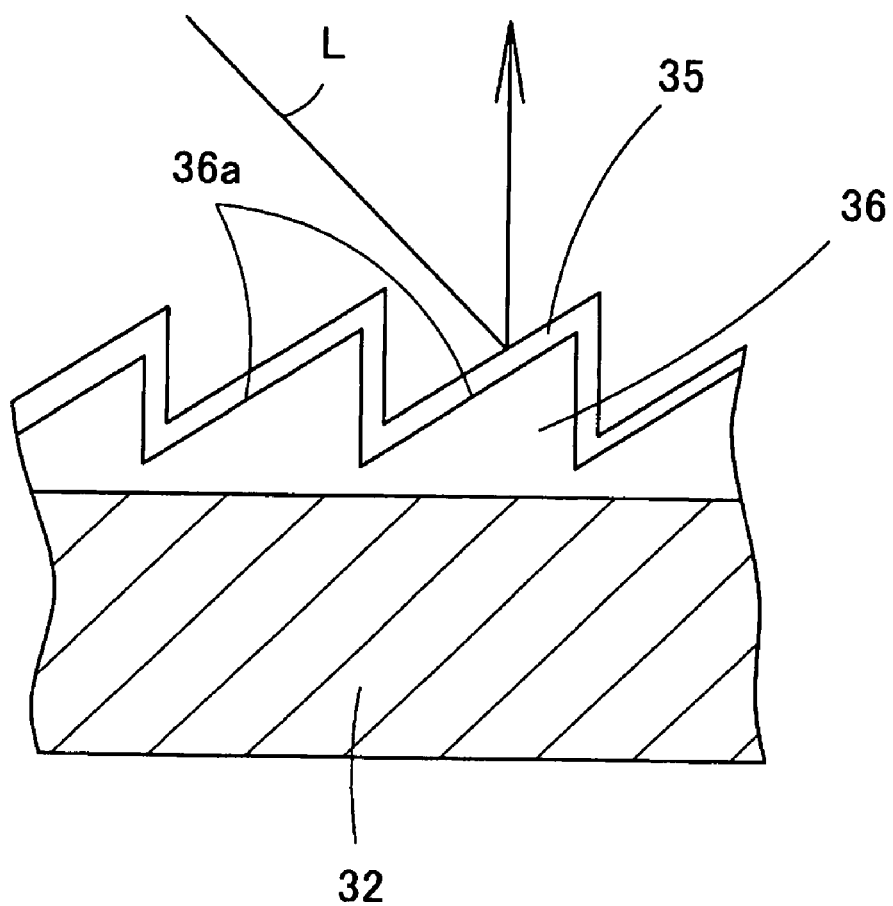
FIG. 9 shows a magnified sectional view of the structure of the reflection surface of the reflection type liquid crystal display panel.

The reflection type liquid crystal display panel 23 shown in FIG. 7 sealed a liquid crystal material 34 between a rear surface substrate 32 on which a TFT electrode was formed and a glass substrate 33 on which a transparent electrode was formed, and a reflection surface 35 is formed on the rear surface substrate 32. As shown in FIG. 9, an insulating material layer 36 is formed on the rear surface substrate 32, a plural number of slant patterns 36a which are the same shape are arranged, and the reflection surface 35 is formed by forming a metal deposition film such as aluminum on the surface of the insulating material layer 36. Further, although not illustrated, a deflecting plate and the like are provided on the glass substrate 33.

However, as shown in FIG. 8, when the light source 24 of the front light 22 is switched on, the light emitted from the light source 24 and injected in the transparent plate 26 (it is shown by an arrow mark. Hereinafter, it is similar.) is locked in the transparent plate 26, is transmitted to a direction leaving from the light source 24 while repeating the total reflection between the deflection patterns 28 (surface) and the transparent plate 26 (rear face), and is spread over the whole transparent plate 26. When the light L is totally reflected by the deflection patterns 28, proceeds to the light emitting surface 29 of the transparent plate 26, and obliquely emitted from the light emitting surface 29 to the liquid crystal display panel 23 to illuminate the liquid crystal display panel 23.

Further, when the light source 24 is not switched on and the liquid crystal display device 21 is illuminated by external light such as sun light, the external light which was obliquely injected from the surface of the transparent plate 26, passes the transparent plate 26, and is obliquely emitted from the light emitting surface 29 to illuminate the liquid crystal display panel 23.

When the light source 24 and the external light are obliquely emitted from the transparent plate 26, light L emitted passes the glass substrate 33 and liquid crystal material of the liquid crystal display panel 23 and is reflected on the reflection surface 35. Since the reflection surface 35 is inclined down to a direction to which the light emitted from the light emitting surface 29 is injected, the light L which was obliquely injected from the front light 22 is reflected by the reflection surface 35 to an about vertical direction. The image light which was reflected on the reflection surface 35 passes about vertically the liquid crystal material 34, the glass substrate 33, the transparent plate 26 and the like, emitted to the front side of a screen of the reflection type liquid crystal display device 21, and can enhance brightness to the frontal direction of the screen.

Herein, since the reflection preventive patterns 31 is formed at the light emitting surface 29 of the transparent plate 26, the Fresnel reflection on the rear surface of the transparent plate 26 is suppressed, and it is prevented that the contrast of the screen is lowered by noise light which was reflected on the rear surface of the transparent plate 26 by the Fresnel reflection.

Further, the diffracted light has been generated by providing reflection preventive patterns on the rear surface of a transparent plate in a conventional reflection type liquid crystal display device and has lowered the contrast of a screen, but in the reflection type liquid crystal display device 21, the diffracted light is designed so as to be not generated by optimizing the period and arrangement of the reflection preventive patterns 31 (the minute unevennesses 30), or is designed so as not to be emitted to an observer side even if the diffracted light is generated.

Figure 10:
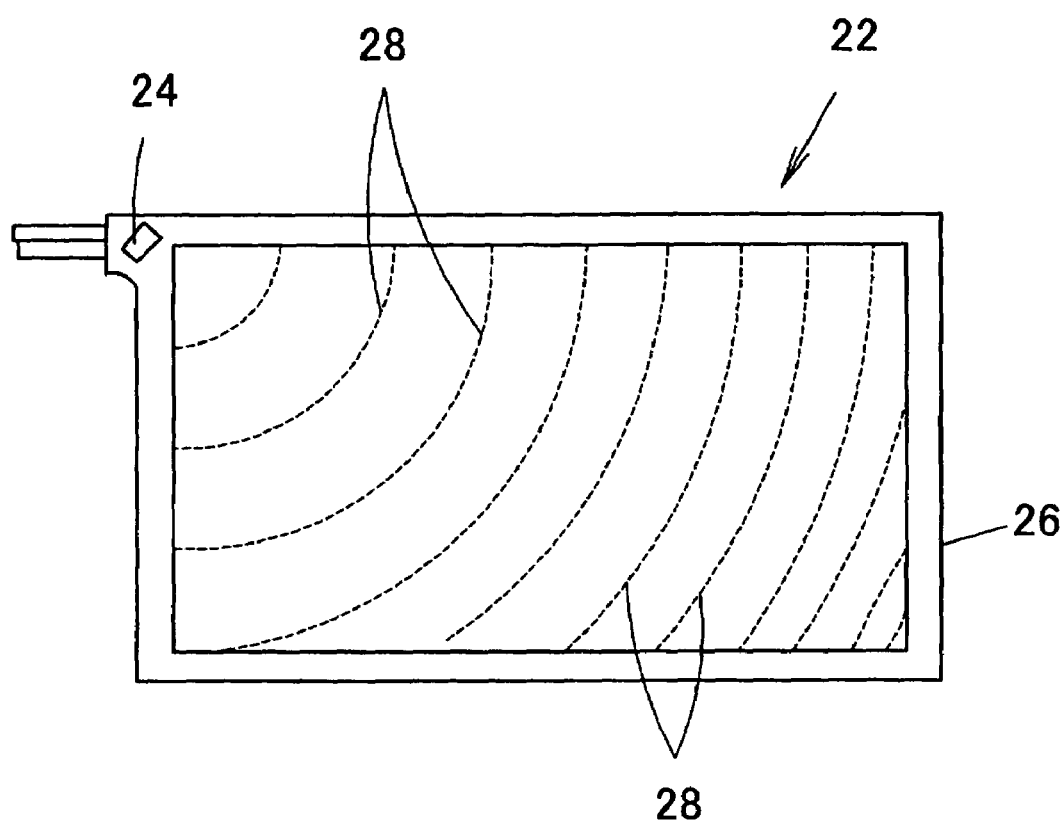
FIG. 10 shows a schematic plane view of one example of the front light using a point light source shape light source.

Further, in the above-mentioned embodiment, a case that a linear light source such as a cold cathode tube was used as the light source 24 was illustrated, but a point like light source consisting of one light emitting element or a plural number of localized light emitting elements such as LED may be used. FIG. 10 a schematic plane view showing one example of the front light 22 using the light source 24 of the point like light source. In the front light 22, the light source 24 of the point like light source is arranged at a central portion of one side or a corner where the transparent plate 26 is situated, and the deflection patterns 28 on the surface of the transparent plate 26 are also dispersedly provided in a cocentric shape centering the light source 24.

Further, the minute unevennesses 30 which compose the above-mentioned reflection preventive patterns 31 may be provided not on the light emitting surface 29 but on the surface of the transparent plate 26 on which the deflection patterns 28 are provided. Alternatively, the minute unevennesses 30 may be provided on both of the surface and the rear surface of the transparent plate 26. When the minute unevennesses 30 are provided at a period of the shortest wavelength or less of visible light on the surface (face at observation side) of the transparent plate 26, it can be suppressed that external light is reflected on the face at observation side of the transparent plate 26, and it can be suppressed that the contrast is lowered by the reflecting of a surrounding scene and reflection.

The suppressing method of the diffracted light of the invention is illustrated below by every embodiment, referring to the example of the above-mentioned reflection type liquid crystal display device 21. The first to third embodiments illustrate the method of suppressing the generation of the diffracted light irrespective of the arrangement direction of the reflection preventive patterns 31. The fourth to seventh embodiments illustrate the method of suppressing the diffraction by optimizing the arrangement direction of the reflection preventive patterns 31. Further, a face parallel to the reflection preventive patterns 31 is occasionally called as an xy plane, a direction vertical to the light source is occasionally called as an x axis direction, a direction parallel to the length direction of the light source is occasionally called as a y direction, and a direction vertical to the light emitting surface 29 is occasionally called as a z direction.

First Embodiment

Figure 11:
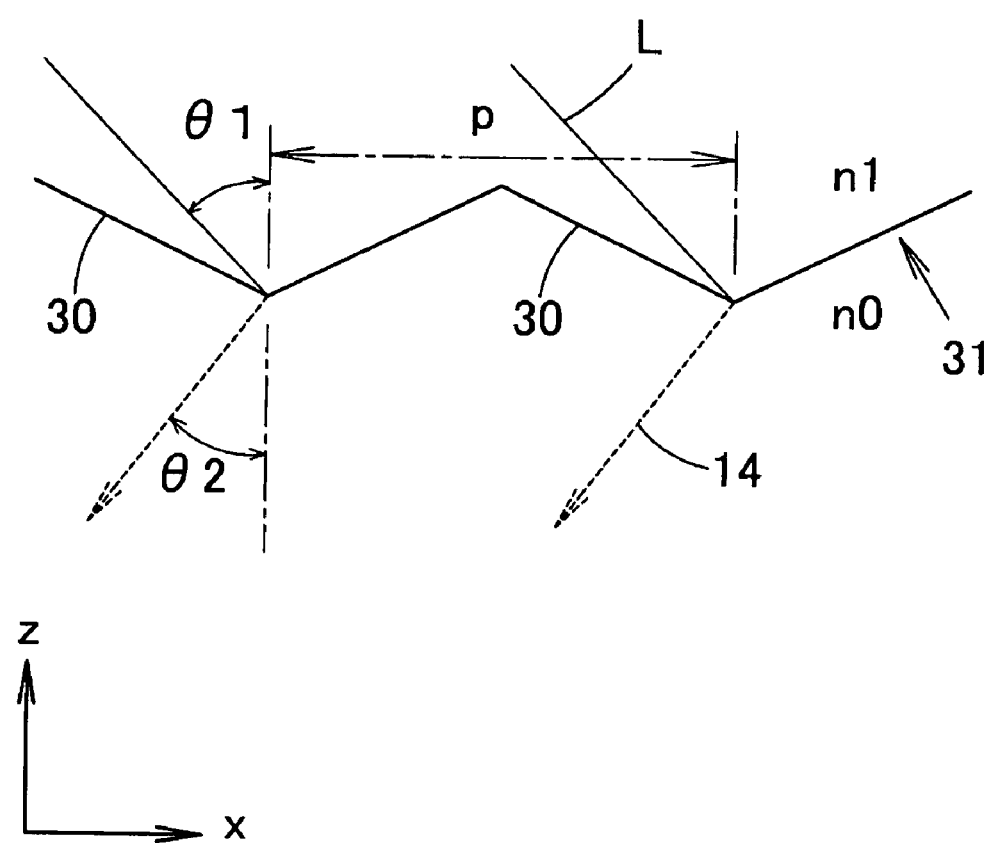
FIG. 11 shows the schematic sectional view of the minute unevennesses illustrating the first embodiment of the invention.

The first embodiment suppresses the generation of the diffracted light irrespective of the arrangement direction of the reflection preventive patterns 31. Namely, the minute unevennesses 30 which were two-dimensionally arranged can be considered as that the minute unevenness row which was arranged in one line is periodically repeatedly arranged. When light parallel to a plane vertical to the minute unevenness rows and the light emitting surface 29 was injected on the reflection preventive patterns 31, it was designed so as not to be diffracted. FIG. 11 is a view illustrating the first embodiment, and represents a section in magnification when the reflection preventive patterns 31 was cut with a plane vertical to the minute unevenness rows and the reflection preventive patterns 31. The first embodiment is illustrated using FIG. 11.

As shown in FIG. 11, the incident angle of the light L which is injected on the minute unevennesses 30 is set as $\theta 1$, the diffraction angle (the emission angle of the diffracted light measured from a direction vertical to the transparent plate 26) of the diffracted light 14 as $\theta 2$, the refractive index of a transparent plate material as n1, the refractive index of air as n0, and the period of the minute unevennesses as p. However, the incident angle $\theta 1$ of incident light is a positive value when the light is injected from the light source side, and the diffraction angle $\theta 2$ of the diffracted light 14 is a positive value when the light is emitted to the light source side.

Now, as shown in FIG. 11, the difference of the optical path length of the diffracted light 14 which is injected on the minute unevennesses 30 from the light source side and emitted to the light source side is determined in the adjacent minute unevennesses 30.

Difference of optical path length=$(n1 \cdot p \sin \theta 1 + n0 \cdot p \sin \theta 2)$ Accordingly, a condition by which light with a wavelength of λ in vacuum is intensified by diffraction is as the following equation.

$$p \cdot (n1 \cdot \sin \theta 1 + n0 \cdot \sin \theta 2) = m\lambda \quad (1)$$

(in which m=±1, ±2, . . . )

The maximum value of the absolute value of the left side of the above-mentioned equation (1) is required not to exceed the minimum value of the absolute value of the right side so that all lights with an incident angle θ1 which are conducted in the transparent plate 26 are not diffracted. When a wavelength of visible light with the shortest wavelength among lights which are emitted from the light source 24 is set as λmin, the minimum value of the absolute value of the right side of the equation (1) is λmin. On the other hand, the maximum value of the absolute value of the left side is p·(n1+n0) by assuming θ1=θ2=90°. Accordingly, it is grasped that the following equation (2) is required to be satisfied so that lights to all directions which are conducted in the transparent plate 26 are not diffracted.

$$p < \lambda\min/(n0+n1) \quad (2)$$

Since light with a wavelength of 380 nm or less is not visually confirmed by the human sense of sight, λmin is 380 nm, the refractive index n1 of the transparent plate 26 is 1.5, and the refractive index n0 of air is 1. Then, the above-mentioned equation (2) is as follows.

$$p < 152 \text{ nm}$$

Consequently, in the first embodiment, the period (pitch) p of the minute unevennesses 30 which compose the reflection preventive patterns 31 is formed so as to be less than the value determined by the right side of the above-mentioned equation (2). As a result, since the diffracted light is not emitted from the light emitting surface 29 of the transparent plate 26, the diffracted light is not emitted to an observer side, and the contrast of a screen can be enhanced to improve the visibility of the reflection type liquid crystal display device 21.

Further, in the first embodiment, a case that light parallel to a plane vertical to the minute unevenness rows and the light emitting surface 29 was injected on the reflection preventive patterns 31 was calculated, but the diffracted light is not emitted so far as the period p of the minute unevennesses 30 satisfies the above-mentioned relational equation, irrespective of the injection direction of light. Further, the pitch is occasionally different depending on a method of selecting the minute unevennesses 30, but either of the selecting methods may be well so far as the pitch satisfies the above-mentioned equation (2). However, when the injection direction of light is about constant when it is viewed from a direction vertical to the light emitting surface 29, the diffracted light is hardly emitted so far as the period p of the minute unevennesses 30 satisfies the above-mentioned equation (2) with respect to the minute unevennesses 30 vertical to the injection direction.

Figure 12:
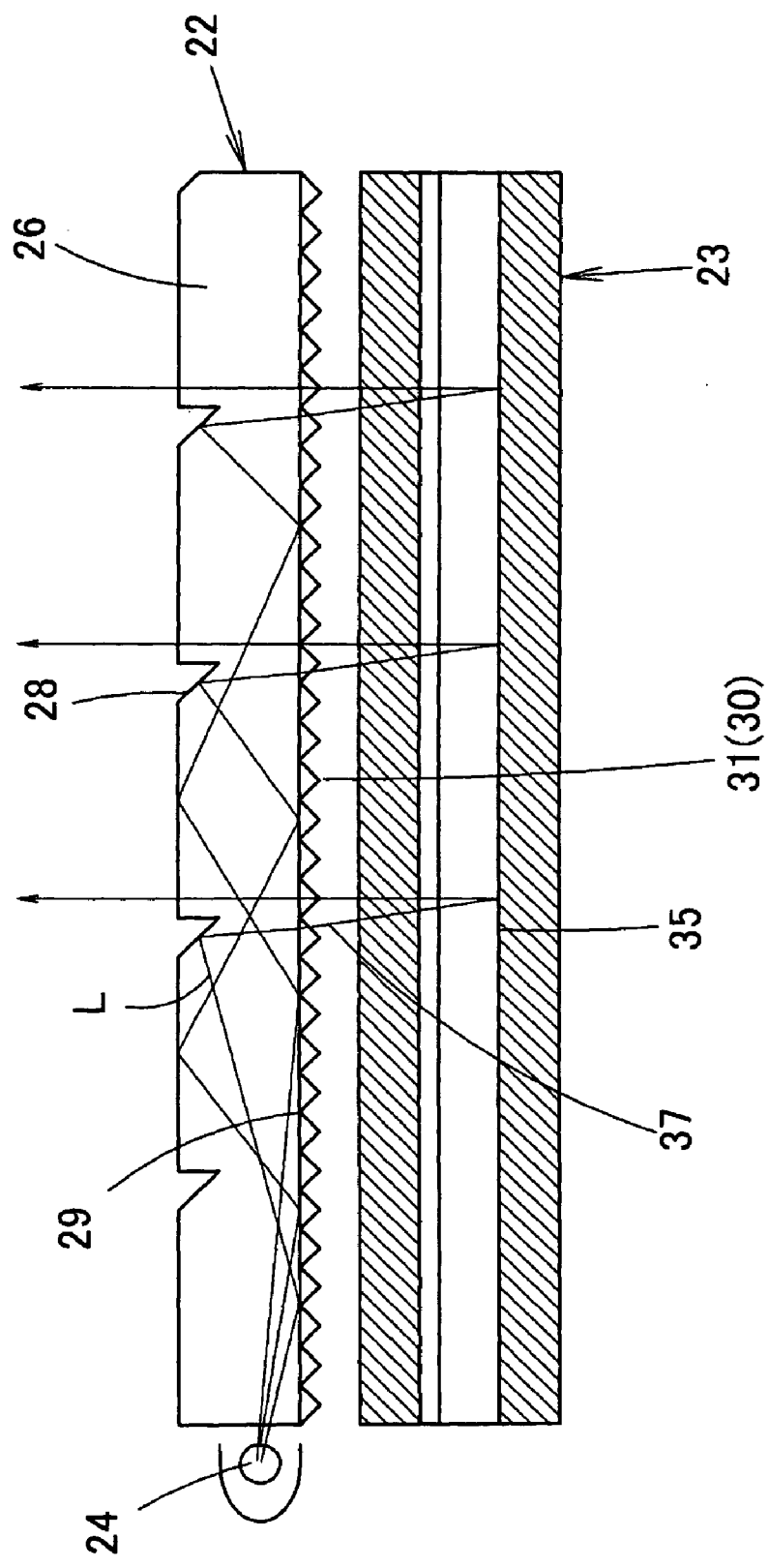
FIG. 12 shows a sectional view of the same reflection type liquid crystal display device which emits vertically illumination light from the light emitting surface of the transparent plate.

Further, as shown in FIG. 12, the first embodiment or the above-mentioned equation (2) is also applied to a case that illumination light 37 is vertically emitted from the light emitting surface 29 of the front light 22.

Second Embodiment

Figure 13:
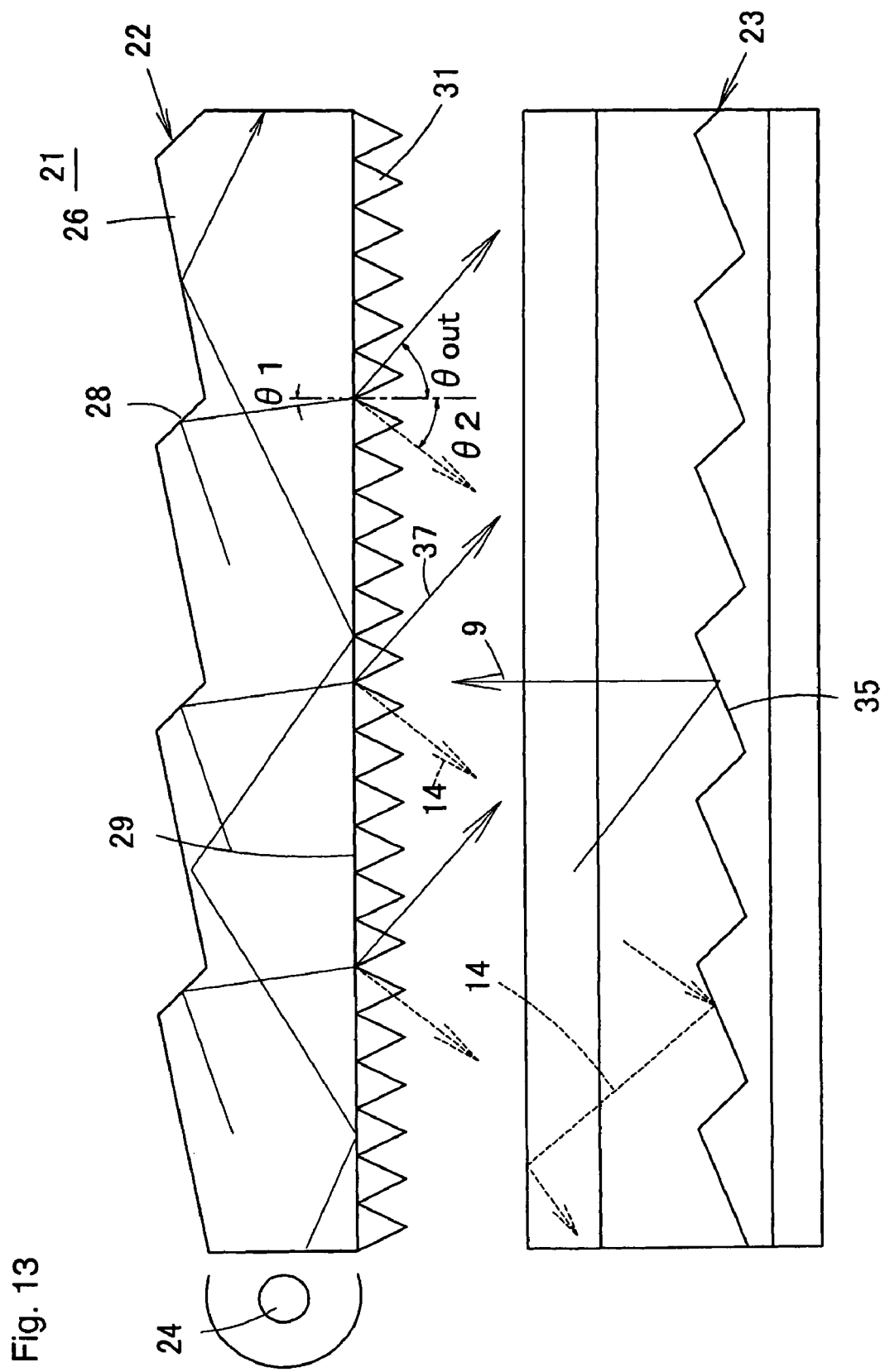
FIG. 13 shows the side view of the reflection type liquid crystal display device for illustrating the second embodiment of the invention.

The second embodiment does not generate the diffracted light at a fixed direction, and even if the diffracted light is generated on the reflection preventive patterns 31 at a direction other than it, the diffracted light is designed so as not to be emitted to the same direction as image light. FIG. 13 is a view illustrating the second embodiment and the sectional view of the reflection type liquid crystal display device 21. The second embodiment is illustrated using FIG. 11.

Figure 14:
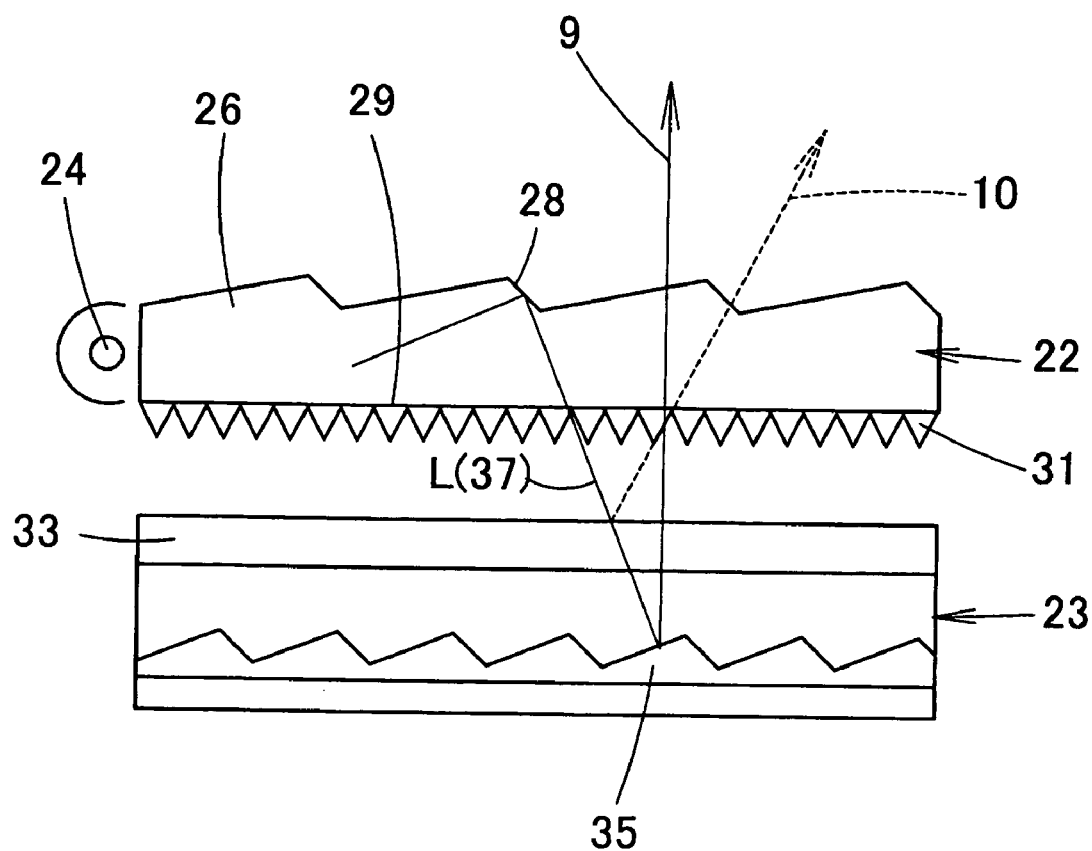
FIG. 14 shows the action of the same above second embodiment.

Noise light lowering the contrast of a screen is generated by not only the Fresnel reflection on the light emitting surface 29 of the front light 22, but also the Fresnel reflection on the surface of the glass substrate 33 of the liquid crystal display panel 23 and a deflecting plate. Accordingly, the above-mentioned reflection type liquid crystal display device 21 emits obliquely the light L from the light emitting surface 29 of the front light 22, reflects vertically the light L on the slant reflection surface 35 of the liquid crystal display panel 23, and emits the image light 9 to an observer side. As shown in FIG. 14, when the light L is obliquely emitted from the light emitting surface 29 of the front light 22 to the liquid crystal display panel 23, the noise light 10 reflected is reflected to a slant direction even if the light L is reflected on the surface of the glass substrate 33 of the liquid crystal display panel 23 and a deflecting plate; therefore the noise light 10 is not emitted to the same direction as the image light 9 and the contrast of an image is not lowered.

At this time, even if the diffracted light 14 is emitted from the reflection preventive patterns 31, when the emission direction of the diffracted light 14 forms an angle of 90° or more against the illumination light 37 as shown in FIG. 13, the diffracted light 14 is reflected on the reflection surface 35 even if the diffracted light 14 is injected in the liquid crystal display panel 23. Accordingly, the diffracted light 14 is injected on the surface of the glass substrate 33 of the liquid crystal display panel 23 to be totally reflected, and the diffracted light 14 is hardly emitted from the liquid crystal display panel 23.

Consequently, when an angle formed between a direction in which the luminous intensity of the illumination light 37 which is emitted from the light emitting surface 29 of the front light 22 is the maximum and the normal line of the light emitting surface 29 is as θout, it is enough that the diffracted light 14 is not generated at a direction forming an angle of 90° or less against the illumination light 37. Namely, when the diffraction angle of the diffracted light 14 is θ2, it is appropriate to satisfy the equation (1) under a condition of the following equation.

$$\theta 2 + \theta\text{out} < 90°$$

In this case, the following equation may be satisfied.

$$\sin\theta 2 < \sin(90° - \theta\text{out}) = \cos\theta\text{out}$$

Considering it in like manner as the first embodiment, the condition by which the diffracted light 14 is not generated to a direction forming an angle of 90° or less against the illumination light 37 is represented by the following equation (3).

$$p < \lambda\min/(n1 + n0 \cdot \cos\theta\text{out}) \quad (3)$$

Herein, p is the period of the minute unevennesses 30, n1 is the refractive index of the transparent plate material, n0 is the refractive index of air, and λmin is a wavelength of visible light with the shortest wavelength which is emitted from the light source 24.

For example, when λmin=380 nm, θout=30°, the refractive index of the transparent plate is n1=1.5 and the refractive index of air is n0=1, the above-mentioned equation (3) is as follows.

$$p < 160 \text{ nm}$$

Consequently, in the second embodiment, the period (pitch) p of the minute unevennesses 30 which compose the reflection preventive patterns 31 is formed so as to be less than the value determined by the right side of the above-mentioned equation (3). As a result, since the diffracted light is not emitted to a direction forming 90° or less against the illumination light 37, and even if the diffracted light 14 is emitted to a direction forming 90° or more against the illumination light 37, the diffracted light is not emitted to an observer side; therefore the contrast of a screen can be enhanced to improve the visibility of the reflection type liquid crystal display device 21.

Further, when θout=30° in the above-mentioned equation (3) (when it is vertically emitted from the light emitting surface 29), the above-mentioned equation (3) is coincided with the above-mentioned equation (2).

Further, the injection direction of light is not required to be vertical to the minute unevennesses and the light emitting surface 29, and the diffracted light is not emitted to a fixed direction so far as the period p of the minute unevennesses 30 satisfies the above-mentioned relational equation, irrespective of the injection direction of light. Further, the pitch is occasionally different depending on a method of selecting the minute unevennesses, but either of the selecting methods may be well so far as the pitch satisfies the above-mentioned equation (3). However, when the injection direction of light is about constant when it is viewed from a direction vertical to the light emitting surface 29, the diffracted light is hardly emitted to a fixed direction so far as the period p of the minute unevennesses 30 satisfies the above-mentioned equation (3) with respect to the minute unevennesses vertical to the injection direction.

Third Embodiment

Figure 15:
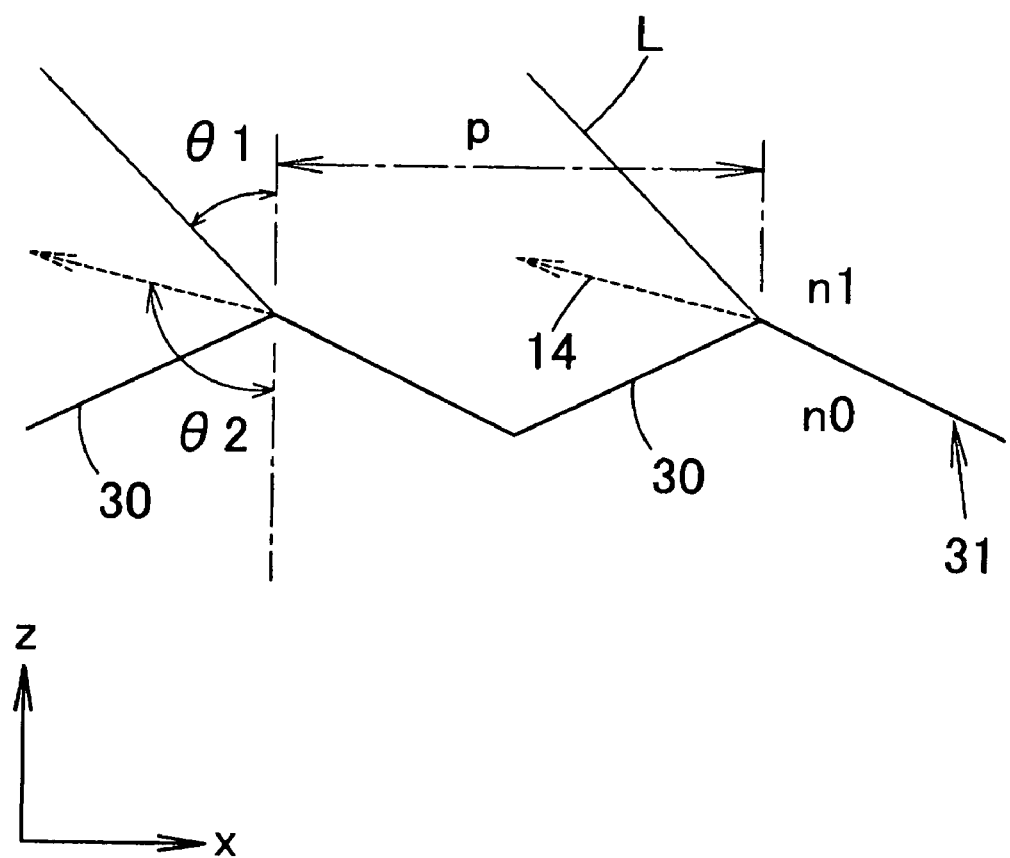
FIG. 15 shows the magnified sectional view of the minute unevennesses illustrating the third embodiment of the invention.

The third embodiment is a device in which the diffracted light by the reflection preventive patterns 31 is not also generated in the inside of the transparent plate 26. FIG. 15 is a view illustrating the third embodiment and represents by magnifying a section (xz section of the adjacent two minute unevennesses 30) of the portion of the reflection preventive patterns 31. The third embodiment is illustrated using FIG. 15.

As shown in FIG. 15, the difference of the optical path length of the diffracted light 14 which is injected on the minute unevennesses 30 from the light source side in the transparent plate 26 and emitted to the light source side in the transparent plate 26 is determined in the adjacent minute unevennesses 30.

$$\text{Difference of optical path length} = n1 \cdot p \sin \theta 1 + n1 \cdot p \sin(180° - \theta 2) = n1 \cdot p \sin \theta 1 + n1 \cdot p \sin \theta 2$$

In the above equation, θ1 is an incident angle measured from the normal line which was raised on the light emitting surface 29 in the transparent plate 26, and θ2 is a diffraction angle measured from the normal line which was raised on the light emitting surface 29 outside the transparent plate 26 (this is similar as the first embodiment). Accordingly, a condition by which light with a wavelength of λ in vacuum is intensified by diffraction is as the following equation (4).

$$p \cdot n1(\sin \theta 1 + \sin \theta 2) = m\lambda \qquad (4)$$

(in which m=±1, ±2, ... )

The maximum value of the absolute value of the left side of the above-mentioned equation (4) is required not to exceed the minimum value of the absolute value of the right side so that the diffracted light 14 is not generated in the transparent plate 26. When a wavelength of visible light with the shortest wavelength among lights which are emitted from the light source 24 is set as λmin, the minimum value of the absolute value of the right side of the equation (4) is λmin. On the other hand, the maximum value of the absolute value of the left side is $2p \cdot n1$ by assuming θ1=θ2=90°. Accordingly, it is grasped that the following equation (5) is required to be satisfied so that the diffracted light 14 is not generated in the transparent plate 26.

$$p < \lambda \text{min}/(2 \cdot n1) \qquad (5)$$

Herein, p is the period of the minute unevennesses 30, and n1 is the refractive index of the transparent plate material.

For example, when λmin=380 nm and the refractive index of the transparent plate 26 is n1=1.5, the above-mentioned equation (5) is as follows.

$$p < 127 \text{ nm}$$

Consequently, in the third embodiment, the period (pitch) p of the minute unevennesses 30 which compose the reflection preventive patterns 31 is formed so as to be less than the value determined by the right side of the above-mentioned equation (5). As a result, since the diffracted light is not also emitted in the transparent plate 26, the diffracted light 14 is not emitted to an observer side, and the contrast of a screen can be enhanced to improve the visibility of the reflection type liquid crystal display device 21.

Further, since n1>n0, the following equation is obtained.

$$p < \lambda \text{min}/(2 \cdot n1) < \lambda \text{min}/(n0 + n1)$$

It can be grasped that the diffracted light is not also generated at the outside of the transparent plate 26 because it satisfies also the equation (2) of the first embodiment if it satisfies the above-mentioned equation (5).

Further, the third embodiment or the above-mentioned equation (5) is also applied to a case that illumination light 37 is vertically emitted from the light emitting surface 29 of the front light 22, in like manner as the first embodiment.

Further, the injection direction of light is not required to be vertical to the minute unevennesses and the light emitting surface 29, and the diffracted light is not emitted so far as the period p of the minute unevennesses 30 satisfies the above-mentioned relational equation, irrespective of the injection direction of light. Further, the pitch is occasionally different depending on a method of selecting the minute unevenness rows, but either of the selecting methods may be well so far as the pitch satisfies the above-mentioned equation (3). However, when the injection direction of light is about constant when it is viewed from a direction vertical to the light emitting surface 29, the diffracted light is hardly emitted to a fixed direction so far as the period p of the minute unevennesses 30 satisfies the above-mentioned equation (3) with respect to the minute unevennesses about vertical to the injection direction.

Fourth Embodiment

The fourth embodiment is a device in which even the minute unevennesses 30 with a large period do not generate diffraction by optimizing the arrangement direction of the reflection preventive patterns 31. Herein, calculation was carried out under a condition that light conducted in a bout parallel to the light emitting surface is diffracted on the reflection preventive patterns 31 and emitted in about parallel to the light emitting surface 29 in the inside of the transparent plate 26. At this time, since the difference of optical path length becomes largest, it is enough to determine the arrangement direction of the minute unevennesses and the period of the minute unevennesses which do not generate the diffraction under the condition. Since the thickness of the lattice (the height of the minute unevennesses 30) is small on the xz plane vertical to the light emitting surface 29, it could be treated as mono dimensional diffraction gratings as described above, but in the xy plane parallel to the light emitting surface 29, since the thickness of lattice (the length and width of the light emitting surface 29) is large, it must be treated as Bragg diffraction.

Figure 16:
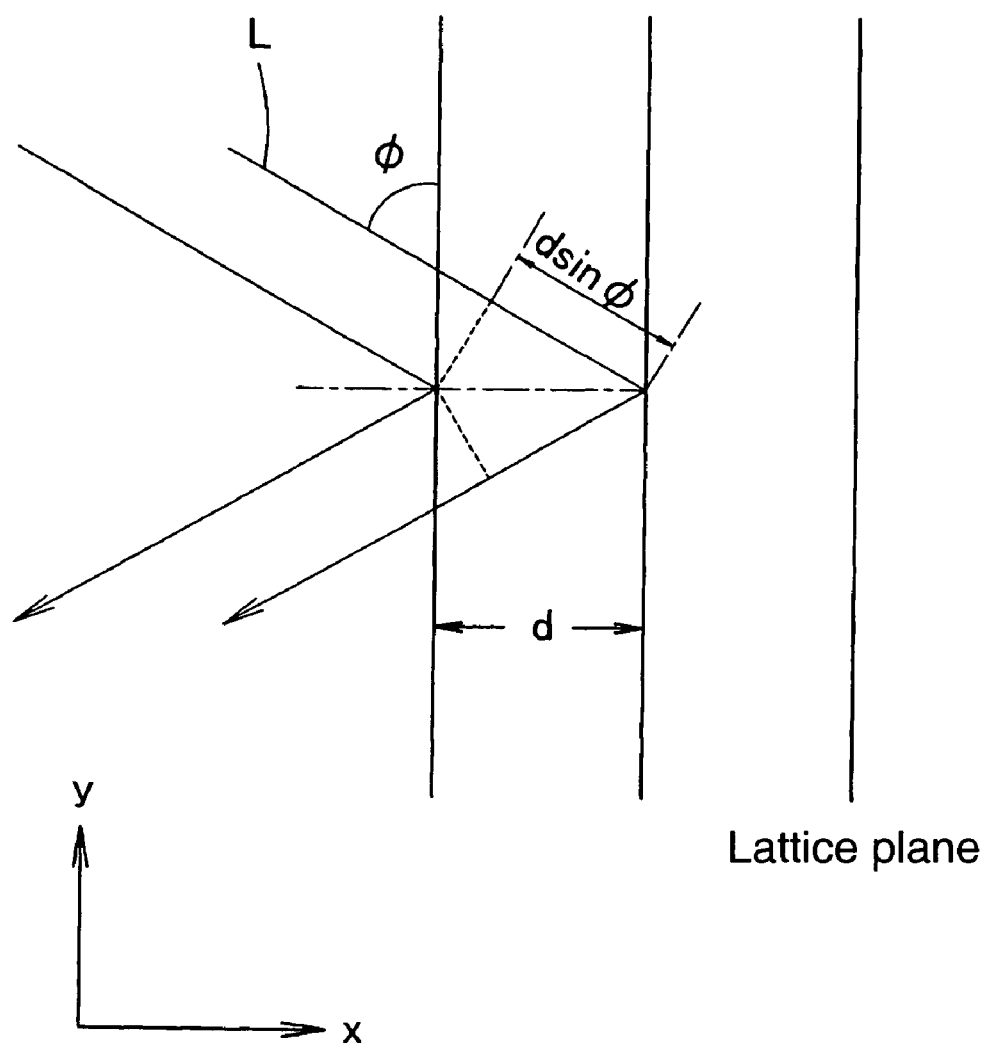
FIG. 16 shows the Bragg diffraction in the fourth embodiment of the invention.

In the Bragg diffraction, it is generally assumed that the incident angle of the light L which was injected in the diffraction grating and the emission angle of the reflected light are equal. At this time, as shown in FIG. 16, the difference of the optical path length of light which is injected in the diffraction grating with the interval d between lattice planes and reflected at the adjacent lattice plane is 2d sin φ. However, the incident angle φ in this case shall be measured from lattice planes. Accordingly, when the wavelength of light is set as λ in the Bragg diffraction, the reflected light intensifies in case of satisfying the following condition (Bragg's diffraction condition).

$$2 \cdot n1 \cdot d \sin \phi = q \ (q=1, 2, \ldots) \quad (6)$$

Herein, since the light L is diffracted in the transparent plate 26, the refractive index of the transparent plate 26 was took into consideration.

In order to suppress the diffracted light in a xy plane, it is enough that the above-mentioned equation (6) does not come into existence for an arbitrary incident angle φ. Since the minimum value of the right side of the equation (6) is λmin and the maximum value of the left side of the equation (6) is $2 \cdot n1 \cdot p$ (p is the period of the minute unevennesses 30, and p≧d), the condition for not bringing the equation (6) into existence is as follows.

$$p < \lambda \min / (2 \cdot n1) \quad (7)$$

Accordingly, in the fourth embodiment, the period (pitch) p of the minute unevennesses 30 which compose the reflection preventive patterns 31 is formed so as to be less than the value determined by the right side of the above-mentioned equation (7). As a result, since the Bragg diffraction does not occur in the transparent plate 26, the diffracted light is not emitted to an observer side, and the contrast of a screen can be enhanced to improve the visibility of the reflection type liquid crystal display device 21.

Fifth Embodiment

When the period of the minute unevennesses 30 is lessened so as to satisfy the above-mentioned equation (7) in a surface parallel to the light emitting surface 29 of the transparent plate 26, it can be designed so as not to generate the diffracted light caused by the Bragg diffraction. However, the smaller the period of the minute unevennesses 30 is, the more difficult the formation of the reflection preventive patterns 31; therefore in the fifth embodiment, the generation of the diffracted light is suppressed with the minute unevennesses 30 having the period being as large as possible by optimizing the direction of the reflection preventive patterns 31.

Figure 17:
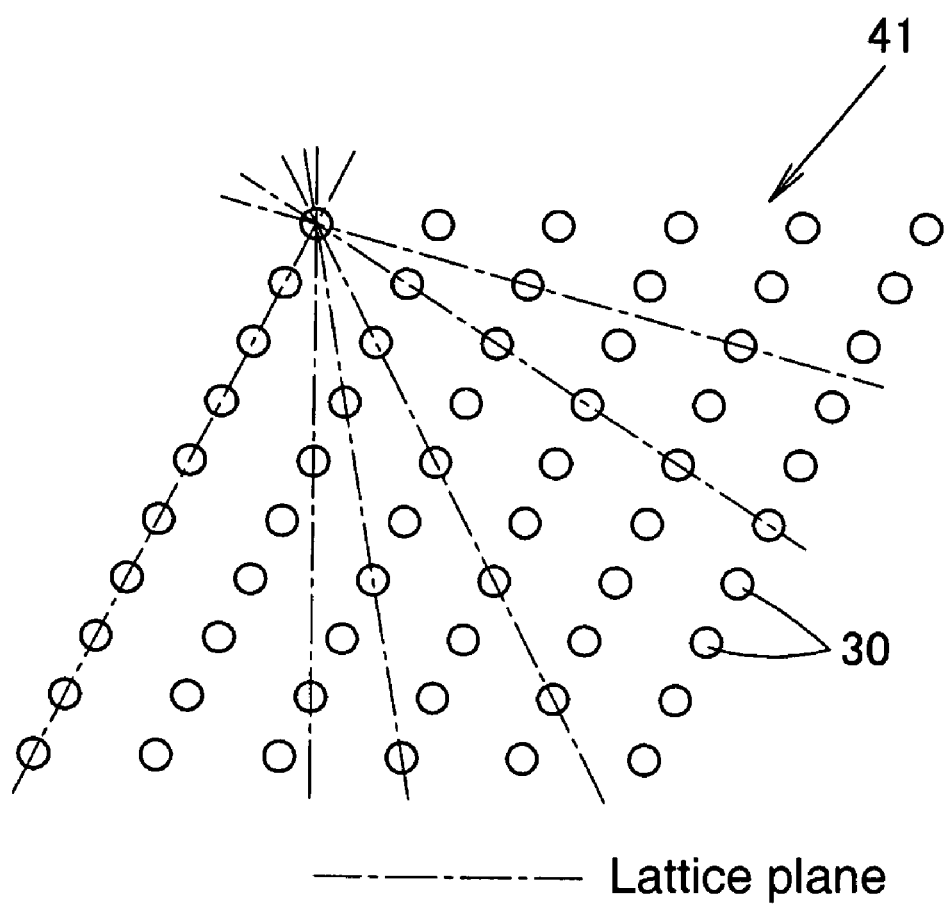
FIG. 17 shows many lattice planes in the diffraction grating in the fifth embodiment of the invention.
Figure 18:
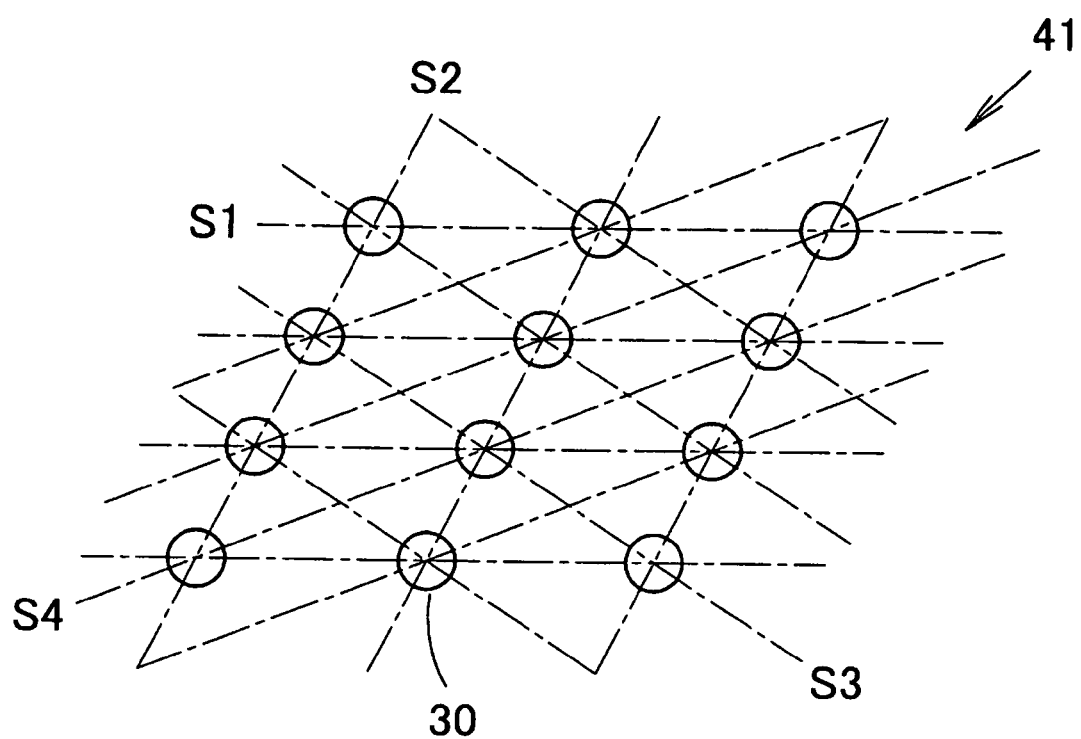
FIG. 18 shows main lattice planes, S1, S2, S3 and S4 which are a problem at considering the Bragg diffraction.

FIG. 17 is a view regarding the respective minute unevennesses 30 of the reflection preventive patterns 31 as lattice points (hereinafter, such drawing is used in place of the reflection preventive patterns 31). Further, the minute unevennesses 30 are not required to be arranged in a square lattice shape, and an oblique lattice shape and a hexagonal lattice shape may be well. In order to illustrate them more generally, the lattice points are pictured in a square lattice shape. As shown in FIG. 17, considering such diffraction gratings, lattice planes for numerous directions can be considered. In order not to generate the diffraction caused by the Bragg diffraction, it may be well that the Bragg's diffraction condition is not satisfied for all lattice planes. However, in reality, when four main lattice planes, S1, S2, S3 and S4 as shown in FIG. 18 which are the largest spacing between lattice planes do not satisfy the condition of the Bragg diffraction, the diffracted light caused by the Bragg diffraction is not generated. Accordingly, the condition by which the Bragg diffraction is not generated for the four main lattice planes is determined below.

Figure 19:
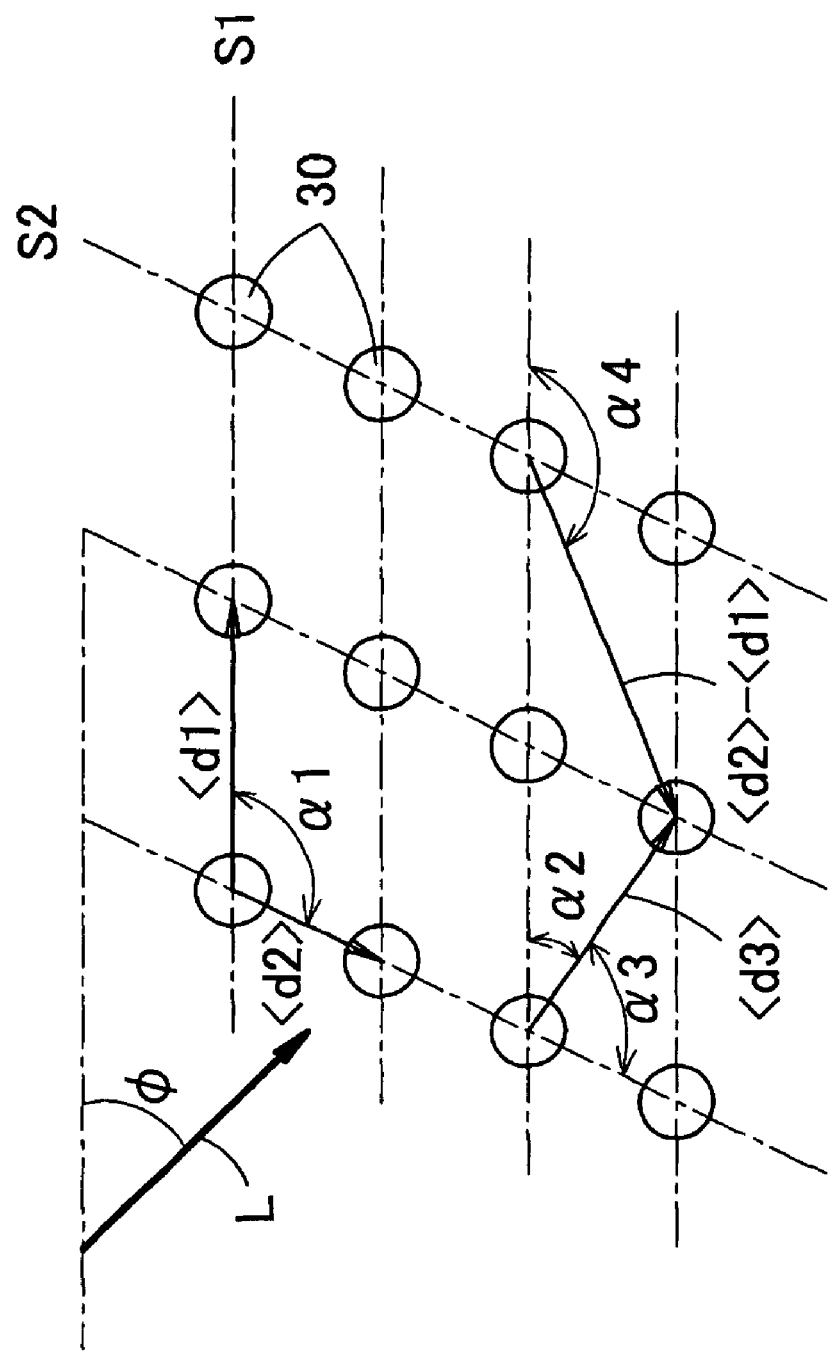

Firstly, the definition of codes is illustrated by FIG. 19. The direction to which light is injected in a flat plane parallel to the reflection preventive patterns 31 shall be represented by an angle φ which is based on a direction parallel to the lattice plane S1. Further, basic lattice vectors which face to a direction parallel to the lattice planes S1 and S2 and an angle α1 mutually formed is 90° or more are set as <d1> and <d2>. Lattice vector which is parallel to the lattice plane S3 is set as <d3>=<d1>+<d2>. An angle formed between lattice vectors <d1> and <d3> is set as α2. An angle formed between lattice vectors <d2> and <d3> is set as α3=α1+α2. An angle formed between lattice vectors <d1> and (<d2>−<d1>) is set as α4. Further, the sizes (lattice constant) of vectors <d1>, <d2>, and <d3> are respectively d1, d2 and d3.

Figure 20:
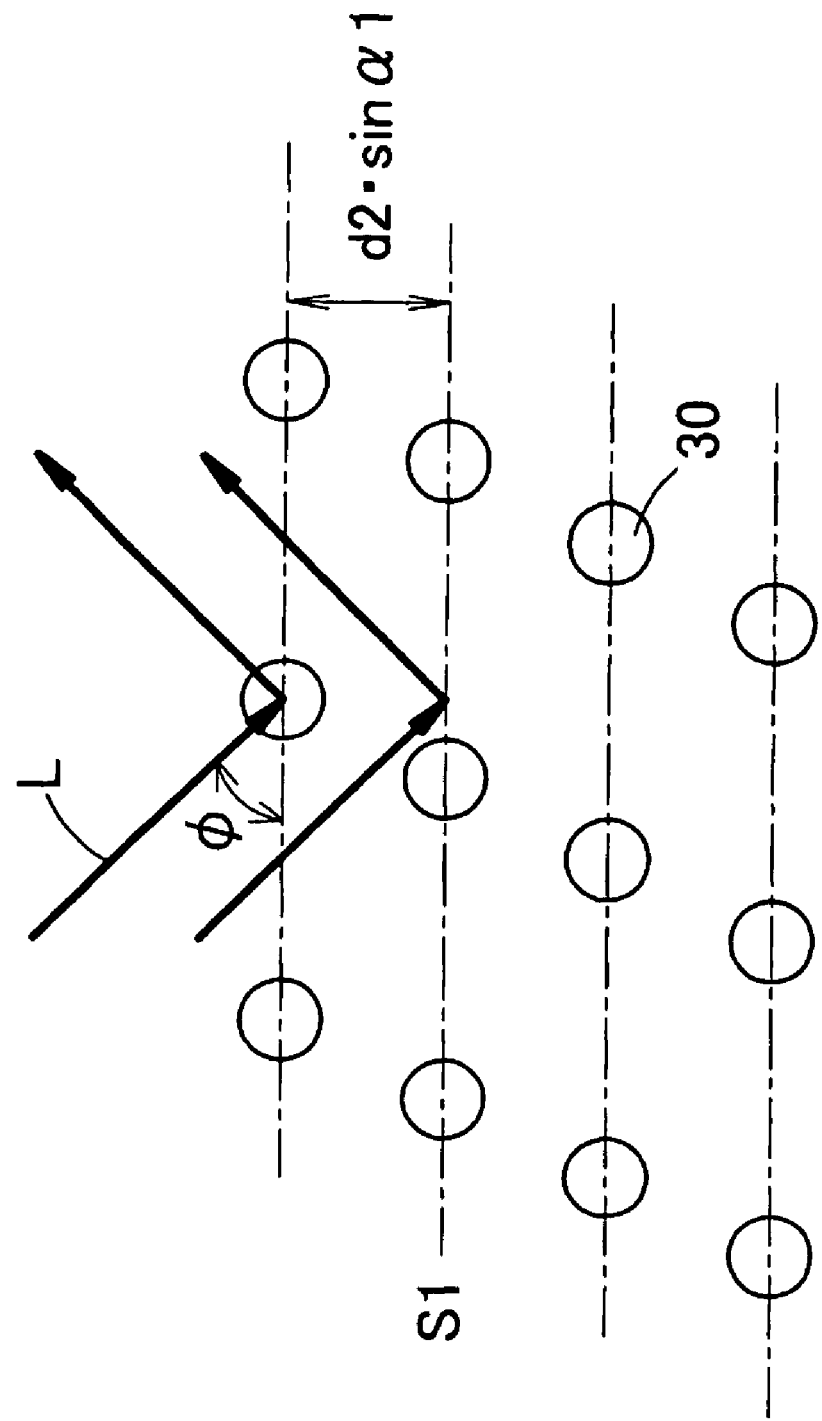
FIG. 20 shows the Bragg diffraction in the lattice plane S1.

As shown in FIG. 20, considering the condition of the Bragg diffraction in the lattice plane S1, the spacing between lattices is d2·sin α1; therefore, the following equation is satisfied.

$$2 \cdot n1 \cdot (d2 \cdot \sin \alpha 1) \cdot \sin \phi = q\lambda \ (q=\pm 1, \pm 2, \ldots)$$

Consequently, the equation (8) is appropriate so that the diffraction does not occur in the lattice plane S1.

$$2 \cdot n1 \cdot (d2 \cdot \sin \alpha 1) \cdot |\sin(\phi)| < \lambda \min \quad (8)$$

Figure 21:
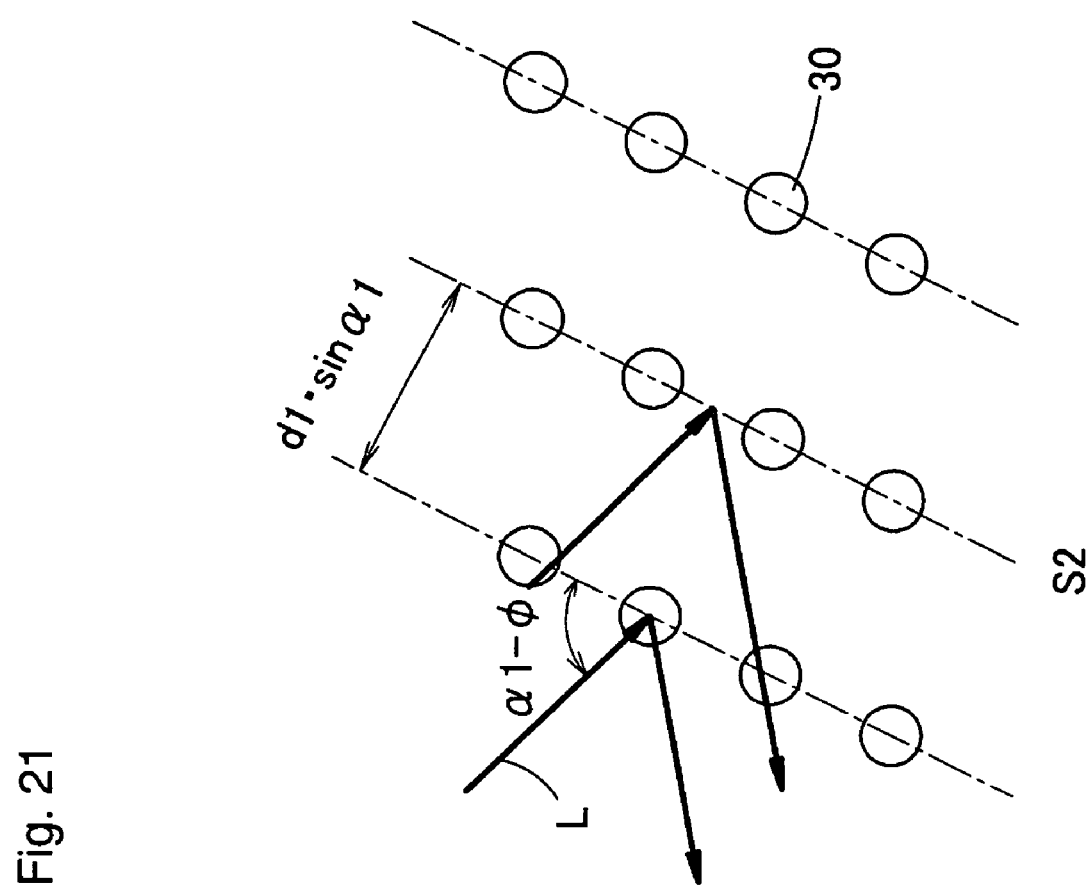
FIG. 21 shows the Bragg diffraction in the lattice plane S2.

Accordingly, similarly considering the condition of the Bragg diffraction in the lattice plane S2 as shown in FIG. 21, the spacing between lattices is d1·sin α1; therefore the following equation is satisfied.

$$2 \cdot n1 \cdot (d1 \cdot \sin \alpha 1) \cdot \sin(\alpha 1 - \phi) = q\lambda \ (q=\pm 1, \pm 2, \ldots)$$

Accordingly, the condition by which the diffraction does not occur in the lattice S2 is as follows.

$$2 \cdot n1 \cdot (d1 \cdot \sin \alpha 1) \cdot |\sin(\alpha 1 - \phi)| < \lambda \min \quad (9)$$

Figure 22:
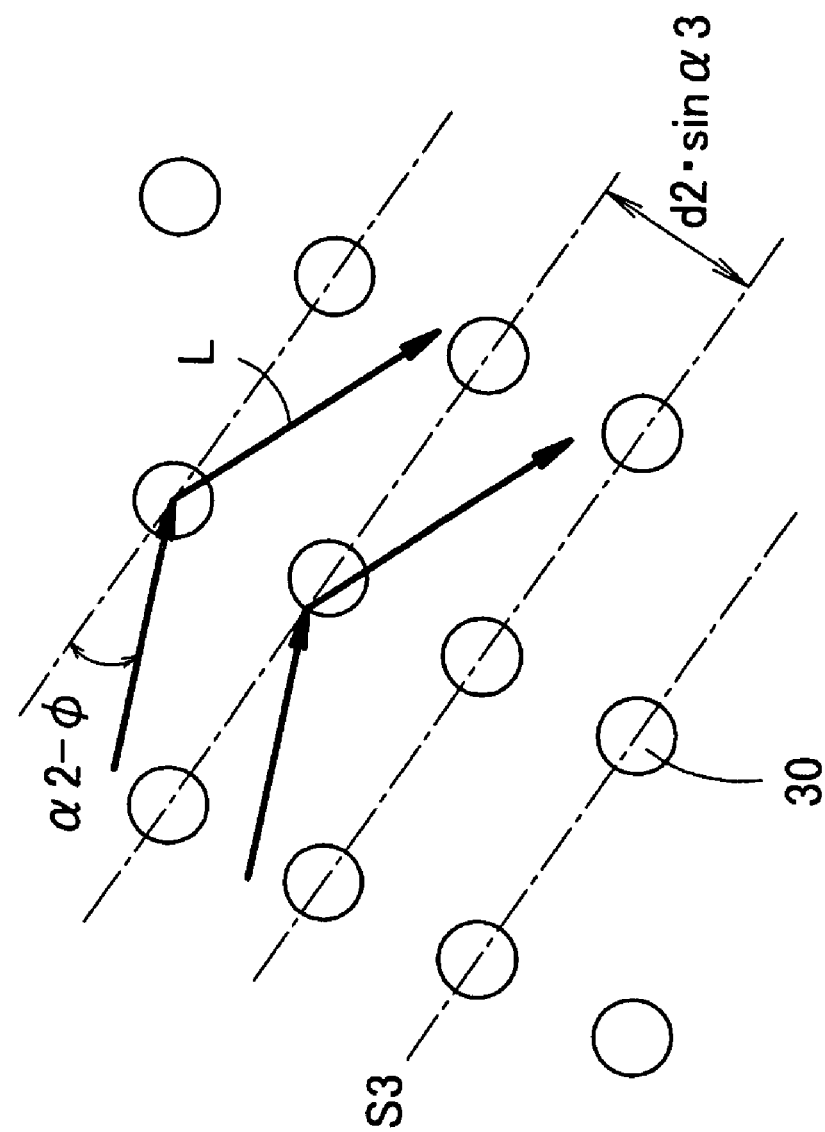
FIG. 22 shows the Bragg diffraction in the lattice plane S3.

Further, considering the condition of the Bragg diffraction in the lattice plane S3 as shown in FIG. 22, the spacing between lattices is d2·sin α3; therefore, the following equation is satisfied.

$$2 \cdot n1 \cdot (d2 \cdot \sin \alpha 3) \cdot \sin(\alpha 2 - \phi) = q\lambda \ (q=\pm 1, \pm 2, \ldots)$$

Accordingly, the condition by which the diffraction does not occur in the lattice S3 is as follows.

$$2 \cdot n1 \cdot (d2 \cdot \sin \alpha 3) \cdot |\sin(\alpha 2 - \phi)| < \lambda \min \quad (10)$$

Figure 23:
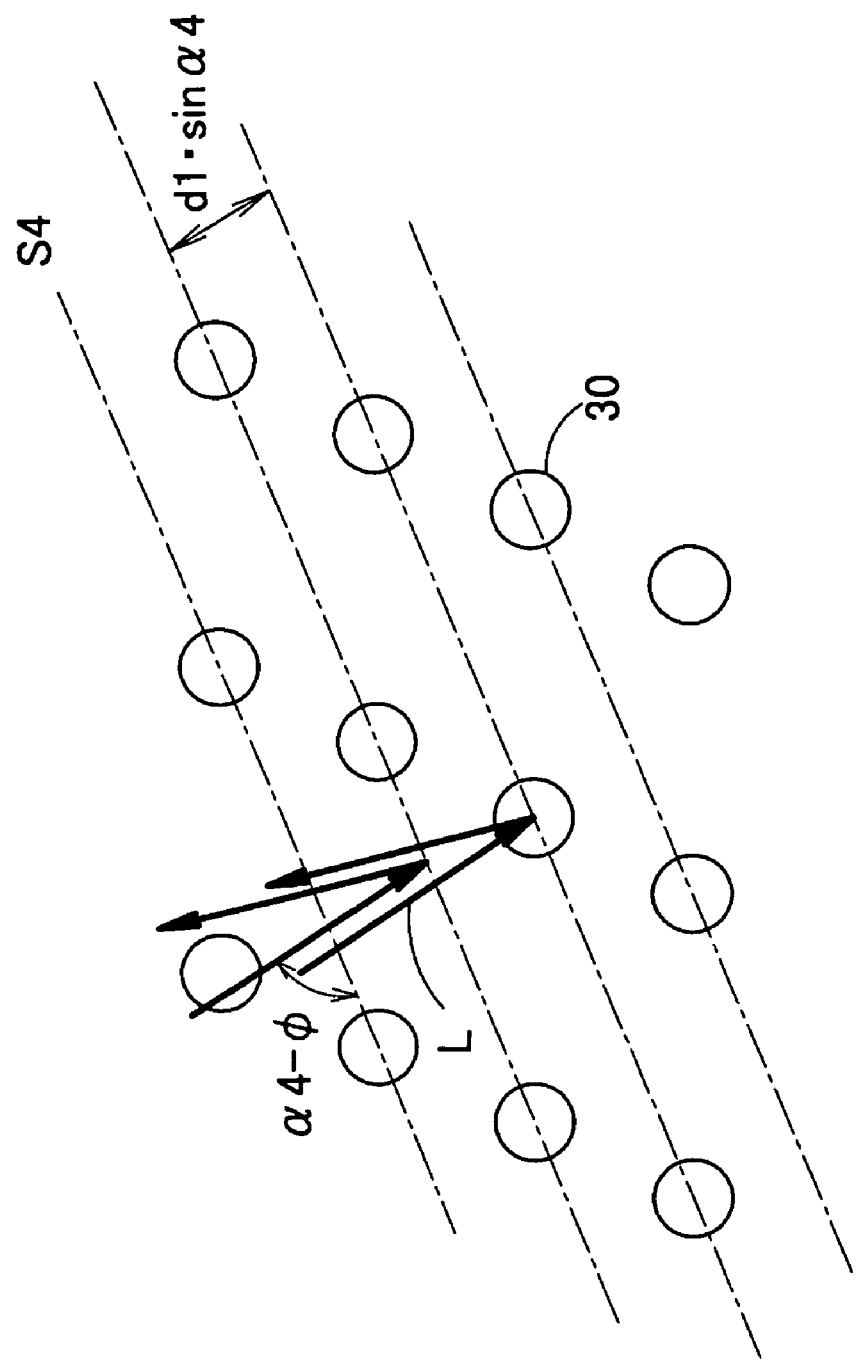
FIG. 23 shows the Bragg diffraction in the lattice plane S4.

Further, considering the condition of the Bragg diffraction in the lattice plane S4 as shown in FIG. 23, the spacing between lattices is d1·sin α4; therefore, the following equation is satisfied.

$$2 \cdot n1 \cdot (d1 \cdot \sin \alpha 4) \cdot \sin(\alpha 4 - \phi) = q\lambda \ (q=\pm 1, \pm 2, \ldots)$$

Accordingly, the condition by which the diffraction does not occur in the lattice S4 is as follows.

$$2 \cdot n1 \cdot (d1 \cdot \sin \alpha 4) \cdot |\sin(\alpha 4 - \phi)| < \lambda \min \quad (11)$$

According to the above description, it is appropriate to determine an incident angle φ which satisfies the following equations (8) to (11) simultaneously, in order not to generate the Bragg diffraction by the reflection preventive patterns 31.

$$2 \cdot n1 \cdot (d2 \cdot \sin \alpha 1) \cdot |\sin(\phi)| < \lambda \min \quad (8)$$

$$2 \cdot n1 \cdot (d1 \cdot \sin \alpha 1) \cdot |\sin(\alpha 1 - \phi)| < \lambda \min \quad (9)$$

$$2 \cdot n1 \cdot (d2 \cdot \sin \alpha 3) \cdot |\sin(\alpha 2 - \phi)| < \lambda \min \quad (10)$$

$$2 \cdot n1 \cdot (d1 \cdot \sin \alpha 4) \cdot |\sin(\alpha 4 - \phi)| < \lambda \min \quad (11)$$

If the above-mentioned equations (8) to (11) are satisfied for an arbitrary incident angle φ, the Bragg diffraction is not generated for light at an arbitrary incident angle φ. However, in case of the reflection type liquid crystal display device 21, the position of the light source 24 is fixed and it can be considered that light is injected at a fixed incident angle φ in the reflection preventive patterns 31. Accordingly, if an incident angle φ at which the maximum value among the left side of the equations (8) to (11) becomes minimal value can be determined, the large lattice constants d1 and d2 can be determined for a fixed visible light with the shortest wavelength λmin. Namely, after the optimum arrangement of the reflection preventive patterns 31 is determined for the direction of an incident angle, the as large as possible lattice constants (period) d1 and d2 can be determined for a fixed visible light with the shortest wavelength λmin. Alternatively, it is enabled not to generate the Bragg diffraction for light of visible light with the shortest wavelength λmin against the fixed constants d1 and d2.

Figure 24:
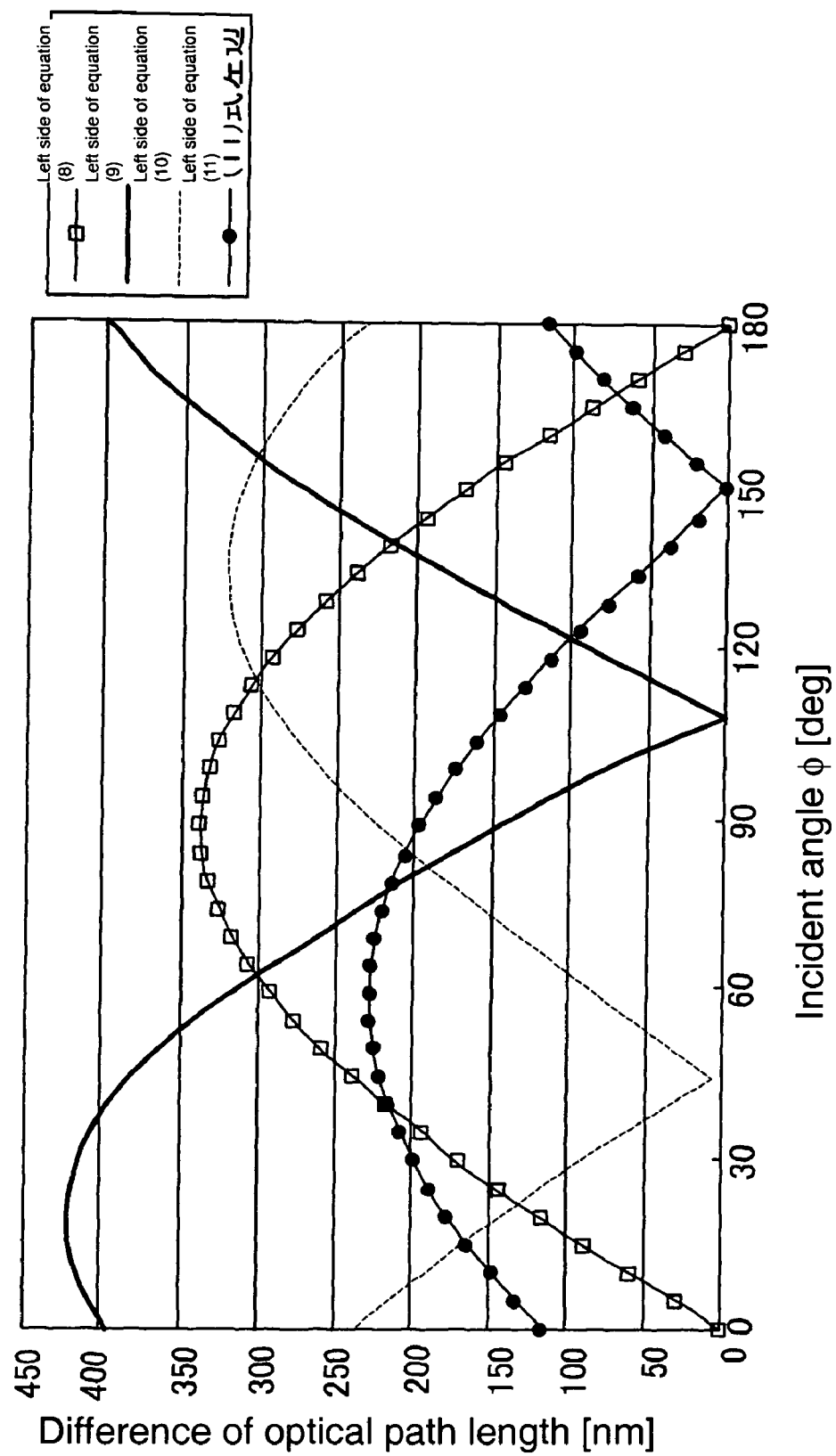
FIG. 24 shows a graph representing the equations (8) to (11).

FIG. 24 shows the above-mentioned equations (8) to (11) with a graph. In FIG. 24, a horizontal axis is an incident angle φ, and a longitudinal axis is the difference of optical path lengths of the respective equations. Further, each of the difference of optical path lengths was calculated setting that the refractive index of the transparent plate medium is n1=1.5, the lattice constants are di=150 nm and d2=120 nm, and the angle is α1=110°.

As grasped from FIG. 24, when α1>90° and the above-mentioned equations (8) and (9) are simultaneously satisfied, the equation (11) comes into existence also. This can be certified by a mathematical formula. The smallest difference of optical path length under a condition that the equations (8) and (9) come into existence simultaneously is obtained when the left side of the equation (8) is equal to the equation (9). At this time, the following equation comes into existence.

$$\phi = \arctan[d1 \sin\alpha1/(d2+d1\cos\alpha1)]$$

The left sides of the equations (8) and (9) become the following equation (12).

$$\frac{2 \cdot n1 \cdot d1 \cdot d2 \cdot \sin^2\alpha1}{\sqrt{d1^2 + 2d1 \cdot d2 \cdot \cos\alpha1 + d2^2}} \quad (12)$$

When the difference of optical path length of the equation (12) is compared with the maximum value (2·n1·d1·sin α4) at the left side of the equation (11), the following equation (13) is obtained. When α1>90°, the difference of optical path length of the equation (12)>the maximum value at the left side of the equation (11).

Difference of optical path length of equation (12)/Maximum value at left side of equation (11)

$$= \frac{2 \cdot d1 \cdot d2 \cdot \sin^2\alpha1}{(2 \cdot d1 \cdot \sin\alpha4)\sqrt{d1^2 + 2d1 \cdot d2 \cdot \cos\alpha1 + d2^2}} \quad (13)$$

$$= \frac{\sqrt{d1^2 + d2^2 - 2d1 \cdot d2 \cdot \cos\alpha1}}{\sqrt{d1^2 + d2^2 + 2d1 \cdot d2 \cdot \cos\alpha1}} > 1$$

Since the left sides of the equations (8) and (9) are curves which are convex upward between the points of intersection, the equation (11) comes into existence an arbitrary incident angle φ if the equations (8) and (9) are satisfied.

Consequently, it is appropriate to consider only the equations (8) to (10) with respect to the condition by which the Bragg diffraction does not occur.

Since the condition that the Bragg diffraction is shut out by the largest lattice constants (period) d1 and d2 is a point at which the maximum at the left side of the equations (8) to (10) is a minimal value (or the minimum value) as illustrated in advance, it corresponds to the points of intersection of the equations (8) to (10) as grasped from FIG. 24.

The points of intersection of the equations (8) and (9) are obtained from the following equation.

$$d2/d1 = |\sin(\alpha1-\phi)/\sin\phi| \quad (14)$$

Further, the points of intersection of the equations (9) and (10) are obtained from the following equation.

$$d3/d2 = |\sin(\alpha3-\phi')/\sin\phi'| \quad (15)$$

(in which φ'=α1−φ)

Further, the points of intersection of the equations (8) and (10) are obtained from the following equation.

$$d1/d3 = |\sin(\alpha2-\phi'')/\sin\phi''| \quad (16)$$

(in which φ''=α2−φ)

Herein, d1/sin α3=d2/sin α2=d3/sin α1 was used.

When the angle formed by the lattice vectors <d1> and <d2> is α1, the angle formed by the lattice vectors <d2> and <d3> is α3, the angle formed by the lattice vectors <d3> and <d1> is α2, and an incident angle against a lattice plane parallel to <d1> is φ, an incident angle against a lattice plane parallel to <d2> is φ'=α1−φ, and an incident angle against a lattice plane parallel to <d3> is φ''=α2−φ. Accordingly, considering the above-mentioned equations (14) to (16), the equations (14) to (16) can be represented by generalization.

$$dj/di = |\sin(\alpha-\phi)/\sin\phi| \quad (17)$$

Herein, di and dj are the sizes (lattice constant) of lattice vectors <di> and <dj>, α is an angle formed between the lattice vectors <di> and <dj>, φ is the incident angle of light for a lattice plane parallel to the lattice vector <di>, and α−φ is the incident angle of light for a lattice plane parallel to the lattice vector <dj>.

Accordingly, when arbitrary two (basic) lattice vectors are selected and the reflection preventive patterns 31 are arranged so as to inject light at an angle φ which was determine from the equation (17) against a direction of the lattice vector <di>, the Bragg diffraction can be prevented by the reflection preventive patterns 31 having the as large as possible lattice constants di and dj, and the molding of the reflection preventive patterns 31 becomes easy.

For example, in a fine structure having the lattice vectors <di> and <dj> in which an angle mutually formed is α (α≧90°) and lengths are di and dj, when the solution of the equation (17) is φ₀, the reflection preventive patterns 31 is arranged on the lower face of the transparent plate 26 so as to form the direction of the lattice vector <di> by an angle of φ0 against the direction of the light source 24 as shown in FIG. 24, and it is designed that the values of di and dj are as large as possible within a range satisfying the equations (8) to (10) against the visible light with the shortest wavelength λmin; therefore the Bragg diffraction can be prevented by the reflection preventive patterns 31 having a large period.

Sixth Embodiment

Figure 25:
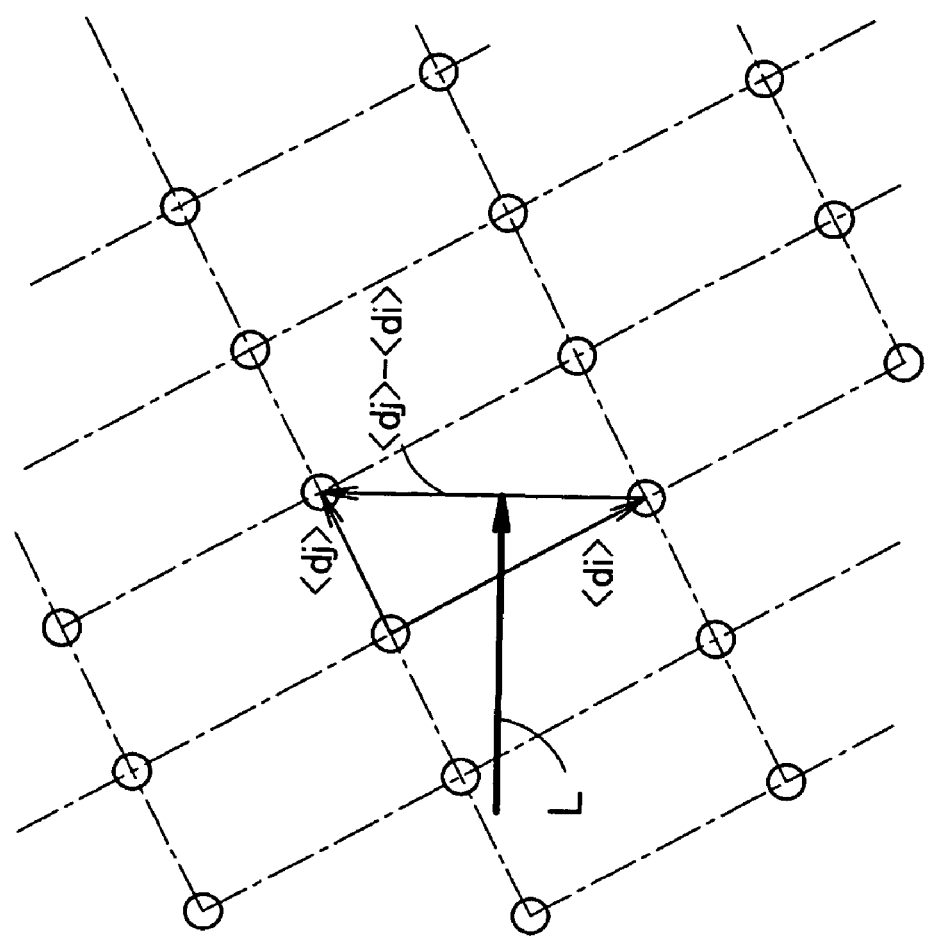
FIG. 25 shows the optimum direction of incident light in a orthogonal lattice in the sixth embodiment of the invention.

FIG. 25 represents a rectangular lattice. In this case, since α=90°, the equation (17) is expressed as follows.

$$dj/di = 1/\tan\theta \quad (18)$$

When the lattice is a rectangular lattice with α=90°, this represents that large values as the lattice constants di and dj can be selected if the injection direction of light is vertical to the direction of the vector <dj>−<di>.

Further, when α=90°, the above-mentioned equation (8) is expressed as follows.

$$2 \cdot n1 \cdot di \cdot \cos\theta < \lambda min$$

Further, the above-mentioned equation (9) is expressed as follows.

$$2 \cdot n1 \cdot dj \cdot \sin\theta < \lambda min$$

Consequently, the following equation (19) is obtained from the both equations.

$$\frac{di \cdot dj}{\sqrt{di^2 + dj^2}} < \frac{\lambda mini}{2 \cdot n1} \quad (19)$$

In particular, when di=dj=p, the direction of light L conducted is a direction of 45° for the lattice vectors <di> and <dj>, and the equation (19) is expressed as follows.

$$p < \lambda min / [(\sqrt{2}) \cdot n1] \quad (20)$$

At this time, for example, when λmin=380 nm and n1=1.5, the equation (20) is expressed as follows.

$$p < 179 \text{ nm}$$

Accordingly, when a rectangular lattice is α=90°, the reflection preventive patterns 31 are arranged so that the injection direction of light is vertical to the orthogonal direction of light and the lattice constants di and dj are determined. Thereby, the Bragg diffraction is hardly generated, and the visibility of a screen can be bettered. Further, the molding of the reflection preventive patterns 31 can be easily carried out by determining the as large as possible values of di and dj within a range satisfying the equation (19). Further, since the lattice is a rectangular lattice or a square lattice shape, the arrangement of the minute unevennesses 30 is also simplified.

Seventh Embodiment

Figure 26:
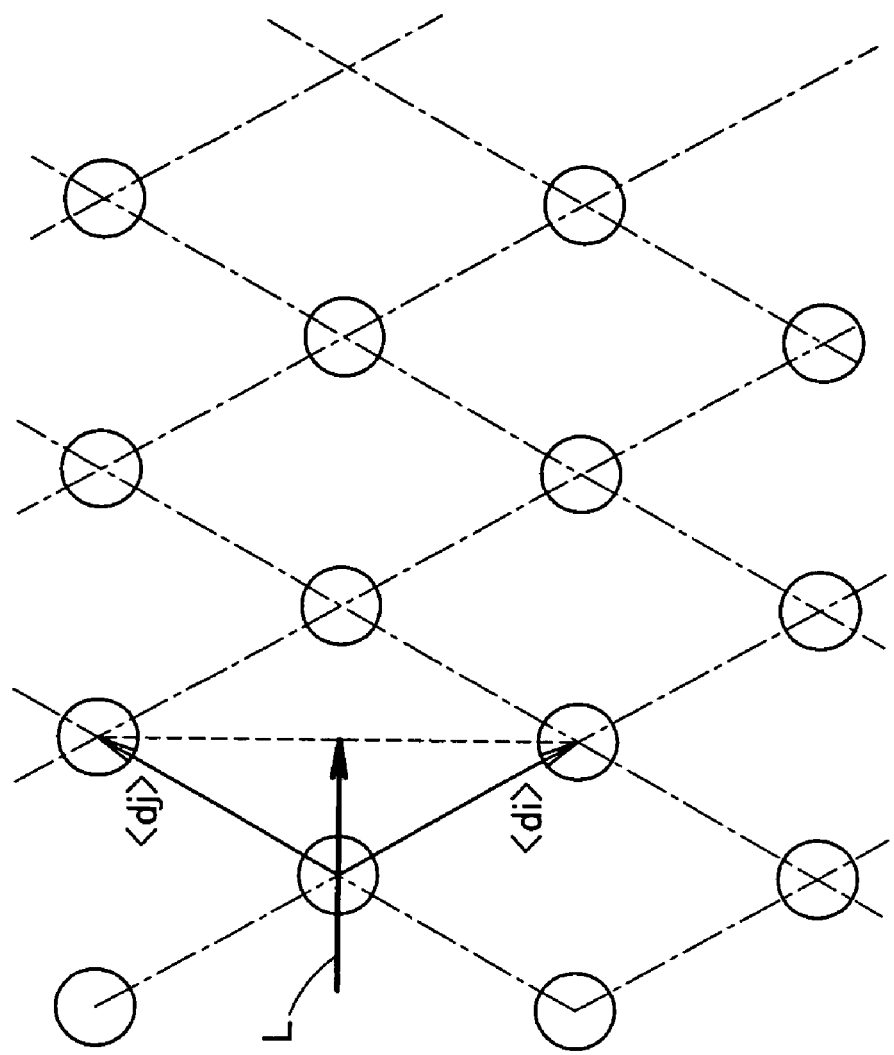
FIG. 26 shows the optimum direction of incident light in a hexagonal lattice in the seventh embodiment of the invention.

FIG. 26 represents a hexagonal lattice of di and dj=p and α=120°. In this case, the equation (14) becomes is expressed as follows.

$$\sin\phi = \sin(120° - \phi)$$

Therefore, φ=60°. Considering the symmetry of a hexagonal lattice, it indicates that the diffraction is hardly generated when the direction is φ=0°, 60°, 120° and 180°. When light is injected in parallel to any one of the three basic lattice vectors of the hexagonal lattice, it represents that large values can be selected as the spacings di and dj between lattice planes.

Further, when di and dj=p and α=120°, the above-mentioned equations (8) and (9) are expressed as follows.

$$p < (2 \cdot \lambda min)/(3 \cdot n1) \quad (21)$$

For example, when λmin=380 nm and n1=1.5, the above-mentioned equation (21) is expressed as follows.

$$p < 169 \text{ nm}$$

Accordingly, in this case, the reflection preventive patterns 31 are arranged so that the injection direction of light is parallel to any one of the three basic lattice vectors of the hexagonal lattice, and the lattice length p is determined so as to satisfy the equation (21). Thereby, the Bragg diffraction is hardly generated, and the visibility of a screen can be bettered. Further, the molding of the reflection preventive patterns 31 can be easily carried out by determining the as large as possible values of p within a range satisfying the equation (21). Such hexagonal lattice can arrange densely the minute unevennesses 30 whose bottom is circular.

Eighth Embodiment

The eighth embodiment illustrates a case that a point light source such as a front light shown in FIG. 10. When a point light source as the light source 24 is used, the proceeding direction of light conducted in the transparent plate 26 is not constant. Consequently, when the minute unevennesses 30 are designed to be arranged to a direction of hardly generating the diffraction, the minute unevennesses 30 are arranged in a cocentric shape. The preparation of the transparent plate 26 is difficult for arranging the minute unevennesses 30 in a cocentric shape on the transparent plate 26.

Then, when a point light source is used, it is preferable to use a lattice structure having high rotational symmetry such as a hexagonal lattice. Further, the emission angle φ at which the diffraction is hardly generated can be determined as follow using the equations (8) to (11) which were used in the fifth embodiment.

Figure 27:
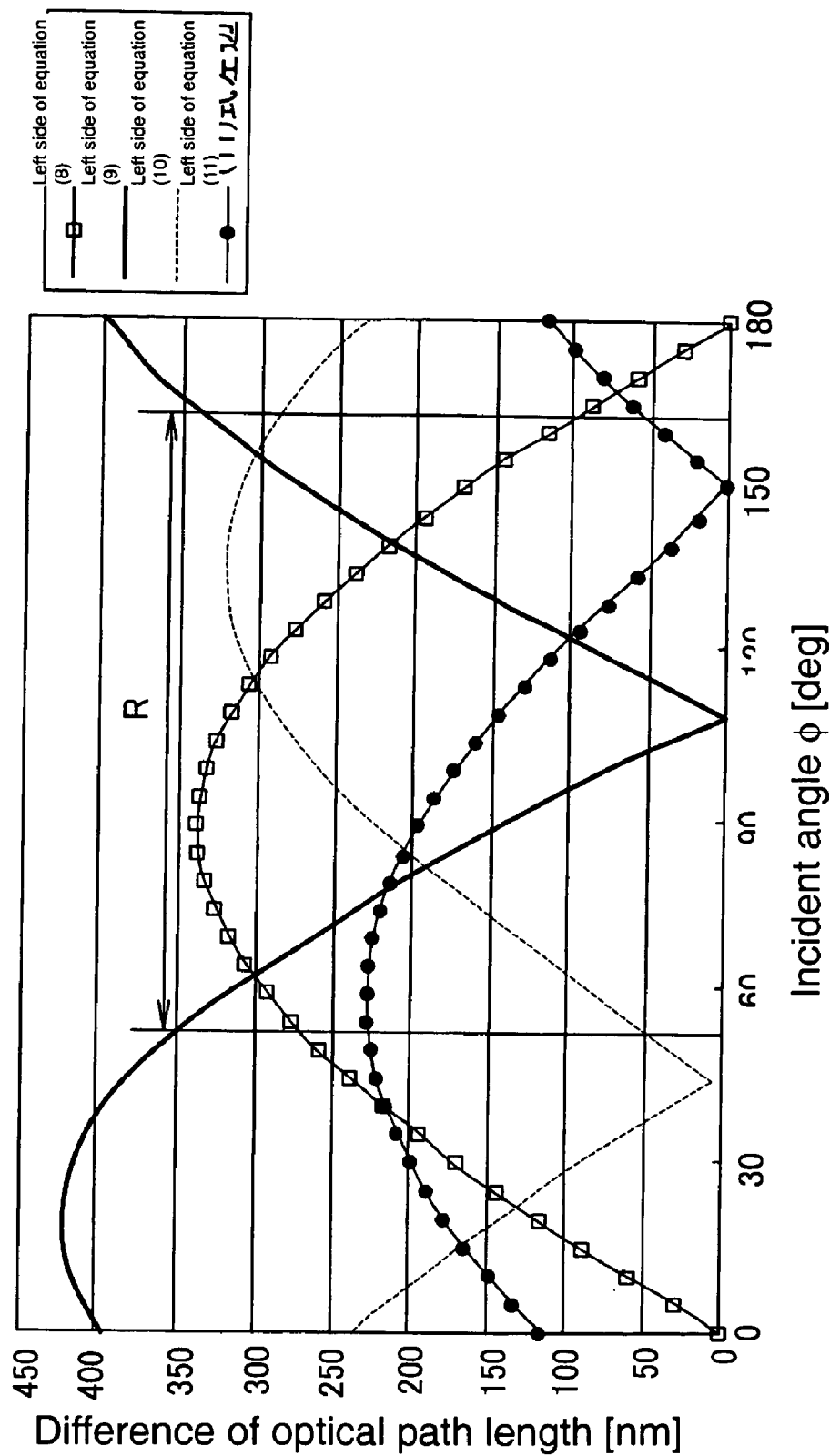
FIG. 27 shows a method of determining the direction of the reflection preventive patterns when the light source is a point light source.

For example, considering a diffraction grating in which an angle α mutually formed between the lattice vectors di and dj is 110° and the respective lattice constants are di=150 nm and dj=120 nm, this has a structure being nearly a hexagonal lattice. Herein, as shown in FIG. 10, when the light source 24 (a point light source) is provided at a corner portion, the spread of the proceeding direction of light conducted in the transparent plate 26 has an angle of 90°; therefore the arrangement direction is determined so that the maximum value of the difference of optical path length represented by the left side of the equations (8) to (11) is minimum over a range of the incident angle of light of 90°. As shown in FIG. 27, when the spread (90°) of the incident angle of light is determined within a range of φ=57° to 163° for the graph representing the equations (8) to (11), the maximum of the difference of optical path length is the minimum. Accordingly, an angle formed between the lattice vector di with a length of 150 nm and one side of the transparent plate 26 is set at an angle between 57° to 73° (163°−90°=73°).

Ninth Embodiment

The embodiments hitherto illustrated a case that the minute unevennesses are periodically arranged, but in the embodiment below, a case that the minute unevennesses having a size of the wavelength or less of a light are randomly arranged. Meaning that the minute unevennesses are randomly formed is illustrated.

Light is transmitted in the inside of the transparent plate to a direction of leaving from the light source while repeating total reflection between the light emitting surface and its reverse surface. Accordingly, as described in the column of Prior Art, light is injected at a large angle for the minute unevennesses which are provided on the light emitting surface of the transparent plate or its reverse surface and the diffracted light is generated. In particular, when the minute unevennesses are periodically arranged, lights with the same wavelength are diffracted in the minute unevennesses in respective zones; therefore the diffracted lights with the same wavelength are mutually interfered and intensified, and the intense diffracted lights are emitted to a specific direction. As a result, since the transparent plate wears a tone of color and light emitted from a front light is viewed to be colored, the visibility of the screen of the reflection type liquid crystal display device is deteriorated.

To the contrary, when the arrangement of the minute unevennesses is random, the wavelengths of lights which are diffracted to the same direction from the minute unevennesses in respective zones are dispersed; therefore lights with various wavelengths are mixed to be whitened. Consequently, phenomenon that the transparent plate wears a tone of color and light emitted from a front light is viewed to be colored can be suppressed by preparing the random minute unevennesses, and the visibility of the screen of the reflection type liquid crystal display device can be improved. Accordingly, in the embodiment below, the arrangement of the minute unevennesses is random.

Figure 28A:
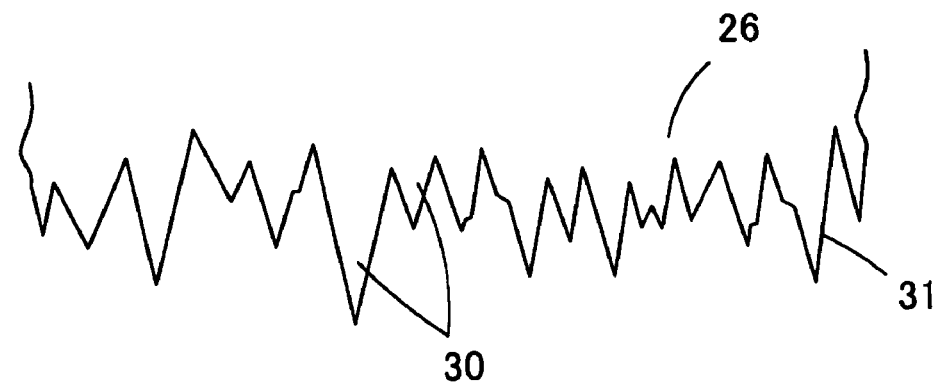
FIG. 28A shows a schematic view of the reflection preventive patterns in which the minute unevennesses with random shapes and sizes were arranged at random spacing.
Figure 28B:
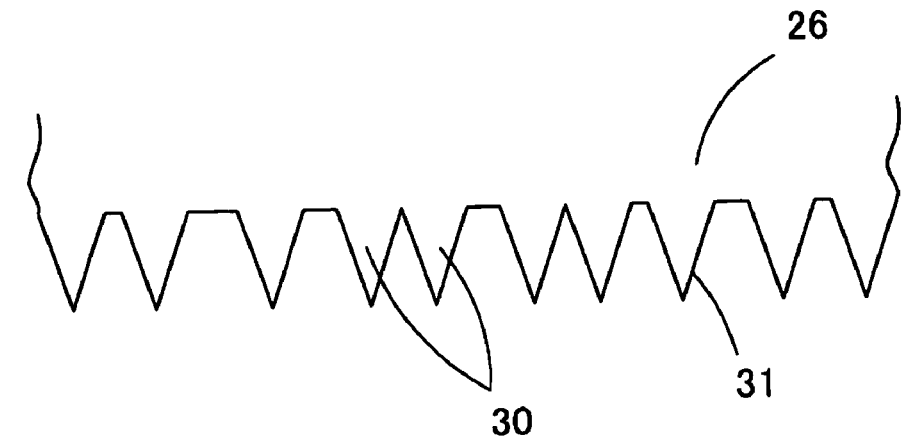
FIG. 28B shows a schematic view of the reflection preventive patterns in which the minute unevennesses with the same shapes were arranged at random spacing.

The random arrangement of the minute unevennesses can be divided into two. Both of FIGS. 28A and 28B are sectional views schematically representing the reflection preventive patterns 31 in which the minute unevennesses 30 were randomly arranged. The reflection preventive patterns 31 shown in FIG. 18A are prepared by arranging the minute unevennesses 30 with random shapes and sizes at random spacing. The reflection preventive patterns 31 shown in FIG. 18B are prepared by arranging the minute unevennesses 30 with the same shapes at random spacing. Further, FIGS. 28A and 28B represent a random arrangement only to one direction, but the minute unevennesses 30 are randomly arranged to two directions.

Thus, the generation of the diffracted light can be suppressed and the diffracted light can be generated only to a specific direction by lessening the spacings of the minute arrangements than the wavelength of light in like manner as the first to third embodiments also in a case that the minute arrangements are randomly arranged. However, when the minute arrangements are random, the condition illustrated in the first to third embodiments cannot be applied; therefore they are specifically illustrated below.

Firstly, a case that all of shapes, sizes and arrangement of the minute unevennesses 30 are random as shown in FIG. 28A is illustrated in the ninth, tenth and eleventh embodiments. In the ninth embodiment, the incident angle of the light L which is injected on the minute unevennesses 30 is set as θ1, the diffraction angle of the diffracted light 14 as θ2, the refractive index of a transparent plate material as n1, the refractive index of air as n0, the wavelength of visible light with the shortest wavelength among lights which are emitted from the light source 24 is set as λmin (refer to FIG. 11), further, when the distribution of the distances of the mutual concave portions or the mutual convex portions which are adjacent with respect to the concave portions or convex portions is calculated, a distance at which the frequency of their appearance is the maximum is set as K, it is appropriate to satisfy the following equation (22).

$$K < \lambda \min/(n0+n1) \quad (22)$$

This corresponds to the equation (2) which was introduced in the first embodiment.

Figure 29A:
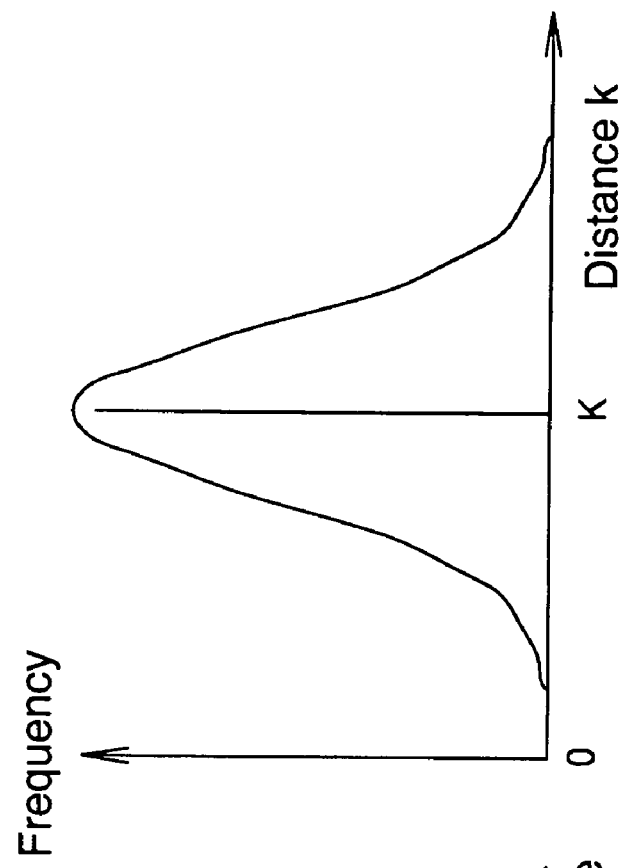
FIG. 29A shows one example of random minute unevennesses.
Figure 29B:
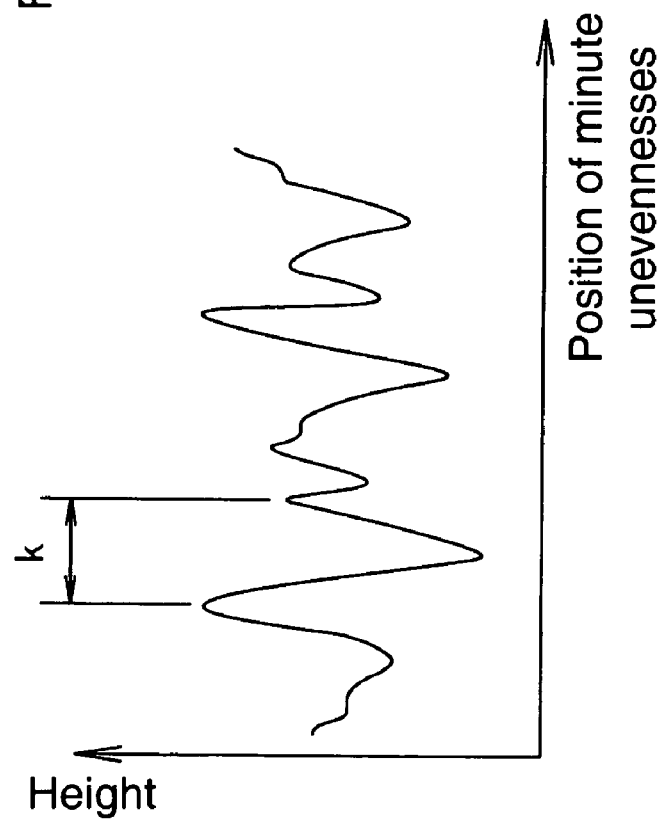
FIG. 29B shows the distribution of the distance K between the mutual convex portions (concave portions) with respect to the minute unevennesses.
Figure 31:
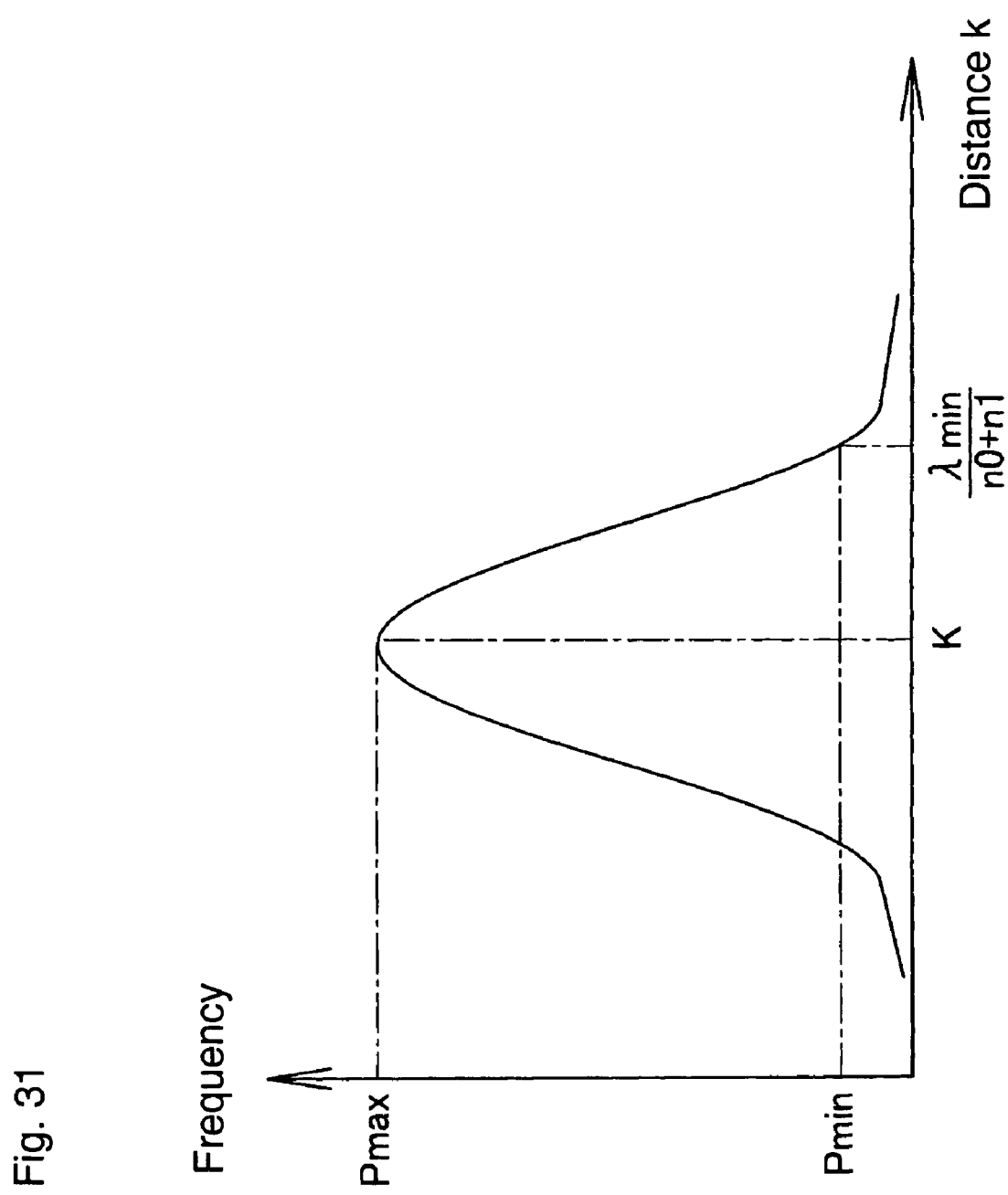
FIG. 31 shows the more preferable example in the ninth embodiment.

FIGS. 29A and 29B are views illustrating the application procedure of the above-mentioned equation (22). FIG. 29A shows one example of random minute unevennesses and FIG. 29B is a view showing the distribution of the distance K between the mutual convex portions (concave portions) with respect to the minute unevennesses. When the shape of the minute unevennesses 30 is the pattern represented by FIG. 29A, the distance K between the mutual adjacent convex portions (may be the mutual concave portions) is calculated from the pattern and summed to obtain the frequencies of the respective distances K. FIG. 29B represents the distribution of the frequencies of the respective distances K, the horizontal axis represents the distance K between the mutual adjacent convex portions and the longitudinal axis represents the appearance frequencies of the respective distances K. The distance k at which the frequency is the maximum in FIG. 29 is K. Accordingly, when the pattern such as FIG. 29A is designed, it is appropriate to prepare the reflection preventive patterns 31 on the transparent plate 26 at a reduced scale by which the distance K at which the frequency is the maximum satisfies the above-mentioned equation (22).

When the light source 24 is an LED and visible light with the shortest wavelength among lights which are emitted from the light source 24 is 420 nm, λmin is 420 nm, and when the refractive index of the transparent plate 26 is n1=1.5 and the refractive index of air is n0=1, the above-mentioned equation (22) is expressed as follows.

$$K < 168 \text{ nm}$$

Preferably, K is set to 100 nm or less.

According to this embodiment, since the minute unevennesses 30 are random, the front light 22 is hardly colored and the diffracted light is hardly emitted from the light emitting surface 29 of the transparent plate 26, the diffracted light is not emitted to an observer side and as a result, the contrast of a screen can be enhanced to improve the visibility of the reflection type liquid crystal display device 21.

Further, in this embodiment, it is desirable that the frequency Pmin when the distance k is equal to the minimum value λmin/(n0+n1) is ⅕ of the maximum frequency Pmax. The diffracted light is easily generated at a portion where the distances k of the minute unevennesses 30 is larger than λmin/(n0+n1), but if such condition is satisfied, the generation of the diffracted light can be more lessened.

The principle of the ninth embodiment is illustrated. The reflection preventive patterns 31 on which the minute unevennesses 30 were randomly arranged can be represented by the addition of a plural number of sine wave shapes. This is illustrated by FIGS. 30A, 30B and 30C. FIG. 30A is a schematic view showing the pattern of the minute unevennesses having random shapes and arrangements. FIG. 30B is a view showing components of the respective periods when the Fourier decomposition of the pattern of the minute unevennesses 30 was carried out. FIG. 30C is a view showing the relation of intensity and the periods of respective components. In order to simplify the illustration, the two dimensional reflection preventive patterns 31 are considered. When the height of the reflection preventive patterns 31 is z, the length of a zone on which the reflection preventive patterns 31 are formed is a, and the distance from the end of the zone on which the reflection preventive patterns 31 are formed is x, the pattern of the minute unevennesses 30 of FIG. 30A is represented as follows.

$$z = f(x) \quad (0 \leq x \leq a)$$

Since this can be expanded to the period function of the period a, the frequency (it is not frequency by time, but spatial frequency) is divided by the Fourier development into sine wave components of Tn=a/n (n=1, 2, 3 . . . ). FIG. 30B shows the portion of the sine wave which was divided thus into respective components. FIG. 30C shows that the frequency Tn of the respective components was set to the horizontal axis and the intensity of the respective components was set to the longitudinal axis.

As grasped from the illustrations hitherto, when the pattern period is about similar degree as the wavelength of visible light, the diffracted light is generated at the visible light zone, and when the pattern period is adequately shorter than the shortest wavelength λmin among the wavelength zone of visible light, the diffracted light is not generated. If the patterns of the minute unevennesses 30 are adapted to the components decomposed, it can be grasped that the diffracted light is generated for components having long periods and the diffracted light is not generated for components having short period. Consequently, when the range of the period generating the diffracted light is the range shown in FIG. 30C, the greater portions of the period components when the patterns of the minute unevennesses 30 were decomposed are designed to be a smaller zone than the range of the period which the diffracted light generates, the generation of the diffracted light can be suppressed and good visibility can be obtained. The above-mentioned equation (22) represented this. Further, the tenth and eleventh embodiments are also according to the similar reason.

Tenth Embodiment

In the tenth embodiment also in like manner as the ninth embodiment, the distance K at which the appearance frequencies of the distances between the mutual adjacent convex portions or the mutual adjacent concave portions are the maximum is considered. Namely, the distance K between the mutual adjacent convex portions is calculated from the pattern of the minute unevennesses 30 as shown in FIG. 29A and summed to obtain the distance K at which the appearance frequency is the maximum as shown in FIG. 29B. Further, in the tenth embodiment, when the wavelength of visible light with the shortest wavelength among visible lights which are emitted from the light source 24 is set as $\lambda$min, further, the distance K at which the frequency of their appearance is the maximum is designed to satisfy the following equation (23). Provided that n1 is the refractive index of the transparent plate material, n0 is the refractive index of air, and $\theta$out is an angle (refer to FIG. 13) formed between a direction in which the luminous intensity of the illumination light 37 which is emitted from the light emitting surface 29 of the front light 22 is the maximum and the normal line of the light emitting surface 29.

$$K < \lambda \min/(n1 + n0 \cdot \cos \theta \text{out}) \qquad (23)$$

The equation (23) corresponds to the equation (3) of the second embodiment.

For example, when $\lambda$min is 420 nm (the light source is an LED), $\theta$out=30°, the refractive index of the transparent plate is n1=1.5 and the refractive index of air is n0=1, the above-mentioned equation (23) is expressed as follows.

K<178 nm

Preferably, K is set to 100 nm or less.

Accordingly, in the tenth embodiment, the minute unevennesses 30 composing the reflection preventive patterns 31 are randomly arranged with minuteness satisfying the above-mentioned equation (23). As a result, the coloring of light emitted from the front light 22 can be suppressed and even if the diffracted light 14 is emitted to a direction of an angle of 90° or more against the illumination light 37, the diffracted light 14 is not emitted to an observer side and the contrast of a screen can be enhanced to improve the visibility of the reflection type liquid crystal display device 21.

Eleventh Embodiment

In the eleventh embodiment also in like manner as the ninth embodiment, the distance K at which the appearance frequencies of the distances between the mutual adjacent convex portions or the mutual adjacent concave portions are the maximum is considered. Namely, the distance K between the mutual adjacent convex portions is calculated from the pattern of the minute unevennesses 30 as shown in FIG. 29A and summed to obtain the distance K at which the appearance frequency is the maximum as shown in FIG. 29B. Further, in the eleventh embodiment, when the wavelength of visible light with the shortest wavelength among visible lights which are emitted from the light source 24 is set as $\lambda$min and the refractive index of the transparent plate material is set as n1, further, the distance K at which the frequency of their appearance is the maximum is designed to satisfy the following equation (24).

$$K < \lambda \min/(2 \cdot n1) \qquad (24)$$

The equation (24) corresponds to the equation (5) of the third embodiment.

For example, when $\lambda$min is 420 nm and the refractive index of the transparent plate is n1=1.5, the above-mentioned equation (24) is expressed as follows.

K<140 nm

Preferably, K is set to 100 nm or less.

Accordingly, in the eleventh embodiment, the distance K of the mutual minute unevennesses correspond to the maximum appearance frequency is formed by random arrangements so as to be less than the value determined by the right side of the above-mentioned equation (24). As a result, the coloring of light emitted from the front light 22 can be suppressed, the diffracted light 14 is not also emitted in the transparent plate 26, and the diffracted light 14 is not emitted to an observer side; therefore the contrast of a screen can be enhanced to improve the visibility of the reflection type liquid crystal display device 21.

Further, in this embodiment, it is desirable that the frequency Pmin when the distance k is equal to the minimum value $\lambda$min/(2·n1) is ⅕ of the maximum frequency Pmax.

Twelfth Embodiment

Then, as shown in FIG. 28B, a case that the minute unevennesses 30 with the same shape are randomly arranged at the under face (the light emitting surface 29) of the transparent plate 26 is illustrated in the twelfth, thirteen and fourteenth embodiments. As shown in FIG. 32A, the convex portions which are the convex minute unevennesses 30 having about the same shape and the same dimension are randomly arranged on the light emitting surface 29 of the transparent plate 26, or on the reverse surface. Alternatively, as shown in FIG. 32B, the concave portions which are the concave minute unevennesses 30 having about the same shape and the same dimension are randomly arranged. The width (diameter) of the base end portions of the convex portions which are the convex minute unevennesses 30 having about the same shape and the same dimension is referred to as W.

Thus, when the patterns of the minute unevennesses 30 (convex portions or concave portions) with a width of W are randomly arranged, many components having a period of W are contained in the pattern of the patterns of the minute unevennesses 30. Accordingly, in the embodiment, the width W of the patterns of the minute unevennesses 30 is designed to be a size not generating the diffraction. Further, it is preferable that the heights or depths of the patterns of the minute unevennesses 30 are uniformed at about constant value in order to shut out the components with unnecessary periods.

In the twelfth embodiment, when the incident angle of the light L which is injected on the minute unevennesses 30 is set as $\theta$1, the diffraction angle of the diffracted light 14 as $\theta$2, the refractive index of a transparent plate material as n1, the refractive index of air as n0, and the wavelength of visible light with the shortest wavelength among lights which are emitted from the light source 24 is set as λmin (refer to FIG. 11), the width W of the minute unevennesses 30 is designed to be a size satisfying the following equation (25).

$$W < \lambda\min/(n0+n1) \tag{25}$$

This corresponds to the equation (2) which was introduced in the first embodiment.

When the light source 24 is an LED and visible light with the shortest wavelength among lights which are emitted from the light source 24 is 420 nm, λmin is 420 nm, and when the refractive index of the transparent plate 26 is n1=1.5 and the refractive index of air is n0=1, the above-mentioned equation (25) is expressed as follows.

W<168 nm

Preferably, W is set to 100 nm or less.

According to this embodiment, since the minute unevennesses 30 are randomly arranged, the front light 22 is hardly colored and the diffracted light is hardly emitted from the light emitting surface 29 of the transparent plate 26, the diffracted light is not emitted to an observer side and as a result, the contrast of a screen can be enhanced to improve the visibility of the reflection type liquid crystal display device 21.

Thirteenth Embodiment

In the thirteenth embodiment, when the wavelength of visible light with the shortest wavelength among lights which are emitted from the light source 24 is set as λmin, the width W of the minute unevennesses 30 is designed so as to satisfy the following equation (26). Provided that n1 is the refractive index of a transparent plate material, n0 is the refractive index of air, and θout is an angle (refer to FIG. 13) formed between a direction at which the luminous intensity of the illumination light 37 emitted from the light emitting surface 29 of the front light 22 is the maximum and the normal line of the light emitting surface 29.

$$W < \lambda\min/(n1+n0 \cdot \cos \theta\text{out}) \tag{26}$$

This corresponds to the equation (3) of the second embodiment.

For example, when λmin is 420 nm (when the light source is an LED), θout is 30°, the refractive index of the transparent plate is n1=1.5 and the refractive index of air is n0=1, the above-mentioned equation (26) is expressed as follows.

W<178 nm

Preferably, W is set to 100 nm or less.

According to the thirteenth embodiment, the minute unevennesses 30 composing the reflection preventive patterns 31 are randomly arranged at the minute width W satisfying the above-mentioned equation (26). As a result, the coloring of light emitted from the front light 22 can be suppressed and the diffracted light is hardly emitted from the light emitting surface 29 of the transparent plate 26, and even if the diffracted light 14 is emitted to a direction of an angle of larger than 90° or more formed against the illumination light 37, the diffracted light 14 is not emitted to an observer side; therefore the contrast of a screen can be enhanced to improve the visibility of the reflection type liquid crystal display device 21.

Fourteenth Embodiment

In the fourteenth embodiment, when the wavelength of visible light with the shortest wavelength among lights which are emitted from the light source 24 is set as λmin and the refractive index of a transparent plate material as n1, the width W of the minute unevennesses 30 is designed to satisfy the following equation (27).

$$W < \lambda\min/(2 \cdot n1) \tag{27}$$

The equation (27) corresponds to the equation (5) of the third embodiment.

For example, when λmin is 420 nm and the refractive index of the transparent plate 26 is n1=1.5, the equation (24) is expressed as follows.

W<140 nm

Preferably, W is set to 100 nm or less.

Accordingly, in the fourteenth embodiment, the width W of the minute unevennesses 30 are formed by a random arrangement so as to be less than the value determined by the right side of the above-mentioned equation (27). As a result, the coloring of light emitted from the front light 22 can be suppressed and the diffracted light 14 is not also emitted in the transparent plate 26, and the diffracted light 14 is hardly emitted to an observer side; therefore the contrast of a screen can be enhanced to improve the visibility of the reflection type liquid crystal display device 21.

Fifteenth Embodiment

Figure 33A:
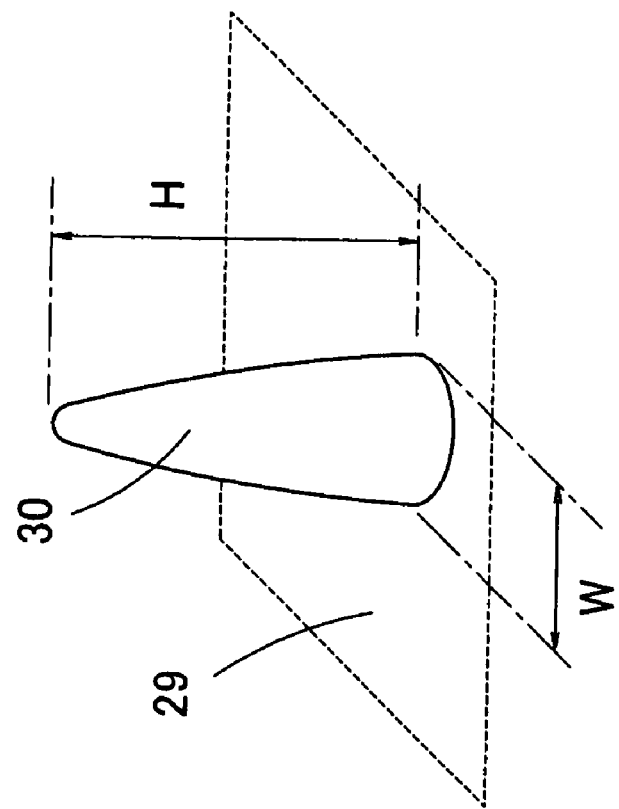
FIG. 33A shows the convex minute unevennesses which were provided on the under surface of the transparent plate in the fifteenth embodiment of the invention.
Figure 33B:
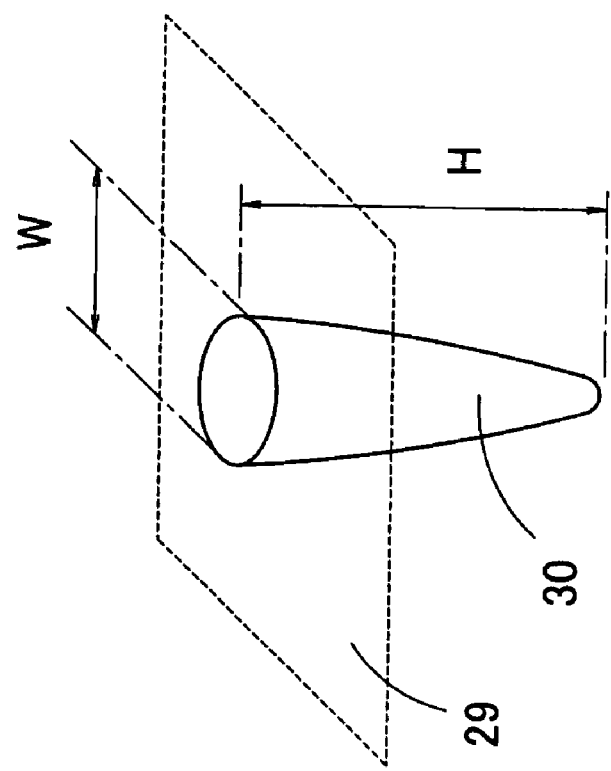
FIG. 33B shows the concave minute unevennesses which were provided on the undersurface of the transparent plate.

FIGS. 33A and 33B are perspective views magnifying one of the minute unevennesses in the fifteenth embodiment to be shown. FIG. 33A represents the convex portion which was provided on the under surface (the light emitting surface 29) of the transparent plate 26. FIG. 33B represents the concave portion which was provided on the under surface of the transparent plate 26. In the convex minute unevennesses 30 in the fifteenth embodiment, when the height of the convex portion or the depth of the concave portion is H and the width is W, the aspect ratio H/W is designed to be H/W>1.2. Thus, when the aspect ratio is H/W>1.2, the reflection coefficient in the reflection preventive patterns 31 can be adequately lessened, and the Fresnel reflection on the under surface of the transparent plate 26 can be lessened. Further, in order to lessen the reflection, it is desirable that the height or the depth H of the minute unevennesses 30 is as large as possible so far as it can be molded, and it is preferable to have the height or the depth of 150 nm or more.

Method for Forming Reflection Preventive Patterns

Figure 34A:
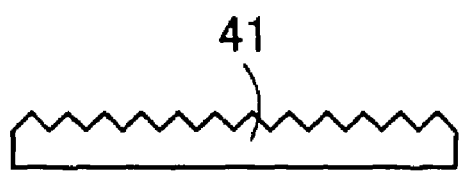
FIGS. 34A to 34F show the molding method of the reflection preventive patterns.
Figure 34B:
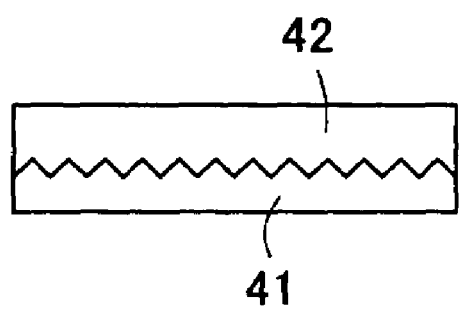
Figure 34C:
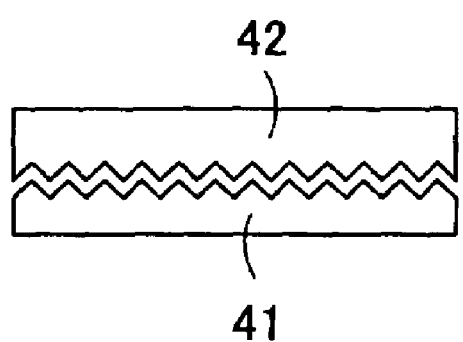
Figure 34D:
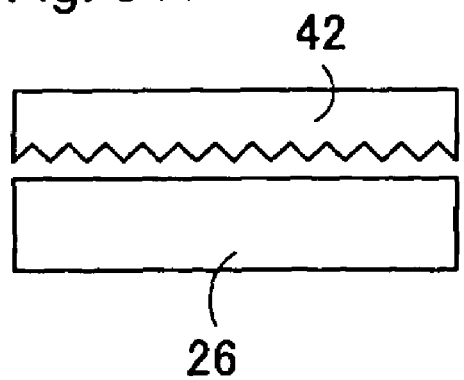
Figure 34E:
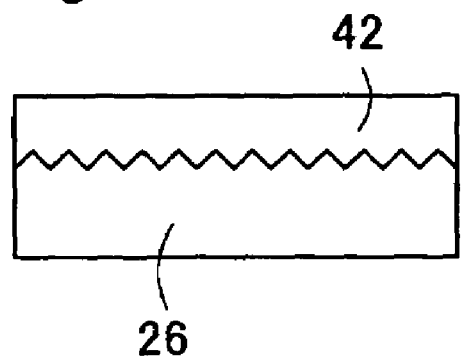
Figure 34F:
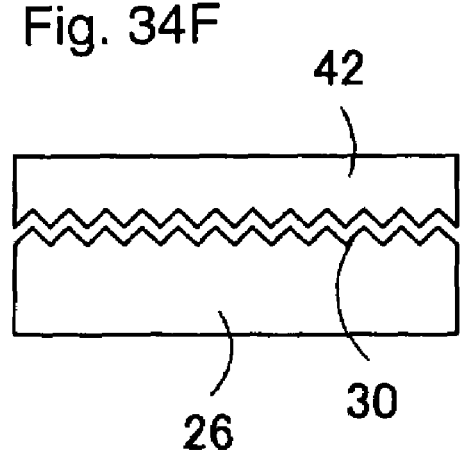
Figure 35A:
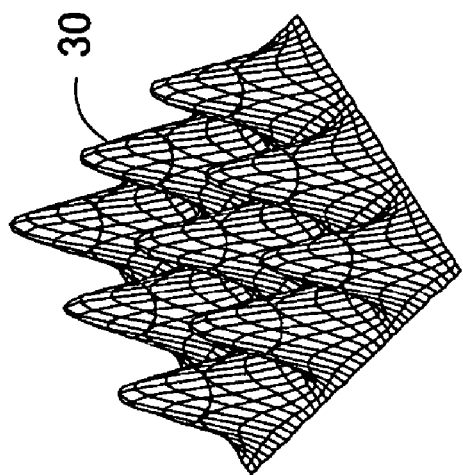
FIGS. 35A to 35D show the shapes of the various minute unevennesses.
Figure 35B:
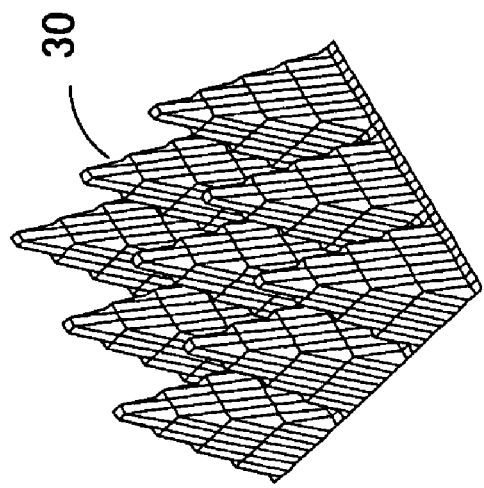
Figure 35C:
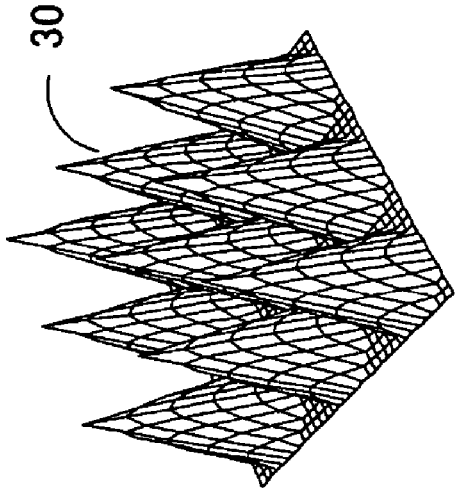
Figure 35D:
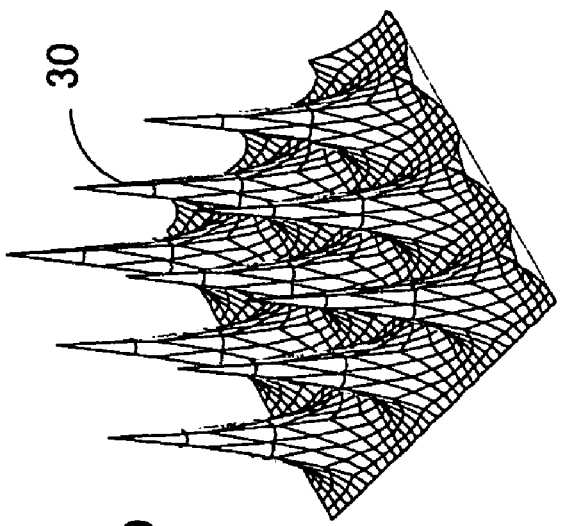

Then, a method of forming the reflection preventive patterns 31 on the transparent plate 26 is illustrated. Firstly, the original disc 41 of the reflection preventive patterns 31 as shown in FIG. 34A is prepared. There are a two beam interference exposure method, an electron beam exposure method and the like for the method of preparing the original disc 41. After the original disc 41 is obtained by the method, a stumper 42 is prepared by piling a stumper material such as Ni by an electroplating method as shown in FIG. 34B. When the stumper 42 is peeled from the original disc 41 and separated from the original disc 41, patterns which were obtained by reversing the patterns of the minute unevennesses of the original disc 41 are obtained on the under surface of the stumper 42. Then, as shown in FIG. 34D, the stumper 42 is pressured on the rear surface or the surface of the transparent plate 26 while heating the stumper 42, and as shown in FIG. 34E, the convex minute unevennesses 30 are transcribed on the transparent plate 26. Then, when the stumper 42 is peeled from the transparent plate 26, the convex minute unevennesses 30 are formed on the rear surface or the surface of the transparent plate 26.

Further, after the convex minute unevennesses 30 were transcribed on a film (not illustrated), the film may be bound on the transparent plate 26, as a method other than a method of directly transcribing the minute unevennesses 30 on the transparent plate 26. However, the method of directly transcribing the minute unevennesses 30 on the transparent plate 26 has also high durability and little steps. Herein, the minute unevennesses 30 which are provided on the front light 22 may be a shape in which many pyramidal convex patterns are provided, and may be a shape in which many concave patterns obtained by reversing them are provided. However, the convex patterns are preferable for hardly generating the diffracted light.

The minute unevennesses 30 thus molded may be a pyramidal shape, a cone shape, and additionally, a shape in which the side surface of the minute unevennesses 30 are gradually varied (in particular, a convex shape in which inclination is gradually enlarged for the edge). For example, the minute unevennesses 30 having various shapes shown in FIGS. 35A, 35B, 35C and 35D are possible. Further, the period of the minute unevennesses 30 is a distance between the edge of the convex patterns and the edge of the convex patterns of the adjacent minute unevennesses 30. Further, when the shape of the minute unevennesses 30 is the wavelength of light or less, the reflection coefficient is hardly affected even if the period and arrangement of the minute unevennesses 30 are dispersed. In this case, the period of the minute unevennesses 30 is an average distance between the convex patterns and the convex patterns of the adjacent minute unevennesses 30.

In order to obtain good reflection preventive effect, the aspect ratio of the minute unevennesses 30 is desirably 1 or more. Further, the higher the height (depth) of the minute unevennesses 30 is, at the broader injection angle and the broader wavelength zone the reflection can be reduced, but it is desirable that the height is about 150 nm considering moldability.

Sixteenth Embodiment

Then, a case that the surface light source device equipped with the minute unevennesses which were illustrated in the above-mentioned embodiment is used for a both surfaces type liquid crystal display device which can display the both surfaces is illustrated. The both surfaces type liquid crystal display device mentioned here is a liquid crystal display device in which an image can be viewed from both surfaces by a pair of the liquid crystal display panels and the surface light source device.

Figure 36:
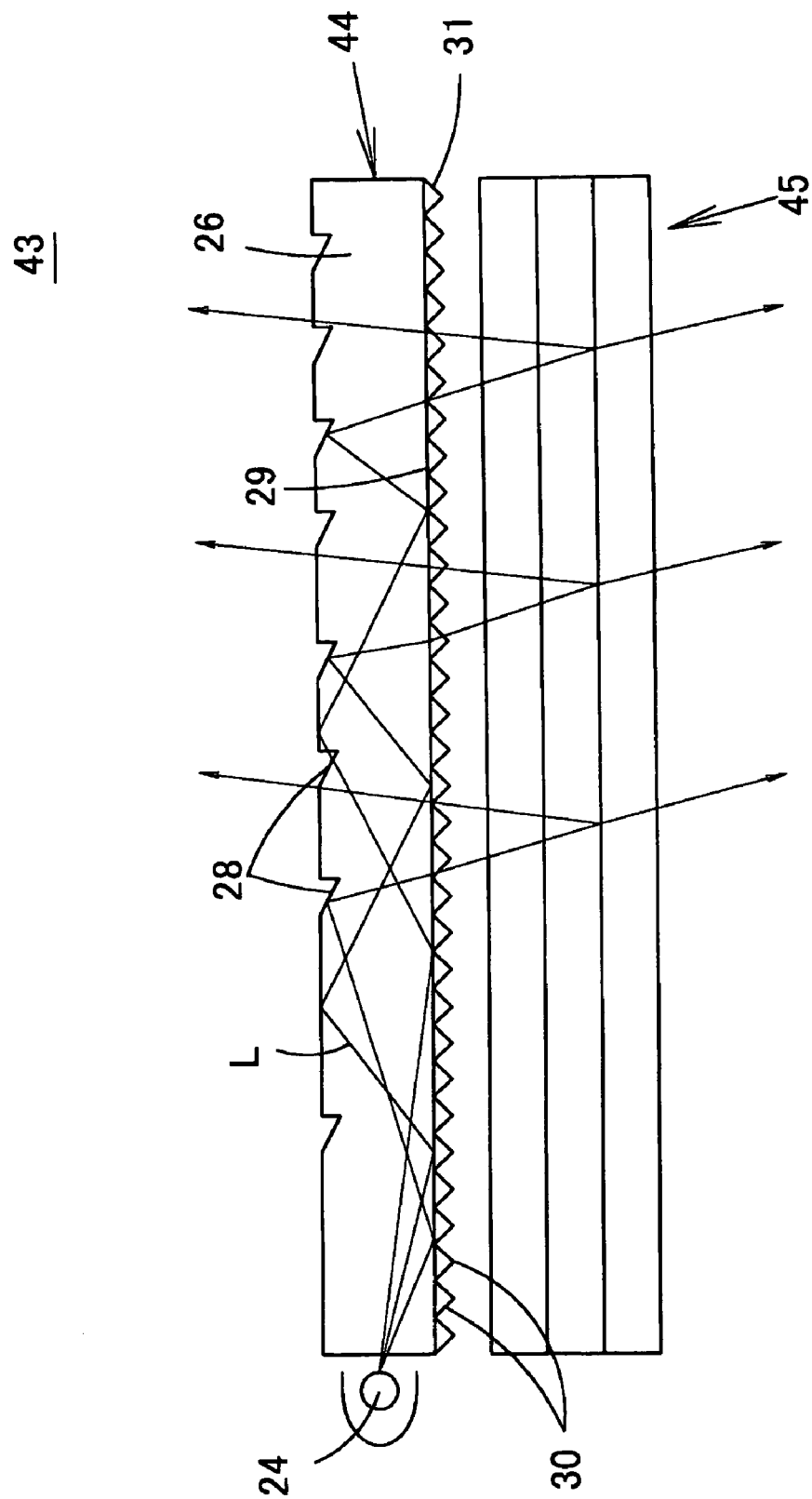
FIG. 36 shows the schematic sectional view of the both surfaces type liquid crystal display device related to the sixteenth embodiment of the invention.

FIG. 36 is a schematic sectional view showing the composition of the both surfaces type liquid crystal display device. The both surface type liquid crystal display device 43 is a device facing the surface light source device 44 related to the invention with a semi transparent type liquid crystal display device 45. The surface light source device 44 is a similar surface light source device as the front light 22 which was illustrated in any one of the embodiments, or a surface light source device equipped with the minute unevennesses 30 which were illustrated in any one of the embodiments, on the surface of observation side of the transparent plate or on the reverse surface (namely, the light emitting surface 29) of observation side. In case of the both surfaces type liquid crystal display device 43, the surface of observation side is a surface of a direction by which the image light reflected on the liquid crystal display panel 45 is observed. The surface light source device 44 shown in FIG. 36 is different from the front light 22 shown in FIG. 7 and FIG. 8 in the shape of the deflecting pattern 28 which was provided on the transparent plate 26, and has a similar structure as the front light 22 except that the mutual deflecting patterns 28 are discontinuously provided. In the example illustrated of the minute unevennesses 30, it is provided only on the light emitting surface 29, but may be provided on a surface at the reverse side of the light emitting surface 29.

Figure 37:
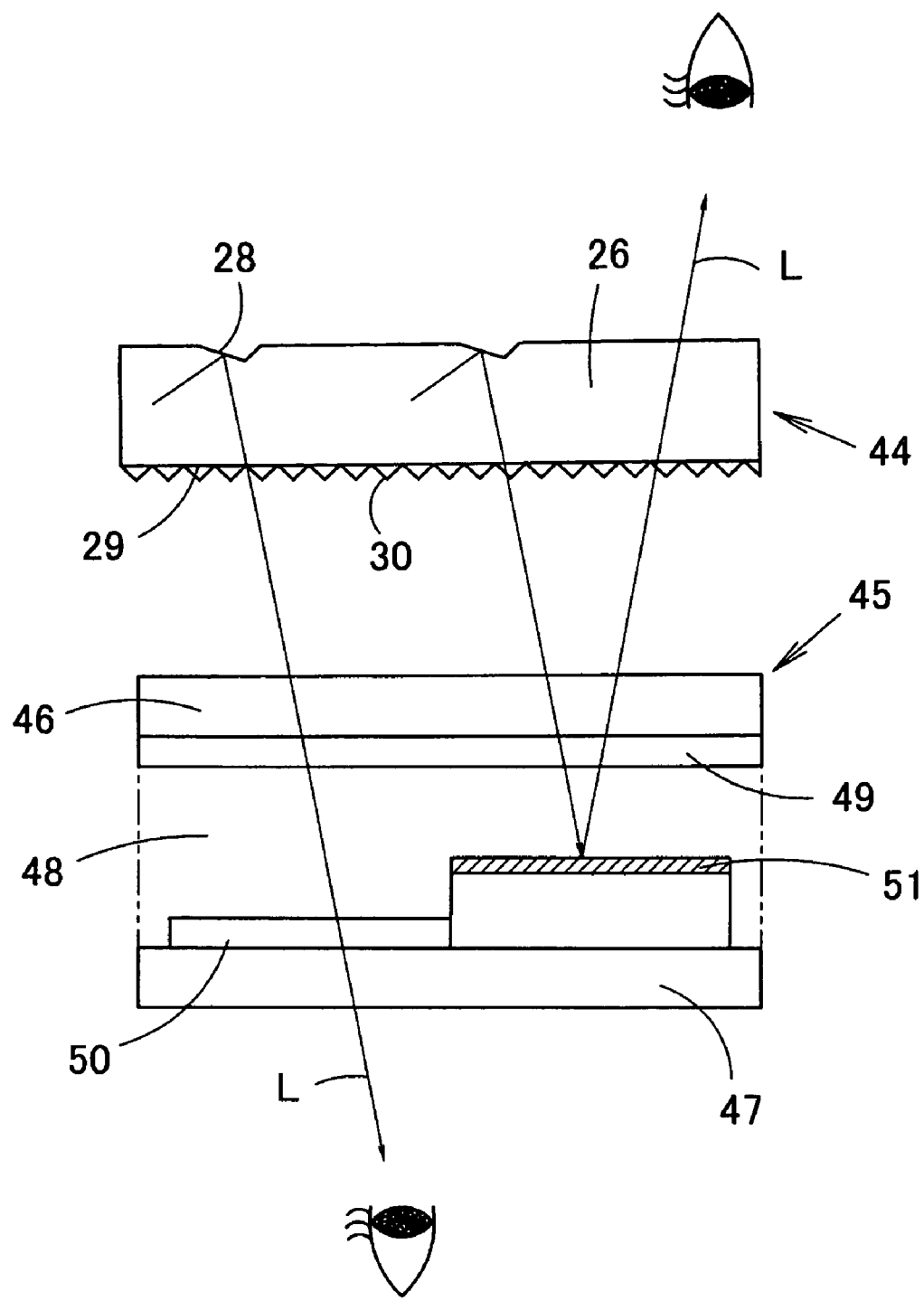
FIG. 37 shows a magnified sectional view of the structure of one pixel of the same both surfaces type liquid crystal display device.

FIG. 37 is a magnified sectional view showing the structure of one pixel which was taken out from the semi transparent type liquid crystal display panel 45. The liquid crystal display panel 45 sealed a liquid crystal material 48 between the first substrate 46 and the second substrate 47. A plural number of transparent electrodes 50 are arranged in a matrix shape at a fixed interval on the inner surface facing the liquid crystal material 48 of the second substrate 47, and reflection electrodes 51 consisting of a metal film which were arranged in adjacent positions with the respective transparent electrodes 50 in a condition in which they are respectively connected with the respective transparent electrodes 50 electrically. The respective transparent electrodes 50 occupy about a half of a size for one pixel zone, and the reflection electrodes 51 occupy also about a half of the size for one pixel zone. The reflection electrodes 51 are provided in a more protruded condition than the transparent electrodes 50. Namely, the one pixel is composed of one transparent electrode 50 and one reflection electrode 51.

Further, the transparent electrode 49 is provided over the whole surface of the display zone on the inner surface facing the liquid crystal material 48 of the first substrate 46. The surface light source device 44 is arranged facing the outer surface side of the first substrate 46. Further, in FIG. 37, only one pixel element in the liquid crystal display panel of dot matrix display is indicated and an orientation film, an optical film, circuits such as TFT and the like are abbreviated.

However, in the both surface type liquid crystal display device 43, the light L is emitted from the light emitting surface 29 of the transparent plate 26, the light L emitted from the transparent plate 26 illuminates the liquid crystal display panel 45. The light L which was injected in a zone where the transparent electrodes 50 of pixels in an ON condition are provided among the light L emitted from the transparent plate 26 passes the transparent electrode 49 and the transparent electrodes 50, and an image is recognized at the reverse side against the surface of observation side. The light L which was injected in a zone where the reflection electrodes 51 of pixels in an ON condition are provided passes the transparent electrode 49 and, is reflected on the reflection electrodes 51, then passes the transparent electrode 49, and further, passes the transparent plate 26, and an image is recognized at observation side. Thereby, an image can be recognized from both surfaces by the both surface type liquid crystal display device 43 consisting of one liquid crystal display panel 45 and one surface light source device 44; therefore the number of parts of the composition parts can be reduced and power consumption can be lessened.

Figure 38:
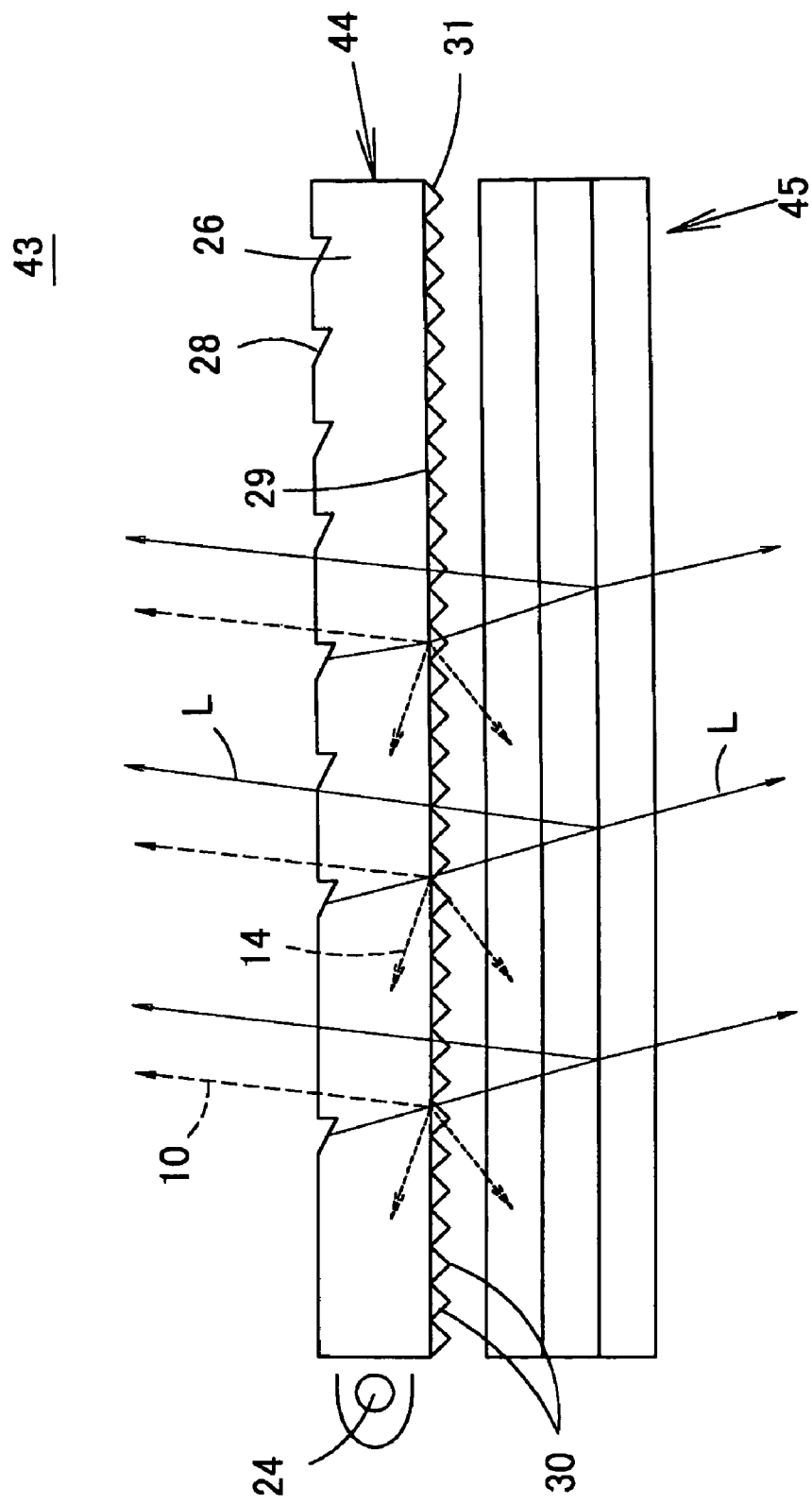
FIG. 38 shows the action effect of the both surfaces type liquid crystal display device related to the sixteenth embodiment.

In the both surface type liquid crystal display device 43 having such structure, when the minute unevennesses 30 are not provided on the transparent plate 26 of the surface light source device 44, light is emitted from the surface of the observation side as shown in FIG. 38 when light transmitted in the transparent plate 26 is reflected by the Fresnel reflection on the light emitting surface 29. Since the light which was emitted from the surface of the observation side becomes noise light 10 and is emitted to the same direction as the image light, white light is duplicated on the image in like manner as the case of the reflection type liquid crystal display panel, the contrast of a screen is lowered and the visibility at the observation side is deteriorated.

Further, even if the minute unevennesses 30 are provided on the transparent plate 26 for preventing the above-mentioned Fresnel reflection, the diffracted light 14 is emitted directly or in irregular reflection when diffraction occurs on the minute unevennesses 30. Since the diffracted light 14 is emitted to an observer side (a side where light reflected from the liquid crystal display panel 45 is observed) and a reverse side against the observation side (a side where light passing the liquid crystal display panel 45 is observed), the diffracted light is duplicated with the image light of a screen, and the transparent plate wears a tone of color at both surfaces; therefore the contrast of a screen is lowered and the visibility is deteriorated.

To the contrary, in the both surface type liquid crystal display device 43 according to the sixteenth embodiment, since the reflection preventive patterns 31 consisting of the minute unevennesses 30 related to the invention are provided, the quality lowering of an image caused by the above-mentioned noise light 10 and the diffracted light 14 can be suppressed and the visibility of an image of the both surface type liquid crystal display device 43 can be improved.

Electronic Instruments (Application Example)

Figure 39:
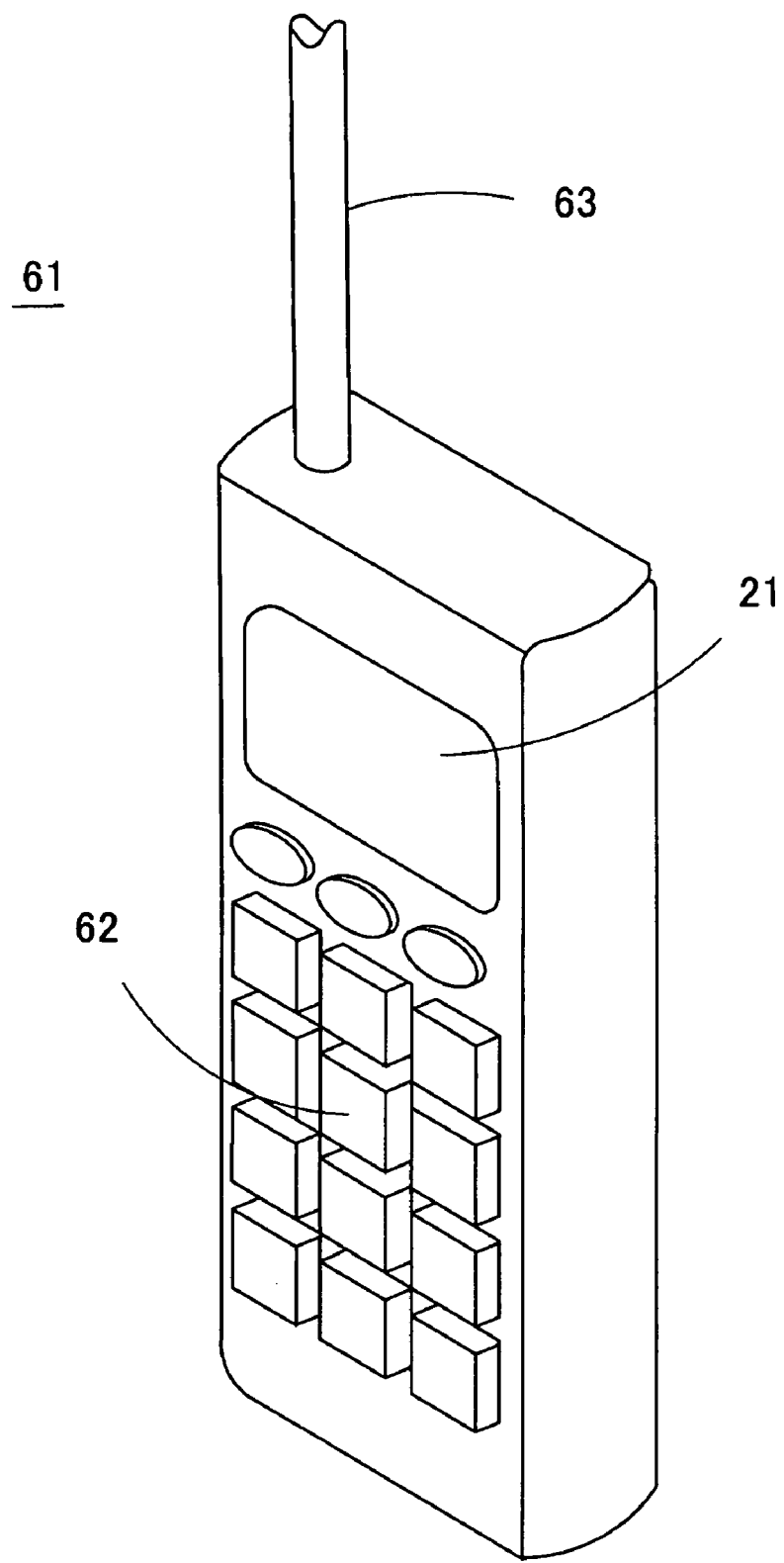
FIG. 39 shows the perspective view of a mobile phone.

FIG. 39 shows a mobile phone 61 in which the reflection type liquid crystal display device 21 related to the invention was assembled. The reflection type liquid crystal display device 21 is assembled on a dial portion 62 equipped with ten keys and the like, in the mobile phone 61 and an antenna 63 is provided at the upper face.

Figure 40:
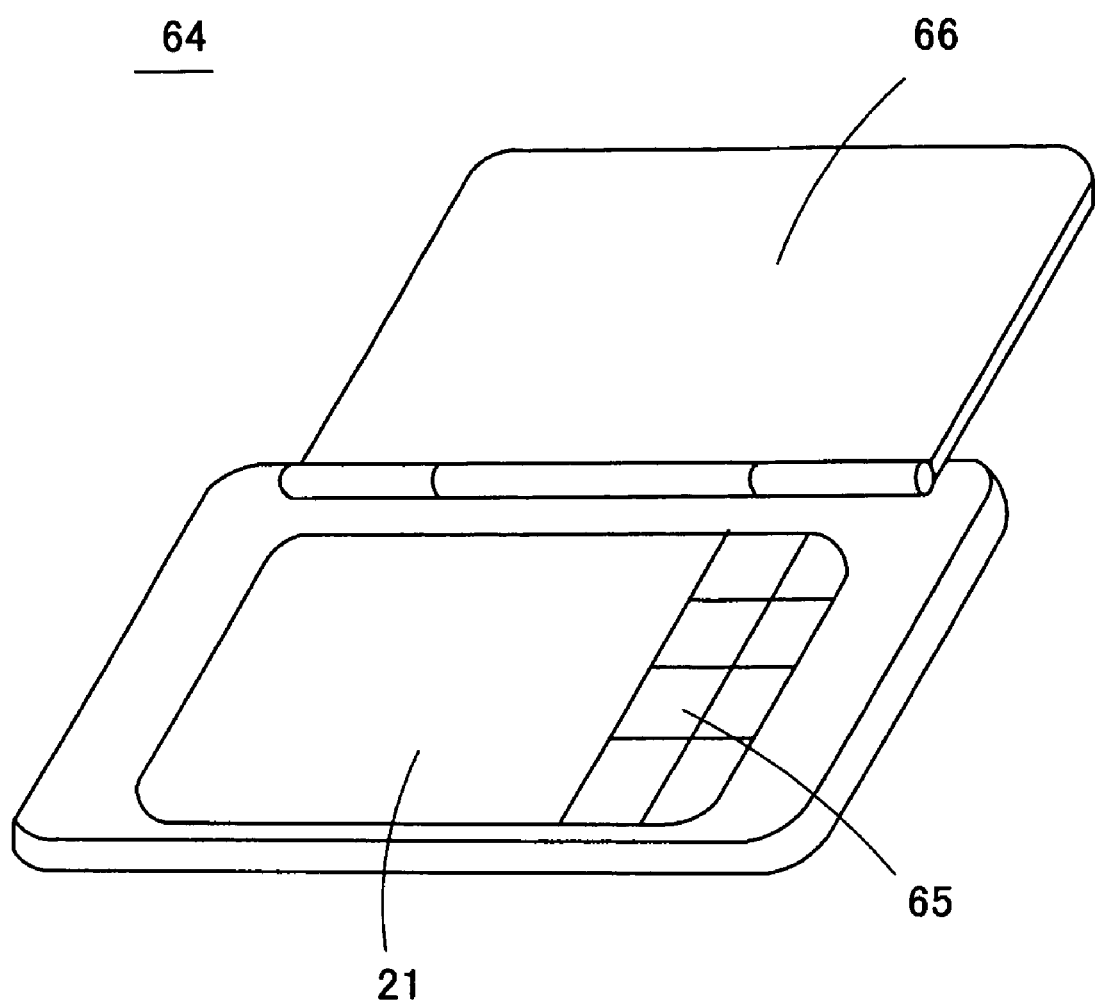
FIG. 40 shows the perspective view of a mobile information terminal.

FIG. 40 shows a mobile information terminal 64 such as PDA in which the reflection type liquid crystal display device 21 was assembled. The mobile information terminal 64 is equipped with an input portion 65 such as a pen input at the side of the reflection type liquid crystal display device, and a lid 66 is fixed on the upper end portion.

Thus, a mobile phone, a mobile information terminal and the like can have a display portion having good contrast and good visibility by using the reflection type liquid crystal display device of the invention.

The front light related to the invention can be used for the reflection type liquid crystal device and other reflection type display device. Further, the reflection type display device can be used as the display portion of respective instruments, but in particular, is preferably used for mobile instruments such as a mobile phone and a mobile for carrying.

What is claimed is:

1. A surface light source device equipped with a light source and a transparent plate emitting light from a light emitting surface which is situated at the reverse side against an observation side surface by conducting light from the light source, wherein
    a plural number of minute concave portions or convex portions for prevention of reflection are periodically arranged on at least one of the observation side surface and the light emitting surface,
    the lower limit value of the period of the concave portions or convex portions is defined to be the period at which incident light to the surface where the concave portions or convex portions are arranged generates diffraction light, with respect to a determined value of the wavelength in vacuum of visible light having the shortest wavelength which emits from the light source and a determined value of the refractive index of the transparent plate, and the concave portions or convex portions are formed at a smaller period than the lower limit value.

2. A surface light source device equipped with a light source and a transparent plate emitting light from a light emitting surface which is situated at the reverse side against an observation side surface by conducting light from the light source, wherein
    a plural number of minute concave portions or convex portions for prevention of reflection are periodically arranged on at least one of the observation side surface and the light emitting surface, and
    the period p of the concave portions or convex portions satisfies the following equation:

$$p < \frac{\lambda min}{n1 + n0}$$

(in which λmin represents a wavelength in vacuum of visible light with the shortest wavelength which is emitted from the light source, n1 represents the refractive index of the transparent plate, and n0 represents the refractive index of a medium which is brought in contact with the surface where the minute concave portions or convex portions of the transparent plate are arranged).

3. A surface light source device equipped with a light source and a transparent plate emitting light from a light emitting surface which is situated at the reverse side against an observation side surface by conducting light from the light source, wherein
    a direction at which the luminous intensity of light emitted from the light emitting surface is the maximum is inclined to the normal line which is established on the light emitting surface,
    a plural number of minute concave portions or convex portions for prevention of reflection are periodically arranged on at least one of the observation side surface and the light emitting surface, and
    the period p of the concave portions or convex portions satisfies the following equation:

$$p < \frac{\lambda min}{n1 + n0 \cdot \cos\theta out}$$

(in which λmin represents a wavelength in vacuum of visible light with the shortest wavelength which is emitted from the light source, n1 represents the refractive index of the transparent plate, n0 represents the refractive index of a medium which is brought in contact with the surface where the minute concave portions or convex portions of the transparent plate are arranged, and θout represents an angle formed between a direction at which the luminous intensity of light emitted from the light emitting surface is the maximum and the normal line which is established on the light emitting surface).

4. A surface light source device equipped with a light source and a transparent plate emitting light from a light emitting surface which is situated at the reverse side against an observation side surface by conducting light from the light source, wherein
    a plural number of minute concave portions or convex portions for prevention of reflection are periodically arranged on at least one of the observation side surface and the light emitting surface, and
    the period p of the concave portions or convex portions satisfies the following equation:

$$p < \frac{\lambda \min}{2 \cdot n1}$$

(in which λmin represents a wavelength in vacuum of visible light with the shortest wavelength which is emitted from the light source, and n1 represents the refractive index of the transparent plate).

5. A surface light source device equipped with a light source and a transparent plate emitting light from a light emitting surface which is situated at the reverse side against an observation side surface by conducting light from the light source, wherein a plural number of minute concave portions or convex portions for prevention of reflection are periodically arranged on at least one of the observation side surface and the light emitting surface, the concave portions or convex portions are arranged in a lattice shape which is defined by two lattice vectors in which an angle mutually formed is α ($\geqq 90°$) and lengths are di and dj, and the concave portions or convex portions are oriented in a direction satisfying the following equation:

$$\frac{dj}{di} = \frac{\sin(\alpha - \phi)}{\sin\phi}$$

(in which φ represents an angle formed between the proceeding direction of light which is conducted substantially in parallel with the light emitting surface and the lattice vector with the length of di).

6. A surface light source device equipped with a light source and a transparent plate emitting light from a light emitting surface which is situated at the reverse side against an observation side surface by conducting light from the light source, wherein a plural number of minute concave portions or convex portions for prevention of reflection are periodically arranged on at least one of the observation side surface and the light emitting surface, the concave portions or convex portions are arranged in a lattice shape which is defined by two lattice vectors in which an angle mutually formed is α ($\geqq 90°$) and lengths are di and dj, and the direction of a vector represented by the difference of the two vectors is arranged in a direction orthogonal to the proceeding direction of light which is conducted substantially in parallel with the light emitting surface, and the concave portions or convex portions satisfy the following equation:

$$\frac{di \cdot dj}{\sqrt{di^2 + dj^2}} < \frac{\lambda \min}{2 \cdot n1}$$

(in which λmin represents a wavelength in vacuum of visible light with the shortest wavelength which is emitted from the light source, and n1 represents the refractive index of the transparent plate).

7. A surface light source device equipped with a light source and a transparent plate emitting light from a light emitting surface which is situated at the reverse side against an observation side surface by conducting light from the light source, wherein a plural number of minute concave portions or convex portions for prevention of reflection are periodically arranged on at least one of the observation side surface and the light emitting surface, the concave portions or convex portions are arranged in a lattice shape which is defined by two lattice vectors with the same length in which an angle mutually formed is 120°, and the direction of the lattice vector represented by either of the two lattice vectors or the sum of both lattice vectors is arranged in a direction parallel to the proceeding direction of light which is conducted substantially in parallel with the light emitting surface, and the lengths of the both lattice vectors di and dj satisfy the following equation:

$$di = dj < \frac{2 \cdot \lambda \min}{3 \cdot n1}$$

(in which λmin represents a wavelength in vacuum of visible light with the shortest wavelength which is emitted from the light source, and n1 represents the refractive index of the transparent plate).

8. A surface light source device equipped with a light source and a transparent plate emitting light from a light emitting surface which is situated at the reverse side against an observation side surface by conducting light from the light source, wherein a plural number of minute concave portions or convex portions are randomly arranged on at least one of the observation side surface and the light emitting surface, and when the distribution of the distances of the mutual concave portions or the mutual convex portions which are adjacent with respect to the concave portions or convex portions is calculated, a distance K at which the distribution frequency of the plural number of minute concave or convex portions is the maximum satisfies the following equation:

$$K < \frac{\lambda \min}{n1 + n0}$$

(in which λmin represents a wavelength in vacuum of visible light with the shortest wavelength which is emitted from the light source, n1 represents the refractive index of the transparent plate, and n0 represents the refractive index of a medium which is brought in contact with the surface where the minute concave portions or convex portions of the transparent plate are arranged).

9. A surface light source device equipped with a light source and a transparent plate emitting light from a light emitting surface which is situated at the reverse side against an observation side surface by conducting light from the light source, wherein a direction at which the luminous intensity of light emitted from the light emitting surface is the maximum is inclined to the normal line which is established on the light emitting surface, a plural number of minute concave portions or convex portions for prevention of reflection are randomly arranged on at least one of the observation side surface and the light emitting surface, and when the distribution of the distances of the mutual concave portions or the mutual convex portions which are adjacent with respect to the concave portions or convex portions is calculated, a distance K at which the frequency is the maximum satisfies the following equation:

$$K < \frac{\lambda \min}{n1 + n0 \cdot \cos\theta out}$$

(in which λmin represents a wavelength in vacuum of visible light with the shortest wavelength which is emitted from the light source, n1 represents the refractive index of the transparent plate, n0 represents the refractive index of a medium which is brought in contact with the surface where the minute concave portions or convex portions of the transparent plate are arranged, and θout represents an angle formed between a direction at which the luminous intensity of light emitted from the light emitting surface is the maximum and the normal line which is established on the light emitting surface).

10. A surface light source device equipped with a light source and a transparent plate emitting light from a light emitting surface which is situated at the reverse side against an observation side surface by conducting light from the light source, wherein a plural number of minute concave portions or convex portions are randomly arranged on at least one of the observation side surface and the light emitting surface, and when the distribution of the distances of the mutual concave portions or the mutual convex portions which are adjacent with respect to the concave portions or convex portions is calculated, a distance K at which the frequency is the maximum satisfies the following equation:

$$K < \frac{\lambda \min}{2 \cdot n1}$$

(in which λmin represents a wavelength in vacuum of visible light with the shortest wavelength which is emitted from the light source, and n1 represents the refractive index of the transparent plate).

11. A surface light source device equipped with a light source and a transparent plate emitting light from a light emitting surface which is situated at the reverse side against an observation side surface by conducting light from the light source, wherein a plural number of minute concave portions or convex portions are randomly arranged on at least one of the observation side surface and the light emitting surface, and when the width of the concave portions or the convex portions is set as W, the width W satisfies the following equation:

$$W < \frac{\lambda \min}{n1 + n0}$$

(in which λmin represents a wavelength in vacuum of visible light with the shortest wavelength which is emitted from the light source, n1 represents the refractive index of the transparent plate, and n0 represents the refractive index of a medium which is brought in contact with the surface where the minute concave portions or convex portions of the transparent plate are arranged).

12. A surface light source device equipped with a light source and a transparent plate emitting light from a light emitting surface which is situated at the reverse side against an observation side surface by conducting light from the light source, wherein a direction at which the luminous intensity of light emitted from the light emitting surface is the maximum is inclined to the normal line which is established on the light emitting surface, a plural number of minute concave portions or convex portions are randomly arranged on at least one of the observation side surface and the light emitting surface, and when the width of the concave portions or the convex portions is set as W, the width W satisfies the following equation:

$$W < \frac{\lambda \min}{n1 + n0 \cdot \cos\theta out}$$

(in which λmin represents a wavelength in vacuum of visible light with the shortest wavelength which is emitted from the light source, n1 represents the refractive index of the transparent plate, n0 represents the refractive index of a medium which is brought in contact with the surface where the minute concave portions or convex portions of the transparent plate are arranged, and θout represents an angle formed between a direction at which the luminous intensity of light emitted from the light emitting surface is the maximum and the normal line which is established on the light emitting surface).

13. A surface light source device equipped with a light source and a transparent plate emitting light from a light emitting surface which is situated at the reverse side against an observation side surface by conducting light from the light source, wherein a plural number of minute concave portions or convex portions are randomly arranged on at least one of the observation side surface and the light emitting surface, and when the width of the concave portions or the convex portions is set as W, the width W satisfies the following equation:

$$W < \frac{\lambda \min}{2 \cdot n1}$$

(in which λmin represents a wavelength in vacuum of visible light with the shortest wavelength which is emitted from the light source, and n1 represents the refractive index of the transparent plate).

14. A surface light source device according to claim 1, wherein when the depth of the concave portions or the height of the convex portions is set as H, a ratio H/W to the width W of the concave portions or convex portions satisfies the following equation:

$$H/W > 1.2.$$

15. A surface light source device according to claim 1, wherein a wavelength λmin in vacuum of visible light with the shortest wavelength which is emitted from the light source is 380 nm.

16. A surface light source device according to claim 1, wherein the concave portions or convex portions are transcribed on at least one of the observation side surface and the light emitting surface.

17. A display panel comprising the surface light source device according to claim 1 and a display panel preparing an image by reflecting light emitted from the surface light source device.

18. A display panel comprising the surface light source device according to claim 1 and a display panel preparing an image by passing light emitted from the surface light source and preparing an image by reflecting light emitted from the surface light source device.

19. An electronic instrument equipped with the display device according to claim 17, as a display.

20. An electronic instrument equipped with the display device according to claim 18, as a display.

* * * * *

UNITED STATES PATENT AND TRADEMARK OFFICE
CERTIFICATE OF CORRECTION

PATENT NO. : 7,162,139 B2
APPLICATION NO. : 10/958998
DATED : January 9, 2007
INVENTOR(S) : Yuki Matsui et al.

It is certified that error appears in the above-identified patent and that said Letters Patent is hereby corrected as shown below:

On the cover page of the patent, section (73), Assignees, please remove "Osaka University, Osaka (JP)".

Signed and Sealed this

Fourteenth Day of August, 2007

JON W. DUDAS
*Director of the United States Patent and Trademark Office*